US012579025B1

(12) United States Patent
Krishnan et al.

(10) Patent No.: US 12,579,025 B1
(45) Date of Patent: Mar. 17, 2026

(54) DYNAMIC ERROR RESOLUTION FOR HYBRID QUANTUM-CLASSICAL COMPUTING ENVIRONMENTS USING A HIERARCHICAL DATA STRUCTURE

(71) Applicant: QpiAI India Private Limited, Bangalore (IN)

(72) Inventors: Aswanth Krishnan, Bengaluru (IN); Lakshya Priyadarshi, Lucknow (IN); Sachin Kumar, Bengaluru (IN); Manjunath Ramachandrappa Venkatesh, Bangalore (IN); Swati Kumari, Bengaluru (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/371,267

(22) Filed: Oct. 28, 2025

(30) Foreign Application Priority Data

Oct. 30, 2024 (IN) ............................. 202441083003

(51) Int. Cl.
*G06F 11/00* (2006.01)
*G06F 11/07* (2006.01)
*G06N 10/70* (2022.01)

(52) U.S. Cl.
CPC .......... *G06F 11/0793* (2013.01); *G06F 11/07* (2013.01); *G06F 11/0754* (2013.01); *G06N 10/70* (2022.01)

(58) Field of Classification Search
CPC .. G06F 11/07; G06F 11/0754; G06F 11/0793; G06N 10/70
See application file for complete search history.

(56) References Cited

U.S. PATENT DOCUMENTS

| | | | |
|---|---|---|---|
| 7,875,876 B1 * | 1/2011 | Wandzura .............. | G06N 10/40 |
| | | | 257/26 |
| 11,416,762 B1 * | 8/2022 | Naveh .................... | G06N 10/70 |
| 11,615,337 B1 * | 3/2023 | Naveh .................... | G06N 10/20 |
| | | | 714/10 |
| 2020/0311220 A1 * | 10/2020 | Gunnels ................. | G06N 10/80 |
| 2022/0198312 A1 * | 6/2022 | Delfosse ............. | G06F 11/1048 |
| 2023/0054273 A1 * | 2/2023 | Ryan-Anderson ..... | G06N 10/70 |
| 2024/0249174 A1 * | 7/2024 | Bonderson ............ | G06N 10/40 |
| 2024/0394585 A1 * | 11/2024 | Reagor .................. | G06N 10/70 |
| 2025/0378363 A1 * | 12/2025 | Fowler ................... | G06N 10/70 |

* cited by examiner

*Primary Examiner* — Joshua P Lottich
(74) *Attorney, Agent, or Firm* — Foley & Lardner LLP

(57) ABSTRACT

Systems and methods for dynamic error resolution in hybrid quantum-classical computing environments are disclosed. A system can obtain telemetry data corresponding to a processing job. The system can determine that an error resolution technique is to be applied to the quantum portion of the processing job. The system can select, for a quantum portion of the processing job, the error resolution technique from a plurality of error correction techniques and a plurality of error mitigation techniques. The system can update a hierarchical data structure representing the processing job as at least a set of nodes. The hierarchical data structure can be updated to include the error resolution technique in association with a respective node of the hierarchical data structure representing the quantum portion of the processing job.

20 Claims, 12 Drawing Sheets

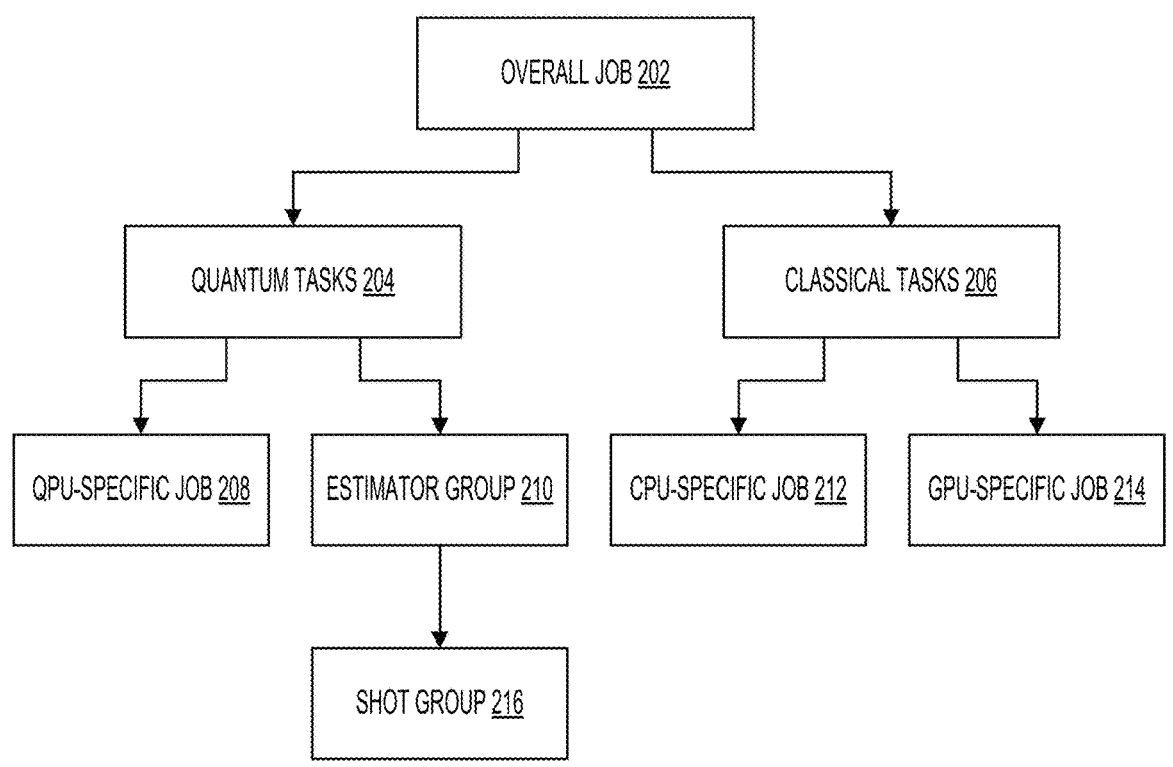
FIG. 2

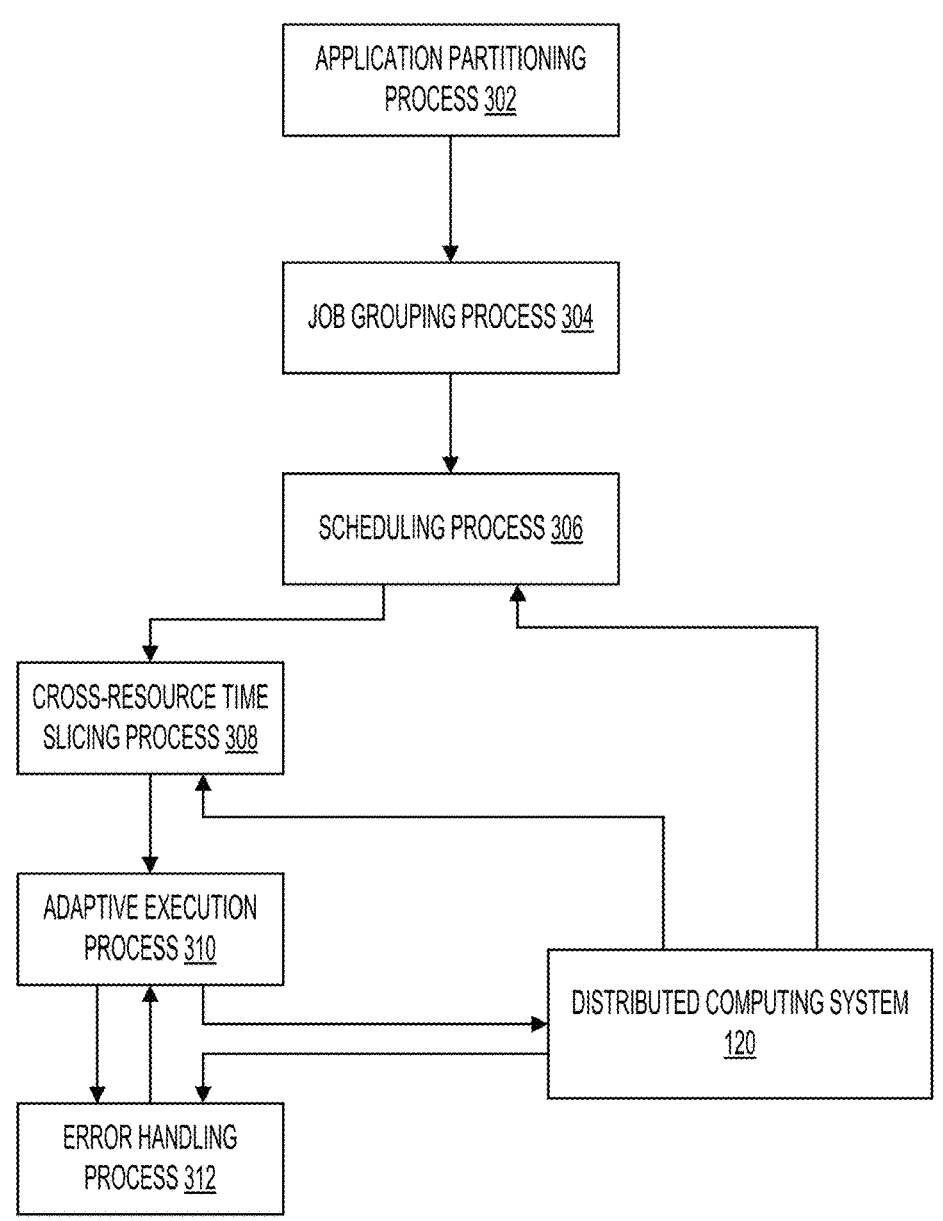
FIG. 3

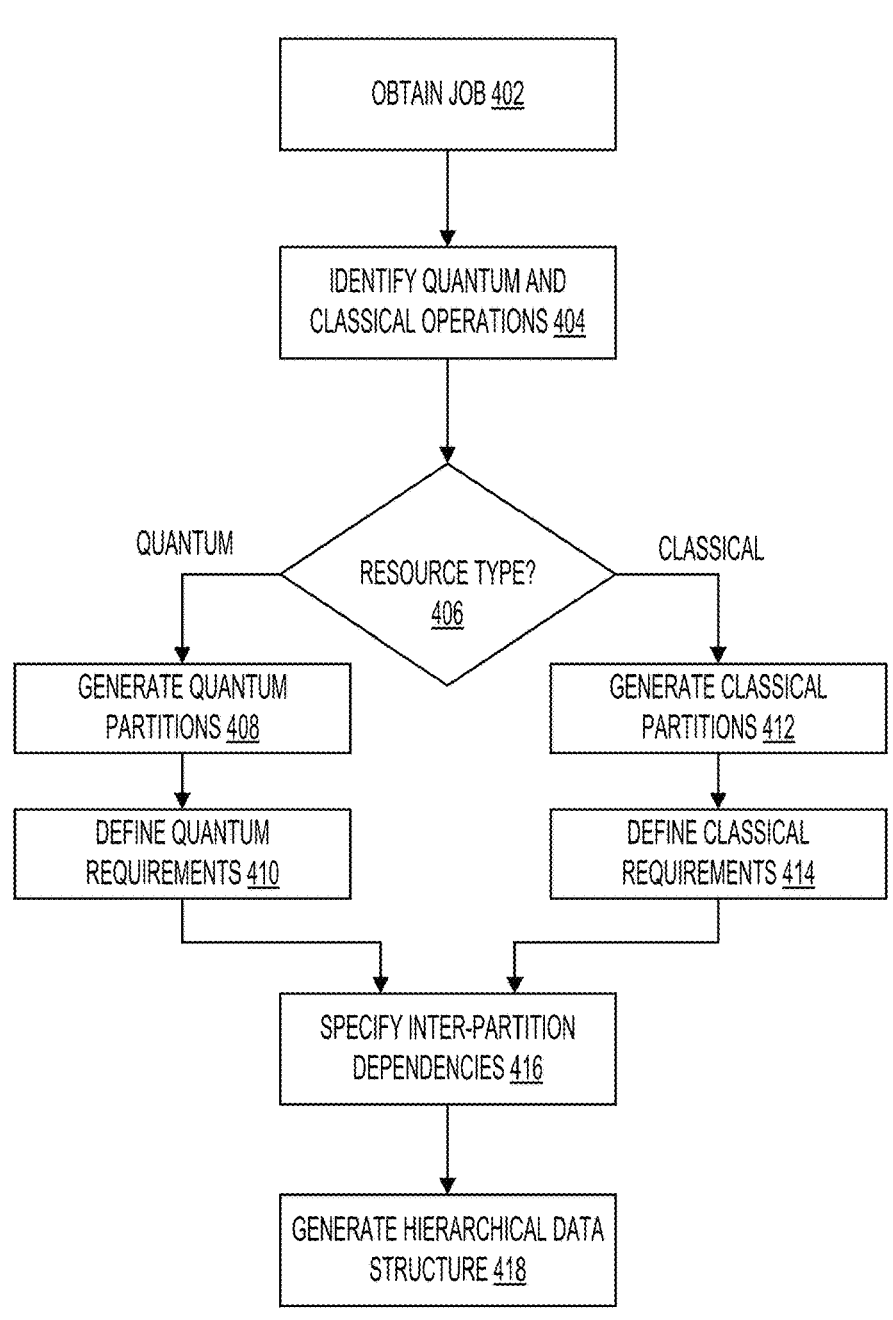
FIG. 4

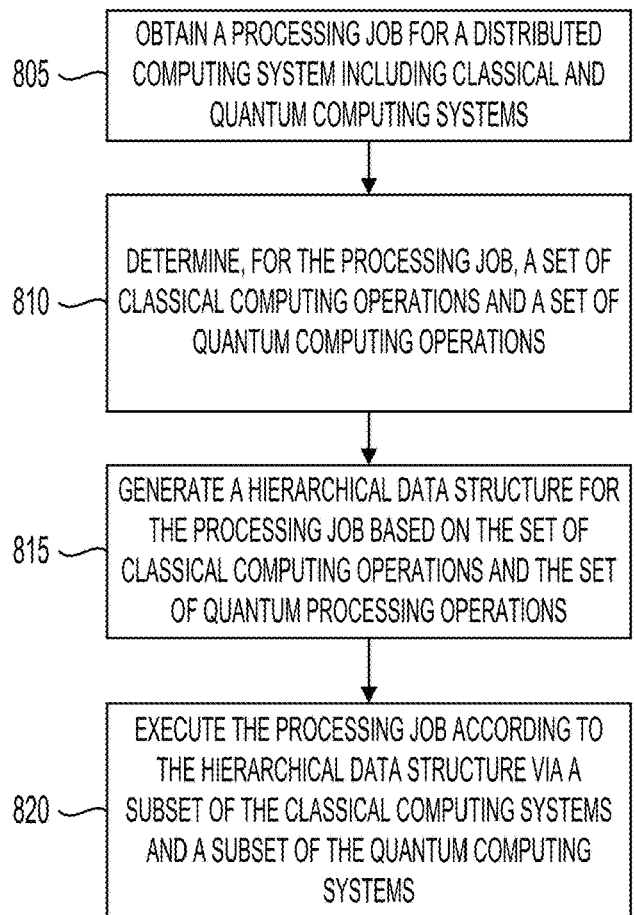

805 — OBTAIN A PROCESSING JOB FOR A DISTRIBUTED COMPUTING SYSTEM INCLUDING CLASSICAL AND QUANTUM COMPUTING SYSTEMS

810 — DETERMINE, FOR THE PROCESSING JOB, A SET OF CLASSICAL COMPUTING OPERATIONS AND A SET OF QUANTUM COMPUTING OPERATIONS

815 — GENERATE A HIERARCHICAL DATA STRUCTURE FOR THE PROCESSING JOB BASED ON THE SET OF CLASSICAL COMPUTING OPERATIONS AND THE SET OF QUANTUM PROCESSING OPERATIONS

820 — EXECUTE THE PROCESSING JOB ACCORDING TO THE HIERARCHICAL DATA STRUCTURE VIA A SUBSET OF THE CLASSICAL COMPUTING SYSTEMS AND A SUBSET OF THE QUANTUM COMPUTING SYSTEMS

FIG. 8

— 900

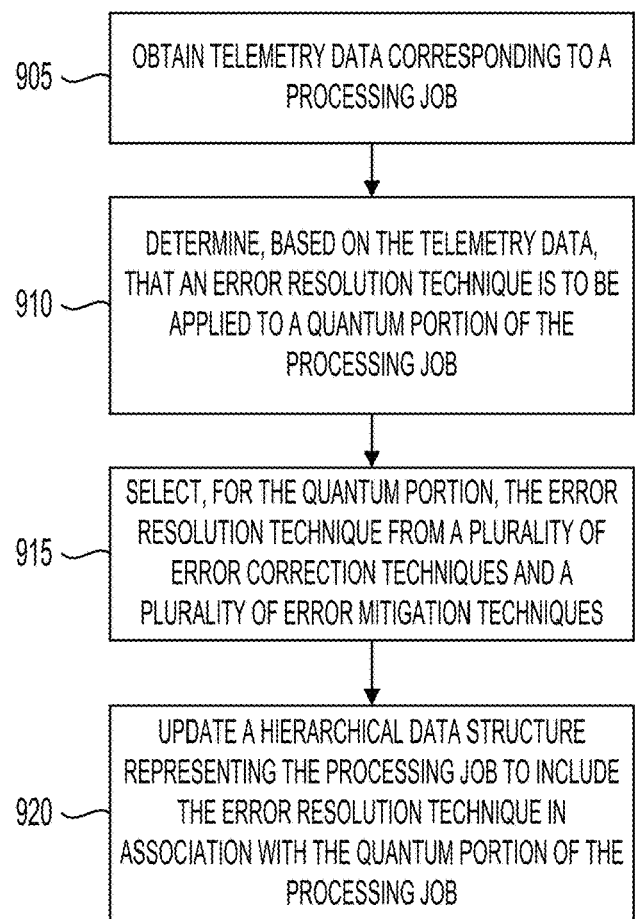

905 — OBTAIN TELEMETRY DATA CORRESPONDING TO A PROCESSING JOB

910 — DETERMINE, BASED ON THE TELEMETRY DATA, THAT AN ERROR RESOLUTION TECHNIQUE IS TO BE APPLIED TO A QUANTUM PORTION OF THE PROCESSING JOB

915 — SELECT, FOR THE QUANTUM PORTION, THE ERROR RESOLUTION TECHNIQUE FROM A PLURALITY OF ERROR CORRECTION TECHNIQUES AND A PLURALITY OF ERROR MITIGATION TECHNIQUES

920 — UPDATE A HIERARCHICAL DATA STRUCTURE REPRESENTING THE PROCESSING JOB TO INCLUDE THE ERROR RESOLUTION TECHNIQUE IN ASSOCIATION WITH THE QUANTUM PORTION OF THE PROCESSING JOB

FIG. 9

DYNAMIC ERROR RESOLUTION FOR HYBRID QUANTUM-CLASSICAL COMPUTING ENVIRONMENTS USING A HIERARCHICAL DATA STRUCTURE

CROSS-REFERENCES TO RELATED APPLICATIONS

This application claims the benefit of and priority to Indian Provisional Patent Application No. 202441083003, filed Oct. 30, 2024, the contents of which is incorporated herein by reference in its entirety for all purposes.

BACKGROUND

Hybrid quantum-classical computing environments can include quantum processing units (QPUs) and classical computing resources such as CPUs and GPUs, to execute various classical and quantum computational tasks. Persistent challenges include efficiently orchestrating hybrid jobs, minimizing idle time across devices with differing latency profiles, and addressing the lack of standardized mechanisms for resource allocation and error management in such systems.

SUMMARY

Hybrid quantum-classical computing environments can integrate quantum processing units (QPUs) with classical computing resources such as central processing units (CPUs), graphics processing units (GPUs), and field-programmable gate arrays (FPGAs) to implement computational workloads that exceed the capabilities of any single resource type. Conventional scheduling approaches for such environments often fail to handle the diverse requirements of quantum algorithms and the ability to efficiently share resources across different levels of computation, particularly for larger workloads involving several quantum and classical operations.

The techniques described herein can be used to implement hierarchical scheduling that orchestrates computation across heterogeneous resources. A central orchestrator can manage job submission, partitioning, scheduling, time slicing, adaptive execution, and error mitigation. Processing jobs may be submitted as job specifications via any suitable interface, and may be annotated with resource requirements and/or dependencies. In some implementations, dynamic partitioning and runtime adaptation can be used to adjust resource allocation and pipeline stages for hybrid quantum-classical processing jobs.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is a block diagram depicting an example hierarchical data structure for organizing and partitioning hybrid quantum-classical computational workloads, in accordance with one or more implementations;

FIG. 3 is a flowchart illustrating a hierarchical scheduling and execution workflow for a hybrid quantum-classical computing system, in accordance with one or more implementations;

FIG. 4 is a flowchart illustrating example techniques for partitioning a hybrid processing job into quantum and classical operations, in accordance with one or more implementations;

FIG. 8 is a flowchart illustrating an example method for hierarchical scheduling and execution of hybrid quantum-classical computing jobs in a distributed computing system, in accordance with one or more implementations;

FIG. 9 is a flowchart illustrating an example method for adaptive selection and application of error resolution techniques in a hierarchical quantum-classical job scheduling system, in accordance with one or more implementations;

DETAILED DESCRIPTION

Figure 1:
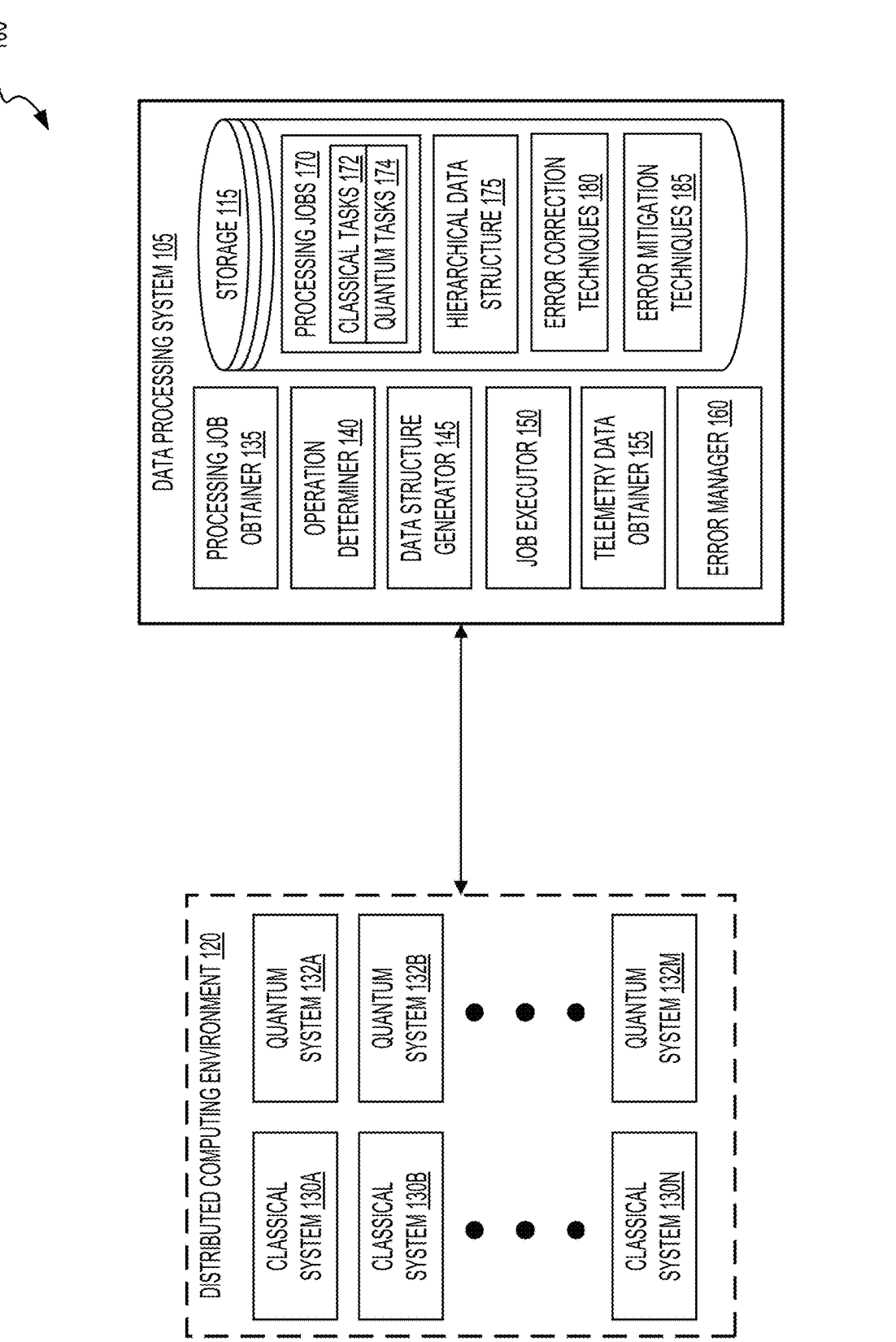
FIG. 1 is a block diagram illustrating a hierarchical quantum-classical scheduling system for orchestrating computation across a distributed hybrid quantum-classical computing environment, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

Hybrid quantum-classical computing environments can include quantum processing units (QPUs), central processing units (CPUs), graphics processing units (GPUs), and other computing systems/devices that can execute computational workloads. Such environments can be used to execute quantum algorithms that require iterative coordination between quantum and classical resources. A typical hybrid quantum-classical system can include multiple quantum-classical units each containing a QPU, quantum control electronics, and classical computing nodes. Such systems are capable of executing processing jobs that include both classical and quantum computing operations.

However, existing approaches for scheduling in hybrid quantum-classical environments have several drawbacks. Existing systems do not implement standardized or reliable partitioning of hybrid computational workloads across hybrid resources. For instance, current dependency management techniques do not capture dependencies between quantum and classical sub-tasks at multiple levels of granularity. Moreover, such approaches fail to properly facilitate pipelined execution across quantum-classical boundaries, resulting in significant idle time and suboptimal resource utilization. In such approaches, scheduling policies do not incorporate quantum-specific constraints and cannot dynamically adapt to changing resource conditions.

The techniques described herein address such challenges and provide a technical improvement over conventional approaches by providing a hierarchical scheduling system that orchestrates computation across heterogeneous quantum and classical resources. The approaches described herein can receive job submissions, partition jobs into quantum and classical operations using an application-level partitioning, and generate a hierarchical grouping (e.g., a hierarchical data structure) representing an execution order of such tasks. The systems and methods described herein can schedule interdependent quantum and classical jobs together using gang scheduling with affinity rules, and can allocate execution time slices across resources to facilitate pipelined execution. The present techniques can adapt execution and resource allocation based on real-time or near real-time execution metrics/telemetry data.

The described techniques provide a technical improvement by enabling efficient scheduling, execution, and error management in hybrid quantum-classical computing environments. The approaches described herein address the lack of standardized partitioning and hierarchical grouping by providing an application-level partitioning interface and multi-level grouping mechanism. The systems and methods described herein overcome the limitations of conventional scheduling by facilitating gang scheduling with affinity rules, cross-resource time slicing, and adaptive execution. The integration of error mitigation and multi-policy scheduling provides improved resource utilization, reduced idle time, and increased computational accuracy compared to conventional approaches.

Further aspects of the present disclosure are directed to approaches for applying quantum error resolution techniques for quantum operations executed according to the hybrid-allocation techniques described herein. As noted above, quantum computing systems can execute computational workloads using QPUs that operate in connection with classical computing resources. Quantum algorithms often require repeated execution of quantum circuits, measurement of quantum states, and iterative feedback between quantum and classical resources. In such hybrid quantum-classical environments, quantum operations are subject to various sources of error, including but not limited to qubit decoherence, gate infidelity, and readout noise. To address the inherent noise and instability of quantum hardware, conventional systems can apply error correction codes or error mitigation strategies to quantum computations.

Conventional approaches to error resolution in quantum computing present several limitations. Existing systems typically apply error correction or mitigation independently of scheduling and/or resource allocation for quantum processing jobs, often using manual approaches that are task specific. Quantum error correction codes are often selected statically, without regard to real-time QPU metrics and/or the specific requirements of the computational task. Error mitigation strategies, such as measurement error mitigation and/or zero-noise extrapolation, are generally applied as isolated post-processing steps and do not account for dynamic changes in hardware performance and/or error budgets across different job segments. As a result, existing approaches lead to reduced computational accuracy and increased execution time for hybrid quantum-classical processing jobs.

The techniques described herein address such challenges and provide a technical improvement over conventional approaches by automatically selecting among error resolution techniques as part of hierarchical quantum-classical scheduling. The systems and methods described herein implement adaptive error mitigation and correction approaches that are linked to the scheduling process and can involve dynamically selecting, allocating, and applying error resolution strategies according to real-time QPU metrics, job requirements, and/or hierarchical job grouping.

In one implementation, the systems and methods described herein can obtain calibration data, operational metrics, or historical error rates from one or more QPUs. This information can be used to generate or update error models for one or more QPUs. A suitable error resolution strategy can be selected among multiple error correction codes or mitigation strategies for each quantum operation (or set of quantum operations), using rule-based and/or probabilistic approaches. The selection of a suitable error resolution strategy can involve the use of QPU metrics, job metadata, and/or error budgets. During execution, the system can monitor performance and update error budgets and/or error resolution strategies in response to observed results or changes in hardware state. The system can update the hierarchical job representation to reflect the selected error resolution techniques and any dynamic changes to error allocation.

The described techniques provide a technical improvement by facilitating adaptive and resource-aware application of error resolution techniques in hybrid quantum-classical computing environments. The approaches described herein overcome the limitations of static, manual, and isolated error mitigation by linking error resolution to scheduling, resource allocation, and real-time system metrics. The use of error characterization, dynamic strategy selection, and hierarchical error budget management provides improved computational accuracy, reduced execution time, and more efficient use of quantum and classical resources compared to conventional approaches.

Referring now to FIG. 1, illustrated is a block diagram of a system 100 for implementing hierarchical quantum-classical scheduling in a hybrid quantum-classical computing environment. The system 100 can include a data processing system 105 and a distributed computing environment 120. The data processing system 105 can include a processing job obtainer 135, an operation determiner 140, a data structure generator 145, a job executor 150, a telemetry data obtainer 155, an error manager 160, and storage 115. The storage 115 can include/store/maintain processing jobs 170, classical tasks 172, quantum tasks 174, a hierarchical data structure 175, error correction techniques 180, and error mitigation techniques 185. The distributed computing environment 120 can include one or more classical computing systems 130A-130N (sometimes generally referred to herein as "classical system(s) 130" or "classical computing system(s) 130") and quantum systems 132A-132M (sometimes generally referred to herein as "quantum system(s) 132" or "quantum computing system(s) 132").

The data processing system 105 can include one or more processors and non-transitory memory (e.g., one or more processing circuits). The memory can store processor-executable instructions that, when executed by processor(s), cause the processor(s) to perform one or more of the operations described herein. The processor(s) may include a general-purpose processor (e.g., a central processing unit (CPU), etc.), an application-specific integrated circuit (ASIC), a graphics processing unit (GPU), a tensor processing unit (TPU), a field-programmable gate array (FPGA), the like, or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, application-specific integrated circuit, field-programmable gate array, read-only memory (ROM), random-access memory (RAM), electrically erasable programmable read-only memory (EEPROM), erasable programmable read-only memory (EPROM), flash memory, optical media, and/or any other suitable memory from which the processor(s) can read instructions and/or data. The instructions may include code from any suitable computer programming language. The data processing system 105 can include one or more computing devices or servers that can perform various functions as described herein. The data processing system 105 can include any or all of the components and perform any or all of the functions of any computing system described herein. The data processing system 105 may be implemented, for example, using the computing system 1000 of FIG. 10 or any other computing system described herein.

In brief overview of various operations described herein, the data processing system 105 can obtain a processing job for the distributed computing environment 120 including classical systems 130 and quantum systems 132. The data processing system 105 can determine, for the processing job 170, a set of classical computing operations (e.g., classical tasks 172) and a set of quantum computing operations (e.g., quantum tasks 174). The data processing system 105 can generate a hierarchical data structure 175 for the processing job based on the set of classical computing operations and the set of quantum computing operations. The data processing system 105 can allocate the set of classical computing operations to a subset of the classical systems 130 and the set of quantum computing operations to a subset of the quantum systems 132 according to a gang scheduler function.

The data processing system 105 can generate the hierarchical data structure to represent a processing schedule for the set of classical computing operations and the set of quantum computing operations. The data processing system 105 can execute the processing job according to the hierarchical data structure 175 via the allocated resources, for example, using time-slicing operations. In some implementations, the data processing system 105 can monitor execution of the processing job 170 allocated to the distributed computing environment 120, update the hierarchical data structure 175 in response to observed system metrics, intermediate results, and/or telemetry data, and dynamically re-allocate at least one of the set of classical computing operations or the set of quantum computing operations to a different subset of resources of the distributed computing environment 120. In some implementations, the data processing system 105 can manage the selection and execution of one or more error correction techniques 180 and error mitigation techniques 185 for one or more processing jobs.

The data processing system 105 can be included as part of the distributed computing environment 120. In some implementations, the data processing system 105 can be external to the distributed computing environment 120 and can communicate with the distributed computing environment 120 over a network connection. In some implementations, the data processing system 105 can be implemented as a cloud-based service, a dedicated orchestration node, or a remote management appliance. The data processing system 105 can communicate with classical systems 130 and/or quantum systems 132 using standard network protocols, remote procedure calls, or message-passing interfaces. For example, the data processing system 105 can use any type of suitable networking protocol, such as Transmission Control Protocol/Internet Protocol (TCP/IP), Remote Direct Memory Access (RDMA), or InfiniBand protocols, to exchange data with the distributed computing environment 120 and/or the classical systems 130 and/or quantum systems 132.

In some implementations, the data processing system 105 can establish secure communication channels with the distributed computing environment 120 and/or the classical systems 130 and/or quantum systems 132 using Transport Layer Security (TLS) or Secure Sockets Layer (SSL) protocols to transmit configuration data, telemetry, or control messages between the data processing system 105 and the distributed computing environment 120. Various application programming interfaces (APIs) may be used to perform such communications. For example, the data processing system 105 can use representational state transfer (REST) application programming interfaces (APIs), gRPC, or message queueing protocols such as Advanced Message Queuing Protocol (AMQP) or Message Queuing Telemetry Transport (MQTT) to transmit commands and/or receive status updates from the classical systems 130 and/or quantum systems 132.

The distributed computing environment 120 can include one or more classical systems 130 and one or more quantum systems 132. The distributed computing environment 120 can include various heterogeneous hardware resources that are available for executing computing operations, including classical systems 130 and quantum systems 132. The distributed computing environment 120 can include, for example, nodes or servers that include one or more classical systems 130 and/or quantum systems 132, clusters, or other types of computing devices. In some implementations, the distributed computing environment 120 may be or may be included as part of a data center. The distributed computing environment 120 can include any type of computing hardware resources with varying memory, bandwidth, processing capability, and network topology. The distributed computing environment 120 can provision resources and enable communication among one or more classical systems 130 and quantum systems 132. In some implementations, the distributed computing environment 120 can allocate classical systems 130 and quantum systems 132 for execution of partitioned hybrid quantum-classical jobs, and can facilitate pipelined execution, cross-resource time slicing, and resource sharing among the classical systems 130 and quantum systems 132.

In some implementations, the distributed computing environment 120 can include one or more classical systems 130 and one or more quantum systems 132, each of which can communicate with the data processing system 105 to facilitate orchestration of hybrid quantum-classical workloads. The distributed computing environment 120 can include interfaces that may be accessed by the data processing system 105 to transmit configuration data to the classical systems 130 and quantum systems 132, receive operational parameters, initiate assignment or reassignment of processing jobs, or monitor the state of the classical systems 130 and quantum systems 132. The interfaces can include application programming interfaces, command-line interfaces, or graphical user interfaces, for example, provided via web-based interfaces, among others. In some implementations, the data processing system 105 can use such interfaces to update resource assignments for the classical systems 130 and quantum systems 132, trigger partitioning or grouping of processing jobs, or initiate scheduling operations across the distributed computing environment 120.

The distributed computing environment 120 can include one or more classical systems 130, each of which can be an individual hardware resource such as a cluster, memory device, CPU, GPU, FPGA, ASIC, or a node or server that includes one or more CPUs, GPUs, FPGAs, and/or ASICs, among others. Each classical system 130A-130N can have one or more attributes, which may include memory size, bandwidth, processing capability, and/or other hardware characteristics. The classical systems 130 can be arranged in the distributed computing environment 120 such that each classical system 130 can communicate with other classical systems 130 and/or with one or more quantum systems 132, for example, to obtain measurement results, exchange intermediate data, or facilitate execution of hybrid quantum-classical workloads. In some implementations, the data processing system 105 may provision one or more classical systems 130 and/or one or more quantum systems 132 for coordinated execution of partitioned jobs 170 and/or allocate time slices for sequential and/or parallel operations based on job requirements and/or resource availability, as described in further detail herein.

The quantum systems 132A-132M can include one or more quantum processing units, quantum memory, and quantum communication interfaces. Each quantum processing unit can include a qubit array, a quantum gate array, and a quantum readout system. The quantum processing units can execute quantum instructions and/or quantum algorithms, for example, quantum gate operations, quantum measurements, or quantum state preparations. The quantum memory can store quantum states and/or intermediate results generated by the quantum processing units during execution of quantum instructions. The quantum communication interfaces can facilitate transmission and/or reception of quantum information, such as qubit measurements, between the quantum systems 132 and other computing systems, such as one or more classical systems 130A-130N, other quantum systems 132, or the data processing system 105. In some implementations, the quantum communication interfaces can include hardware and/or software components for interfacing with quantum-classical communication links or quantum interconnects. In some implementations, the quantum systems 132 can include quantum control electronics, such as microwave generators, digital-to-analog converters, analog-to-digital converters, and timing generators, to control quantum state manipulation and measurement operations. Any of the quantum systems 132 may be implemented using any of the components described in connection with FIG. 11.

The storage 115 can store processing jobs 170, classical tasks 172, quantum tasks 174, the hierarchical data structure 175, error correction techniques 180, and error mitigation techniques 185. The data processing system 105 can include or be in communication with the storage 115. The storage 115 can be a computer-readable memory that can store or maintain any of the information described herein. The storage 115 can maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein, via a network. In some implementations, the storage 115 can be internal to the data processing system 105.

In some implementations, the storage 115 can exist external to the data processing system 105 and may be accessed via a network. For example, the storage 115 may be distributed across many different computer systems (e.g., a cloud computing system) or storage elements and may be accessed via the network or a suitable computer bus interface. The data processing system 105 can store, in one or more regions of the memory of the data processing system 105, or in the storage 115, the results of any or all computations, determinations, selections, identifications, generations, constructions, or calculations in one or more data structures indexed or identified with appropriate values. Any or all values stored in the storage 115 may be accessed by any computing device described herein, such as the data processing system 105, to perform any of the functionalities or functions described herein. In implementations where the storage 115 forms a part of a cloud computing system, the storage 115 can be a distributed storage medium in a cloud computing system and can be accessed by any of the components of the data processing system 105 or any other computing devices described herein.

The processing jobs 170 can include data representing jobs to be executed by the distributed computing environment 120. Each processing job 170 can represent a discrete computational task or workload submitted for execution within the distributed computing environment 120. Each processing job 170 may be stored as a data record or object within storage 115, with fields or attributes describing job metadata, resource requirements, and/or execution parameters. In some implementations, each processing job 170 may include an identifier, a job type indicator specifying whether the job is quantum, classical, or hybrid, a priority level, and dependency information referencing other jobs or tasks. A processing job 170 may be created or submitted by external computing systems via application programming interfaces, remote procedure calls, or other programmatic interfaces, and may be removed from storage 115 upon completion or cancellation. In some implementations, processing jobs 170 may be processed according to the techniques described herein to reference associated classical tasks 172 and quantum tasks 174, with such associations maintained via identifiers or pointers stored in the respective data records.

A processing job 170 can include one or more instructions, functions, and/or operations to be performed by the distributed computing environment 120, as indicated in the job specification. Such instructions may specify algorithmic steps, computational kernels, circuit definitions, and/or data transformation operations, among others, that are to be executed using classical systems 130, quantum systems 132, and/or combinations thereof. In some implementations, the processing job 170 can include executable code segments, function references, or symbolic descriptions of operations to be interpreted and executed by designated resources. In some implementations, the processing job 170 can include parameters, constants, or configuration values required by such instructions to produce a desired computational output. The instructions and parameters can be represented in a structured format (e.g., JavaScript Object Notation (JSON), extensible markup language (XML), a binary schema, etc.) and stored as part of the processing job 170 data record in storage 115. The data processing system 105 and/or the distributed computing environment 120 can access and parse such instructions during job partitioning, scheduling, and execution, as described in further detail herein.

In some implementations, a processing job 170 can include data (or identifiers/pointers/references thereto) to be manipulated, transformed, or otherwise processed by the instructed operations. Such data may include numerical arrays, matrices, tensors, symbolic values, files, binary data, image data, video data, audio data, text strings, or any other input and/or intermediate representations required for execution of the processing job 170. The processing job 170 can include identifiers/pointers/references to one or more data locations in storage 115, external storage systems, and/or network-based data repositories, where the relevant input and/or output data is maintained. The job specification may identify the format, encoding, and/or schema of such data, as well as any constraints or required transformations to be applied prior to or after execution. Output data references included in the processing job 170 can specify where result data should be stored upon completion of the instructed operations, including intermediate results for dependent tasks. The inclusion of instructions, associated parameters, and explicit data references in a processing job 170 enables the data processing system 105 to coordinate task execution accurately across heterogeneous resources within the distributed computing environment 120.

In some implementations, the data structure for each processing job 170 may include references to input and output data locations, scheduling constraints, and affinity metadata for resource allocation. Each processing job 170 may be associated with one or more classical tasks 172 and/or quantum tasks 174, and such associations may be established or updated during job partitioning or scheduling. In some implementations, processing jobs 170 may be removed from storage 115 upon successful execution, failure, or explicit cancellation by an external system. The distributed computing environment 120 may process multiple processing jobs 170 concurrently, with each job independently referencing its associated tasks and dependencies.

In some implementations, the data processing system 105 may maintain a queue or list of processing jobs 170 awaiting execution, with job state transitions reflected in the corresponding data records in storage 115. The queue maintained by the data processing system 105 may be implemented as a priority queue, a round-robin queue, or a multi-level queue, among others, and may order processing jobs 170 based on one or more criteria such as job priority, submission time, and/or resource requirements. The data processing system 105 (e.g., the processing job obtainer 135) may insert a newly received processing job 170 into the queue according to a scheduling policy, and may remove a processing job 170 from the queue when the job is selected for execution. In some implementations, the queue may include references to processing jobs 170 in various states, such as pending, scheduled, or executing, and the data processing system 105 may update the state of each processing job 170 as the job progresses through the queue. The queue may facilitate dynamic reordering of processing jobs 170 in response to changes in system conditions or scheduling policies. In some implementations, the data processing system 105 may maintain multiple queues for different classes of processing jobs 170, such as separate queues for high-priority jobs and standard jobs, and may select processing jobs 170 from one or more queues for execution based on resource availability and scheduling constraints.

The classical tasks 172 can include data representing classical computing operations determined for the processing jobs 170. The classical tasks 172 can represent individual and/or grouped classical computing operations derived from the decomposition of processing jobs 170. Each classical task 172 can be stored in storage 115, and may include or be associated with an operation type, required computational resources such as a CPU, GPU, or memory device(s), and input/output data references. The classical tasks 172 can be associated with parent processing jobs 170 and can include dependency links to other classical tasks 172 or quantum tasks 174. In some implementations, the classical tasks 172 may be included in or represented as part of the hierarchical data structure 175. The classical tasks 172 can be created during job partitioning, updated during scheduling or execution, and marked as completed or failed upon termination, as described in further detail herein. In some implementations, the classical tasks 172 can include priority, execution constraints, and/or affinity metadata for use in connection with the various scheduling techniques described herein.

In some implementations, the classical tasks 172 can specify resource requirements at a granularity that enables allocation to particular classical systems 130A-130N. The classical tasks 172 can reference input or output data locations in storage 115 to facilitate data exchange between sequential or dependent operations. The classical tasks 172 can include metadata that may indicate scheduling constraints (e.g., earliest start time, deadline, affinity to a specific hardware resource, etc.). In some implementations, the classical tasks 172 can include or may be associated with references to job state and/or intermediate results generated by other tasks within the same processing job 170. Any of the components of the data processing system 105 can access the priority or affinity metadata in the classical tasks 172 to determine execution order or resource placement. The classical tasks 172 can be removed from storage 115 upon completion or explicit cancellation, as described herein.

Non-limiting examples of classical tasks 172 can include numerical simulation instructions for solving differential equations, matrix factorization operations, numerical optimization procedures including gradient descent, simulated annealing, and/or branch-and-bound methods, machine learning inference or training functions for machine learning models (e.g., neural networks, decision trees, and/or support vector machines), statistical analysis operations (e.g., regression analysis operations, hypothesis testing operations, principal component analysis operations, etc.), image processing functions (e.g., convolution, filtering, segmentation, etc.), cryptographic functions (e.g., encryption, decryption, hashing, digital signature verification, etc.) database query execution or indexing operations, natural language processing operations (e.g., tokenization, parsing, named entity extraction), graph processing operations (e.g., shortest path computation, centrality analysis, graph traversal, etc.) physics-based modeling operations for molecular dynamics or finite element analysis, data transformation tasks (e.g., sorting, joining, filtering, aggregation, etc.) rendering or visualization operations, compression or decompression operations, checksum/error detection-related operations, compilation or interpretation of code, packet routing and/or switching in network simulations, and emulation/simulation of quantum computational hardware, the like, or combinations thereof.

The quantum tasks 174 can represent quantum-specific computational operations identified during the partitioning of processing jobs 170. Each quantum task 174 can be stored in storage 115 as a data record or object that includes fields describing a quantum circuit definition, a required qubit count, QPU preferences, and expected execution characteristics. In some implementations, a quantum task 174 can reference a parent processing job 170 and can include dependency or sequencing information relative to one or more classical tasks 172. The quantum tasks 174 can include metadata specifying resource requirements such as QPU type, gate fidelity thresholds, or coherence time constraints. In some implementations, a quantum task 174 can include references to input and output data locations in storage 115 to facilitate data exchange with dependent or sequential operations. The quantum tasks 174 can be accessed by components of the data processing system 105 during scheduling, allocation, or execution procedures.

In some implementations, quantum tasks 174 can be created during job decomposition and can be updated based on scheduling decisions, error mitigation assignments, or changes in resource allocation. Each quantum task 174 can be marked as completed or failed after execution, with state transitions reflected in the corresponding data record in storage 115. The quantum tasks 174 can include error tolerance parameters, fidelity requirements, or affinity metadata to inform resource allocation and scheduling policies. In some implementations, a quantum task 174 can include references to job state or intermediate results generated by other quantum tasks 174 or classical tasks 172 within the same processing job 170. The quantum tasks 174 can be removed from storage 115 upon successful execution, failure, or explicit cancellation by an external system. The data processing system 105 can access and update quantum tasks 174 to facilitate dynamic adaptation of job grouping, error mitigation, or pipeline stages during execution.

Non-limiting examples of quantum tasks 174 can include preparation of specific quantum states (e.g., Bell states, Greenberger-Horne-Zeilinger (GHZ) states, cluster states, etc.), execution of quantum Fourier transform circuits, implementation of Shor's factoring algorithm, application of Grover's search algorithm, execution of variational quantum eigensolver (VQE) circuits, execution of quantum approximate optimization algorithm (QAOA) circuits, simulation of quantum many-body systems, application of quantum phase estimation routines, measurement of multi-qubit observables, implementation of quantum teleportation protocols, execution of amplitude amplification routines, preparation of stabilizer states, application of non-Clifford gates (e.g., T-gates, Toffoli gates, etc.), mapping of logical qubits to physical qubits using qubit routing algorithms, execution of error syndrome extraction circuits for quantum error correction, implementation of boson sampling or fermion sampling circuits, simulation of quantum chemistry molecular Hamiltonians, execution of quantum walk algorithms, generation of quantum random numbers from qubit measurements, application of quantum state tomography procedures, execution of entanglement swapping protocols, the like, or combinations thereof.

The hierarchical data structure 175 can include data representing the hierarchical organization of a processing jobs 170 and the classical tasks 172 and quantum tasks 174 thereof. The hierarchical data structure 175 can be stored as a data object or record in storage 115, and can encode multi-level relationships among processing jobs 170, classical tasks 172, and quantum tasks 174. In some implementations, the hierarchical data structure 175 can be implemented as a directed acyclic graph, a tree, and/or a nested schema, with nodes representing tasks (e.g., classical tasks 172, quantum tasks 174, etc.) and/or groupings of tasks. An example representation of groupings that may be included or represented in the hierarchical data structure is shown in FIG. 2. Each node/entry in the hierarchical data structure 175 can include or be associated with metadata such as resource requirements, execution priority, error budgets, and/or affinity constraints, and can reference associated tasks or jobs via identifiers or pointers to the corresponding data records in storage 115. In some implementations, the hierarchical data structure 175 need not be strictly "hierarchical," and may be or include one or more directed acyclic graph data structures representing processing schedules for one or more corresponding processing jobs 170.

The hierarchical data structure 175 can be accessed by the data processing system 105 and/or its components to determine/access the execution order, resource allocation, and/or dependency relationships among the constituent tasks, as described in further detail herein. In some implementations, the hierarchical data structure 175 can be generated by the data structure generator 145 during job partitioning and grouping, based on the set of classical computing operations and the set of quantum computing operations determined for a processing job 170. The hierarchical data structure 175 can be dynamically updated during scheduling or execution to reflect changes in resource allocation, dependencies, and/or execution state. In some implementations, the data processing system 105 (or the components thereof) can update the hierarchical data structure 175 in response to metrics, intermediate results, and/or telemetry data obtained during execution of a processing job 170, as described herein.

The hierarchical data structure 175 can encode changes to groupings, resource assignments, and/or dependency links among processing jobs 170, classical tasks 172, and quantum tasks 174. For example, a dependency link in the hierarchical data structure 175 can be updated to reflect that a quantum task 174 assigned to a first quantum processing unit must complete before a classical task 172 assigned to a specific graphics processing unit can begin execution. In some implementations, a grouping in the hierarchical data structure 175 can be modified to reassign a set of quantum tasks 174 from one estimator group node to another estimator group node in response to a change in resource availability or job priority. In some implementations, the hierarchical data structure 175 can be updated to facilitate dynamic re-allocation of classical or quantum computing operations to different subsets of resources (e.g., classical systems 130, quantum systems 132, etc.) in the distributed computing environment 120, for example, as described in connection with FIGS. 5 and 6. The data structure generator 145 and/or the telemetry data obtainer 155 can access and update the hierarchical data structure 175 to maintain a representation of the current execution state. The hierarchical data structure 175 can be removed from storage 115 upon completion, failure, or explicit cancellation of the associated processing job 170.

The hierarchical data structure 175 can enable the scheduler and orchestrator to allocate resources, manage dependencies, and coordinate pipelined execution across heterogeneous resources. In some implementations, the hierarchical data structure 175 can encode a directed graph in which nodes represent groupings such as an overall job, quantum and classical jobs, resource-specific jobs, estimator groups, and shot groups, and edges represent dependency relationships among the nodes. For example, a directed graph representation can include an overall job node with child nodes for quantum tasks 174 and classical tasks 172, with each child node branching into resource-specific job nodes and further into estimator group nodes or shot group nodes. Each node can reference associated data records in storage 115 via identifiers or pointers, and can include metadata fields such as resource requirements, execution priority, error budgets, and affinity constraints. The hierarchical data structure 175 can be accessed by the job executor 150, and/or other components of the data processing system 105 to determine scheduling order and resource placement for tasks.

The error correction techniques 180 can include data records that describe quantum error correction codes or protocols that may be applied to quantum tasks 174 within processing jobs 170. Each entry in the error correction techniques 180 can include a technique identifier, an indication of one or more applicable quantum processing unit types, one or more code parameters (e.g., code distance, one or more operational constraints, etc.), and instructions or parameters that may direct the implementation of the correction code or protocol for a quantum task 174. In some implementations, the error correction techniques 180 can be selected or assigned based on job requirements, quantum processing unit characteristics, and/or error budgets specified in the hierarchical data structure 175, as described in further detail herein.

In some implementations, the error correction techniques 180 can be accessed by the data processing system 105 or by any component thereof to determine or update an error correction approach for a quantum task 174, including by applying instructions or parameters that specify how a correction code is to be executed. For example, the data processing system 105 can select one or more of a surface code, a repetition code, or a concatenated code, among others, based on qubit count, gate fidelity, or coherence time parameters associated with a quantum processing unit, as described in further detail in connection with the error manager 160. Updates to selected error correction techniques 180 can be applied in response to changes in quantum processing unit calibration data and/or system configuration, for example, when new calibration data indicates a change in qubit error rates or when a quantum processing unit is reconfigured to perform a quantum task 174 with a different number of physical qubits, as described herein.

The error mitigation techniques 185 can include data records or instructions that describe quantum error mitigation strategies such as measurement error mitigation, zero-noise extrapolation, and/or classical post-processing approaches applicable to one or more quantum tasks 174 of processing jobs 170. The error mitigation techniques 185 can include instructions or parameters for implementing corresponding mitigation strategies for a quantum task 174. Each entry in the error mitigation techniques 185 can include a technique identifier, an indication of applicable quantum task types, one or more operational parameters, one or more resource requirements, and implementation instructions or parameters that specify how the mitigation strategy is to be executed.

In some implementations, and as described in connection with the error manager 160, the error mitigation techniques 185 can be selected or assigned based on job metadata, error budget, and/or a number of qubits assigned to a corresponding quantum task 174. The error mitigation techniques 185 can be stored in storage 115 and can be accessed by the data processing system 105 (or the components thereof), or the error manager 160 during execution of quantum tasks 174 and/or during generation of processing schedules. In some implementations, the error manager 160 can access one or more error mitigation techniques 185 to determine which mitigation strategy to apply to a quantum task 174.

In some implementations, error mitigation techniques 185 selected/assigned to one or more quantum tasks 174 can be updated or replaced in response to changes in calibration data or observed error rates for a quantum system 132 and/or a quantum processing unit thereof. In some implementations, the error mitigation techniques 185 can be replaced when observed error rates for a quantum processing unit indicate that an alternative mitigation strategy provides improved performance for the quantum tasks 174 associated with a processing job 170. The error mitigation techniques 185 can be selected or reselected based on the most recent calibration data and/or error rate measurements obtained from the quantum system 132, and the selection can involve updating parameters or implementation instructions associated with the error mitigation technique 185 to correspond to the operational characteristics of the quantum processing unit, as described in further detail herein.

Referring now to the operations of the data processing system 105, the processing job obtainer 135 can obtain a processing job 170 for the distributed computing environment 120 including the classical systems 130 and the quantum systems 132. The processing job obtainer 135 can include software, hardware, or combinations thereof. The processing job obtainer 135 can receive job submission requests via application programming interface (API) endpoints, inter-process communication, and/or requests from client devices, other devices within the distributed computing environment 120, or computing systems. In one example, the processing job obtainer 135 can receive job specifications for processing jobs 170 in a standardized format (e.g., a job description language, predetermined schema, etc.), which may include resource requirements, dependency information, and/or execution priorities for one or more tasks involving the processing job 170.

In some implementations, the processing job obtainer 135 can update a job queue maintained by the data processing system 105 to insert the processing job 170 in accordance with scheduling configurations and/or resource availability of the distributed computing environment 120. The processing job obtainer 135 can determine a position for the processing job 170 within the job queue based on one or more scheduling policies, such as priority-based, fairness-based, deadline-aware, or resource-aware adaptive scheduling. The processing job obtainer 135 can access metadata associated with the processing job 170, including resource requirements, priority, and dependency information, to select an insertion point in the job queue. In some implementations, the processing job obtainer 135 can receive real-time resource availability data from the distributed computing environment 120 and adjust the job queue to reflect current system conditions.

In some implementations, the processing job obtainer 135 can assign a priority score to a processing job 170 based on metadata contained in the job specification, such as a supplied priority level, deadline constraints, and/or an estimated execution duration, among others. The processing job obtainer 135 can extract a priority indicator and any associated timing parameters from the job specification and map the extracted data to a numerical and/or categorical score using a predetermined priority mapping function stored in association with the processing job obtainer 135. The predetermined priority mapping function can apply weighted factors to different metadata fields, for example, assigning greater weight to deadline parameters than to user-supplied priority levels in order to reflect real-time urgency more accurately.

In some implementations, the processing job obtainer 135 can further adjust the priority score in accordance with system-level scheduling policies, such as user tier, job class, historical resource usage, and/or service-level agreement parameters, among others, by accessing policy configuration data stored in a policy data repository accessible to the processing job obtainer 135. For example, the processing job obtainer 135 can increase the priority score for a job with an imminent deadline (e.g., specified in the job specification, etc.) when processor idle time is detected, or reduce the priority score for a non-urgent job (e.g., as specified in the job specification, etc.) when high contention for resources is identified.

The processing job obtainer 135 can update the ordering of processing jobs 170 in the job queue in response to changes in scheduling configurations or detected changes in the availability of classical systems 130 and quantum systems 132, as described in connection with the techniques described herein. For example, the processing job obtainer 135 can reorder processing jobs 170 to prioritize jobs with higher priority scores when a scheduling configuration specifies priority-based scheduling. In some implementations, the processing job obtainer 135 can move a processing job 170 to an earlier position in the job queue when additional classical systems 130 become available, such as when a CPU or GPU completes a prior task. The processing job obtainer 135 can shift a processing job 170 to a later position in the job queue when a required quantum system 132 is detected as unavailable due to maintenance or resource contention. In some implementations, the processing job obtainer 135 can update the job queue to group processing jobs 170 with similar resource requirements together when a scheduling configuration specifies affinity-based scheduling. The processing job obtainer 135 can update the ordering of processing jobs 170 in the job queue to reflect deadline-aware scheduling by moving jobs with earlier deadlines to higher-priority positions in the queue.

In some implementations, the processing job obtainer 135 can assign each received job a unique identifier and associate the job with metadata extracted from the job specification, such as required or requested qubit count, preferred quantum processing unit attributes, and/or classical resource constraints or accelerator assignments (e.g., GPUs, FPGAs, TPUs, etc.). In some implementations, the processing job obtainer 135 can maintain state information for each job in the queue, including pending, scheduled, or executing status, and can update this state in response to resource allocation decisions or job progress, as described in further detail herein, the processing job obtainer 135 can provide job queue status or job metadata to other components of the data processing system 105 to perform any of the operations described in further detail herein.

Once a processing job 170 is received, enqueued for processing, or otherwise obtained by the data processing system 105, the operation determiner 140 can determine, for the processing job, a set of classical computing operations (shown here as classical tasks 172) and a set of quantum computing operations (shown here as quantum tasks 174). The operation determiner 140 can include hardware, software, or combinations thereof. The operation determiner 140 can parse the job specification associated with the processing job 170 to identify discrete computational tasks to be executed within the distributed computing environment 120. The operation determiner 140 can classify each identified task as either a classical task 172 or a quantum task 174 based on resource indicators, algorithm descriptors, and/or execution profiles specified in the job metadata. For example, the operation determiner 140 can parse fields in the job specification that indicate algorithm type, input data format, and/or circuit definition to determine a suitable appropriate classification. In one example, the operation determiner 140 can apply predetermined classification rules that map algorithm identifiers and/or requested computational elements to a task type designation. In some implementations, the tasks may be designated as classical computing tasks 172 or quantum tasks 174 in the processing job 170 specification.

The operation determiner 140 can generate the classical tasks 172 and quantum tasks 174 by augmenting the extracted data from a processing job 170 with specific resource requirements, dependency relationships, and/or execution constraints derived from the job specification. For each classical task 172, the operation determiner 140 can identify CPU, GPU, memory, and/or bandwidth requirements, as well as any affinity constraints for particular classical systems 130A-130N. For each quantum task 174, the operation determiner 140 can determine qubit count requirements, QPU type preferences, and/or coherence time limits applicable to quantum systems 132A-132M. The operation determiner 140 can establish explicit dependency links between tasks when execution order is dictated by data flow or algorithmic constraints, including links between quantum tasks 174 and classical tasks 172. Execution constraints such as deadlines, start times, and fidelity thresholds can be assigned to individual tasks based on job metadata and associated policy data. The classical tasks 172 and the quantum tasks 174 can be stored as a structured data set (e.g., a list) representing the full set of operations for the processing job 170. The operation determiner 140 can output the structured representation of the task set with each task associated with a unique identifier, descriptive metadata, and/or references to dependent tasks. In some implementations, the structured representation can be formatted as an intermediate data structure accessible to the data structure generator 145 for hierarchical grouping.

The data structure generator 145 can generate a hierarchical data structure 175 for the processing job based on the set of classical tasks 172 and the set of quantum tasks 174. The data structure generator 145 can generate the hierarchical data structure 175 to encode/represent multi-level relationships (e.g., dependency relationships) among the classical tasks 172 and the quantum tasks 174 determined by the operation determiner 140. The hierarchical data structure 175 may be implemented as a directed acyclic graph, a tree, and/or a nested schema. The data structure generator 145 can assign/generate metadata fields to each node in the hierarchical data structure 175, including resource requirements, execution priority, error budgets, and/or affinity constraints. Each node can be linked to its corresponding task record in storage 115 by an identifier or pointer to enable direct access to task metadata and execution parameters. The data structure generator 145 can encode dependency edges between nodes to reflect execution order (e.g., a processing schedule/order) and/or data flow relationships (e.g., how the resulting output of a task may be provided as input to another task).

The data structure generator 145 can associate classical tasks 172 and quantum tasks 174 with corresponding nodes in the hierarchical data structure 175. The data structure generator 145 can identify dependencies between tasks by analyzing job metadata, resource requirements, and explicit dependency annotations included in the job specification. The data structure generator 145 can determine that a quantum task must precede a classical task by detecting a dependency indicator that references the output of the quantum task as an input to the classical task. The data structure generator 145 can generate an edge from the quantum task node to the classical task node to represent the required execution order imposed by the dependency. In some implementations, the data structure generator 145 can further identify indirect scheduling constraints by parsing affinity metadata or execution order constraints that are not dictated by direct data flow.

The data structure generator 145 can generate an edge between two nodes to encode a resource affinity, such as a requirement that both tasks execute on the same quantum processing unit or classical node, or to enforce a required execution order specified in the job metadata. Each generated edge can be annotated with metadata describing the type of dependency or constraint, enabling the data structure generator 145 to construct a directed graph that encodes both computational and scheduling relationships among tasks. In one example, a quantum task 174 node may be connected to a classical task 172 node to indicate that the quantum operation must complete before the classical operation can commence. The data structure generator 145 can include metadata in each node's representation to indicate associated system resources, such as specific CPUs, GPUs, or QPUs. The hierarchical data structure 175 can be updated in response to scheduling decisions that alter resource assignments and/or execution order as described in further detail herein.

Updates may include adding, removing, or reassigning classical tasks 172 and/or quantum tasks 174 in the hierarchical data structure 175, and regenerating dependency edges among nodes to maintain a valid execution sequence. The data structure generator 145 can generate new nodes for additional classical tasks 172 or quantum tasks 174, remove nodes corresponding to completed or canceled tasks, and/or update parent-child relationships among nodes to reflect reassignment of tasks to different groupings. In some implementations, the data structure generator 145 can update edge connections between nodes to encode revised execution order or modified dependencies resulting from task addition, removal, or reassignment. The data structure generator 145 can update metadata fields in affected nodes to reflect new resource assignments, execution priorities, or affinity constraints. In some implementations, the data structure generator 145 can propagate changes throughout the hierarchical data structure 175 to ensure that all dependency edges and groupings remain consistent with the updated execution plan. The data structure generator 145 can retain the updated hierarchical data structure 175 for access by the job executor 150 and other components of the data processing system 105.

In some implementations, the data structure generator 145 can update the hierarchical data structure 175 in response to changes in observed execution metrics obtained from the telemetry data obtainer 155, as described herein. Such updates may reflect changes in hardware availability, performance fluctuations, or error rate variations from quantum systems 132 or classical systems 130. The data structure generator 145 can reassign nodes to different parent groupings, adjust execution priorities, or modify affinity metadata to adapt to the updated conditions. Dependency edges can be recalculated to accommodate new execution paths, parallelization opportunities, or failure recovery scenarios. The hierarchical data structure 175 can be propagated to the job executor 150 for subsequent execution according to the updated representation. The data structure generator 145 can retain a current version of the hierarchical data structure 175 in storage 115 for reference by other components of the data processing system 105.

The data structure generator 145 can generate the hierarchical data structure 175 as a directed graph data structure. In such an implementation, the data structure generator 145 can instantiate the hierarchical data structure 175 as a directed graph with nodes representing job groupings and edges encoding dependencies among the groupings. Each node can correspond to a logical grouping such as an overall job, a quantum job, a classical job, a resource-specific job, an estimator group, or a shot group. The directed graph structure can enable traversal for purposes of scheduling, dependency resolution, and resource allocation across classical systems 130 and quantum systems 132. The directed graph representation may be maintained in volatile memory for real-time execution control or committed to persistent storage for recovery purposes. Each node in the directed graph can include identifiers or pointers to associated tasks along with node-specific metadata. The directed graph representation can support updates to both node attributes and edge relationships during execution of the processing job 170. For example, the data structure generator 145 can update a node attribute to reflect a change in resource allocation and/or modify an edge to remove an obsolete dependency. During execution, traversal algorithms can make use of the directed graph to determine which tasks are eligible for scheduling based on satisfied dependencies.

The data structure generator 145 can apply affinity rules during schedule generation. Such rules may include, but are not limited to, co-locating multiple estimator groups (e.g., estimator quantum tasks 174, etc.) on the same quantum system 132, scheduling estimator groups on the same type of quantum system 132, and/or co-locating quantum tasks 174 and classical tasks 172 on the same quantum-classical unit (e.g., hybrid classical quantum computing system 1000 of FIG. 10, etc.) within the distributed computing environment 120. In some implementations, the gang scheduler function can match classical tasks 172 and quantum tasks 174 to available classical systems 130 and quantum systems 132 based on resource requirements and affinity rules, and can identify pipelining opportunities for sequentially dependent classical tasks 172 and quantum tasks 174, as described in further detail herein.

The data structure generator 145 can encode execution order, resource assignments, and dependency relationships in nodes and edges of the hierarchical data structure 175.

The data structure generator 145 can generate a directed acyclic graph in which each node represents a discrete scheduling unit such as a quantum task 174, a classical task 172, a resource-specific job represented by an assignment to a quantum system 132 or a classical system 130, or an estimator group encoded as a grouping node within the hierarchical data structure 175, and each edge encodes a dependency or execution order constraint between nodes. The data structure generator 145 can assign resource identifiers to nodes to indicate allocation to a QPU included in a quantum system 132, a CPU included in a classical system 130, a GPU included in a classical system 130, and/or an accelerator (e.g., FPGA, TPU) included in a classical system 130. In some implementations, the data structure generator 145 can generate edges between nodes to indicate that completion of a quantum task 174 node is required before initiation of a dependent classical task 172 node. The data structure generator 145 can encode group-level metadata such as priority or error tolerance in node attributes and update edge relationships to reflect changes in execution order or resource allocation. The hierarchical data structure 175 can be accessed by the job executor 150 to determine scheduling sequence and resource placement for each quantum task 174, classical task 172, or resource-specific job assigned to a quantum system 132 or classical system 130.

The hierarchical data structure 175 can include nodes or entries corresponding to discrete scheduling units, with each node corresponding to either a classical task 172 or a quantum task 174 and associating relevant scheduling metadata such as resource requirements, priority, and execution constraints. The data structure generator 145 can encode both inter-task dependencies and group-level scheduling information, allowing the processing schedule to be traversed or updated as execution progresses. In some implementations, the nodes in the hierarchical data structure 175 can represent job-level, resource-specific, estimator group, or shot group scheduling units, with each level reflecting the structure of the hybrid workload. The data structure generator 145 can assign affinity metadata to nodes to indicate co-location or resource-type constraints, and can encode pipelining relationships as directed edges between dependent classical tasks 172 and quantum tasks 174. The data structure generator 145 can update the scheduling metadata in the hierarchical data structure 175 to reflect optimization decisions based on performance metrics and affinity constraints, as described in further detail herein.

The data structure generator 145 may update the hierarchical data structure 175 in response to changes in resource availability within the distributed computing environment 120, job progress for processing jobs 170, or scheduling policy, with updates reflected in the structure's nodes and edges to maintain an accurate processing schedule. In some implementations, the data structure generator 145 can modify resource assignments, dependency links, or affinity metadata in the hierarchical data structure 175 to reflect newly available classical systems 130 and/or quantum systems 132, or changes in the state of processing jobs 170. The data structure generator 145 can propagate updates throughout the hierarchical data structure 175 to maintain consistency in execution order and resource allocation for classical tasks 172 and quantum tasks 174. In some implementations, the data structure generator 145 can recalculate pipelining relationships or reassign estimator groups to different quantum systems 132 in response to observed system metrics or policy changes, as described in further detail herein.

In some implementations, the data structure generator 145 can generate the hierarchical data structure 175 for the processing job 170 based on a set of priority scores generated for the set of classical tasks 172 and the set of quantum tasks 174. The data structure generator 145 can receive or compute a priority score for each classical task 172 and each quantum task 174, and can use the priority scores to influence the grouping, ordering, and metadata of nodes within the hierarchical data structure 175. In some implementations, the data structure generator 145 can group or order higher-priority classical tasks 172 and quantum tasks 174 to receive preferential scheduling and resource allocation within the hierarchical data structure 175. The hierarchical data structure 175 generated by the data structure generator 145 can reflect the priority-based grouping and ordering of classical tasks 172 and quantum tasks 174, which can facilitate efficient execution of high-priority workloads by the job executor 150.

The hierarchical data structure 175, which can represent computational tasks of and a schedule for executing a processing job 170, can be used to coordinate execution of the processing job 170 via the distributed computing environment. To do so, the data processing system 105 can execute the job executor 150. The job executor 150 can include software, hardware, or combinations thereof. The job executor 150 may execute the processing job 170 according to the processing schedule represented in the hierarchical data structure 175 using a subset of the classical systems 130 and a subset of the quantum systems 132. The job executor 150 may receive the hierarchical data structure 175 from the data structure generator 145 and access nodes within the hierarchical data structure 175 to determine the set of tasks, resource assignments, and execution order for the processing job 170. In some implementations, the job executor 150 may evaluate the readiness of the distributed computing environment 120 by determining whether the required subset of the classical systems 130 and the required subset of the quantum systems 132 are available and meet the resource requirements specified in the hierarchical data structure 175. The job executor 150 may begin execution of the processing job 170 when the hierarchical data structure 175 indicates that all dependencies for an initial set of tasks are satisfied and the corresponding resources are available. In some implementations, the job executor 150 may delay execution until prerequisite tasks or data dependencies have been completed by other components of the distributed computing environment 120. The job executor 150 may update internal state to reflect the commencement of execution for each task as indicated by the hierarchical data structure 175.

The job executor 150 may access the distributed computing environment 120 to allocate and initiate execution of tasks by transmitting data and/or instructions to the selected subset of the classical systems 130 and the selected subset of the quantum systems 132. The job executor 150 may provide each classical system 130 with input data, executable code segments, and configuration parameters required to perform a designated classical task, such as a numerical simulation, matrix computation, or machine learning inference operation. The job executor 150 may transmit quantum circuit definitions, qubit allocation instructions, and execution parameters to a quantum system 132 for execution of a quantum task. In some implementations, the job executor 150 may coordinate the transfer of intermediate results between classical systems 130 and quantum systems 132, for example, by providing measurement outcomes from a quantum system 132 to a classical system 130 for post-processing and/or by supplying classical optimization parameters (e.g., as indicated in a corresponding classical task 172 and/or the hierarchical data structure 175) to a quantum system 132 for iterative circuit updates. In some implementations, the job executor 150 may update the hierarchical data structure 175 to reflect the current allocation and execution status of each task within the distributed computing environment 120, as described in connection with FIGS. 5 and 6.

The job executor 150 can apply a gang scheduler function to allocate interdependent classical computing operations and quantum computing operations to corresponding subsets of classical systems 130 and quantum systems 132. The gang scheduler function can access the hierarchical data structure 175 to identify classical tasks 172 and quantum tasks 174 and can determine resource assignments for each task based on dependency relationships, resource requirements, and affinity constraints encoded in the hierarchical data structure 175. For example, the gang scheduler function can traverse the hierarchical data structure 175 to extract nodes corresponding to classical tasks 172 and quantum tasks 174, and can evaluate dependency links between nodes to determine execution order and inter-task dependencies (e.g., the processing schedule).

The gang scheduler function can access metadata fields in each node of the hierarchical data structure 175, which encodes a dependency graph, to retrieve resource requirements such as processor type, qubit count, memory, or bandwidth for each classical task 172 and quantum task 174. The gang scheduler function can evaluate affinity constraints represented in the hierarchical data structure 175, for example, requirements for co-location of estimator groups on the same quantum processing unit, or assignment of dependent classical tasks 172 to classical systems 130 associated with a particular quantum system 132. The gang scheduler function can apply resource matching algorithms to the hierarchical data structure 175 to assign each classical task 172 and quantum task 174 to a selected resource instance in the distributed computing environment 120. In some implementations, the gang scheduler function can update the hierarchical data structure 175 to reflect resource assignments and execution order for each task based on the evaluated dependencies, resource requirements, and affinity constraints.

In some implementations, the gang scheduler function can identify pipelining opportunities by traversing the dependency graph encoded in the hierarchical data structure 175 and detecting sequences of classical tasks 172 and quantum tasks 174 that can be executed in overlapping time intervals. The gang scheduler function can allocate resources to enable concurrent or staggered execution of interdependent tasks, minimizing idle time across the distributed computing environment 120. The gang scheduler function can adjust resource assignments to optimize load balancing and resource utilization, taking into account observed system performance and job progress. In some implementations, the gang scheduler function can enforce affinity rules to co-locate related tasks on the same hardware or to schedule dependent classical tasks on low-latency nodes linked to the assigned quantum system 132. The gang scheduler function can propagate updated scheduling decisions through the hierarchical data structure 175 to maintain consistency in execution order and resource placement. The job executor 150 can access the updated hierarchical data structure 175 to initiate execution of classical tasks 172 and quantum tasks 174 according to the gang scheduler function's assignments.

The job executor 150 may execute the tasks of the processing job 170 according to the processing schedule represented in the hierarchical data structure 175 by allocating time slices to a subset of the classical systems 130 and a subset of the quantum systems 132. The job executor 150 may determine, for each task node in the hierarchical data structure 175, a corresponding execution window based on resource requirements, group-level scheduling metadata, and inter-task dependencies. The job executor 150 may assign fine-grained configurable time slots to QPUs included in the quantum systems 132 and/or CPUs, GPUs, FPGAs, or other accelerators included in the classical systems 130, and may synchronize the allocation of such time slots across different tasks and/or groups thereof of the hierarchical data structure 175.

In some implementations, the job executor 150 may coordinate the execution of sequentially dependent quantum tasks 174 and classical tasks 172 by aligning time slices to facilitate pipelined execution across the quantum systems 132 and the classical systems 130. For example, the job executor 150 may assign a quantum task 174 to a quantum system 132 for circuit execution and, upon completion, allocate a subsequent time slice on a classical system 130 to execute a dependent classical task 172 that consumes the quantum measurement results (e.g., post-processing, error correction, etc.). The job executor 150 may update the allocation of time slices in response to observed job progress, priority, and/or resource usage. In some implementations, the job executor 150 may enable cross-job sharing of resources by distributing time slices among multiple processing jobs 170 scheduled for execution in the distributed computing environment 120. For example, the job executor 150 may allocate alternating time slices on a QPU to a first processing job 170 and a second processing job 170, or may interleave execution windows for classical tasks of different processing jobs 170 across available classical systems 130.

The job executor 150 may monitor execution of the processing job 170 via the distributed computing environment 120 by accessing execution state information for each classical task 172 and quantum task 174 assigned to the classical systems 130 and quantum systems 132. The job executor 150 may determine, for each task, whether the assigned resource has completed execution, remains in progress, or is awaiting a dependency. The job executor 150 may access intermediate results or progress indicators generated by the classical systems 130 and quantum systems 132 to determine the current execution status of each node in the hierarchical data structure 175. For example, the job executor 150 may access a completion flag generated by a quantum system 132 for a quantum task 174 or a progress counter output by a classical system 130 for a classical task 172. In some implementations, the job executor 150 may access a dependency status indicator associated with a node in the hierarchical data structure 175 to determine whether a prerequisite task has completed.

In some implementations, the job executor 150 may compare observed execution progress to expected execution order encoded in the hierarchical data structure 175 to detect changes in task readiness or completion. The job executor 150 may identify tasks that have satisfied all dependencies and are eligible for scheduling on available resources. The job executor 150 may update the hierarchical data structure 175 in response to the monitoring by modifying node attributes, dependency links, and/or group assignments for classical tasks 172 and quantum tasks 174. The job executor 150 may update a node in the hierarchical data structure 175 for a processing job 170 to indicate that a task has completed, failed, or is ready for execution based on the observed execution state. In some implementations, the job executor 150 may update dependency edges between nodes to reflect that a prerequisite task has completed, thereby enabling dependent tasks to proceed. The job executor 150 may adjust group-level metadata, such as execution priority or resource assignment, in the hierarchical data structure 175 to reflect changes in resource availability or execution progress.

The job executor 150 may dynamically re-allocate, based on the updated hierarchical data structure 175, at least one of the set of classical tasks 172 to a second subset of the classical systems 130, for example, by evaluating resource availability and execution state. The job executor 150 may identify a classical task 172 that remains pending or in progress on a first classical system 130 and determine that a second classical system 130 has become available or offers improved execution characteristics (e.g., increased available memory, lower current load, higher processor speed, or proximity to required data, among others). The job executor 150 may update the hierarchical data structure 175 to assign the identified classical task 172 to the second classical system 130.

The job executor 150 may initiate migration or re-execution of the classical task 172 on the second classical system 130 as required to maintain job progress. The job executor 150 may update internal state data and/or the hierarchical data structure 175 to reflect the new allocation of classical computing operations within the distributed computing environment 120. In some implementations, to migrate a classical task 172 between classical systems 130, the job executor 150 may transfer (or provide instructions to transfer) input data and any intermediate results associated with the classical task 172 from a first classical system 130 to a second classical system 130 prior to resuming execution. In some implementations, the job executor 150 may suspend execution of the classical task 172 on the first classical system 130, capture the current execution state, and resume execution from the captured state on the second classical system 130.

In some implementations, the job executor 150 may determine that multiple classical tasks 172 assigned to a first subset of the classical systems 130 are to be re-allocated to a second subset of the classical systems 130 to optimize load balancing or resource utilization. The job executor 150 may update the hierarchical data structure 175 to reassign the affected classical tasks 172 to the selected classical systems 130, modifying group assignments and resource identifiers as needed. In some implementations, the job executor 150 may coordinate the transfer of any input data and/or intermediate results to the new assignments for classical systems 130. The job executor 150 may initiate execution of the re-allocated classical tasks 172 on the second subset of the classical systems 130 according to the updated hierarchical data structure 175. The job executor 150 may retain the updated hierarchical data structure 175 for use in ongoing scheduling and execution operations.

The job executor 150 can access the hierarchical data structure 175 to identify completed classical tasks 172 and quantum tasks 174 associated with the processing job 170. The job executor 150 can determine, for each classical task 172, an output data reference that specifies a memory location or storage address in the storage 115 for intermediate or final results. In one example, the job executor 150 can retrieve the output data generated by each classical task 172 and quantum task 174, and can aggregate the retrieved data according to the dependency relationships and groupings encoded in the hierarchical data structure 175 to generate a set of results for the processing job 170. In some implementations, the job executor 150 can perform data aggregation by concatenating, merging, or executing one or more aggregation functions using the output results of multiple classical tasks 172 and quantum tasks 174, based on the execution schedule specified for the processing job 170.

In some implementations, one or more classical systems 130 can execute a designated classical task 172 to aggregate output results from a plurality of quantum tasks 174 and/or other classical tasks 172 associated with the processing job 170. The classical system 130 can access the output data references for each relevant task and retrieve the corresponding result data from the storage 115. The classical system 130 can generate output data for the processing job 170 by performing one or more aggregation operations as specified in the processing job 170 (e.g., as instructions, function definitions, etc.) and/or the hierarchical data structure 175.

The output data can include the results of the processing job 170. In some implementations, the job executor 150 may store the output data in the storage 115, where the output data can be accessed by other components of the data processing system 105 or by external systems. In some implementations, the job executor 150 may provide the output data for storage in one or more repositories or network-based storage systems, such as cloud storage systems, distributed file systems, or object storage services, among others. In some implementations, the job executor 150 may provide the output data to a device or system that submitted the processing job 170, for example, as part of a response to an API request, where the response may include an identifier or location specifying where the results are stored (e.g., a uniform resource locator, a storage bucket identifier, or a database key, among others).

The data processing system 105 may implement quantum error resolution strategies as part of executing a processing job 170. In some implementations, certain quantum tasks 172 may be dynamically assigned different types of error resolution strategies based on error budget and/or capabilities of quantum systems 132 to which quantum tasks 174 are assigned. For example, the data processing system 105 may select an error resolution strategy for a quantum task 174 by evaluating the error budget allocated to the quantum task 174 and by determining resource-specific constraints such as qubit coherence time, gate fidelity, and/or available quantum error resolution techniques. In some implementations, the data processing system 105 may assign a quantum error correction technique 180, an error mitigation technique 185, or a combination thereof to one or more quantum task 174, as described in further detail herein. The data processing system 105 may update the hierarchical data structure 175 to associate the selected error resolution strategy with the corresponding quantum task 174 and may adjust the assignment in response to changes in system metrics or error budgets during execution of the processing job 170.

Referring now to FIG. 1, illustrated is a block diagram of a system 100 for implementing hierarchical quantum-classical scheduling in a hybrid quantum-classical computing environment. The system 100 can include a data processing system 105 and a distributed computing environment 120. The data processing system 105 can include a processing job obtainer 135, an operation determiner 140, a data structure generator 145, a job executor 150, a telemetry data obtainer 155, an error manager 160, and storage 115. The storage 115 can include processing jobs 170, classical tasks 172, quantum tasks 174, a hierarchical data structure 175, error correction techniques 180, and error mitigation techniques 185. The distributed computing environment 120 can include classical systems 130 and quantum systems 132.

The system 100 can implement hierarchical quantum-classical scheduling by coordinating computation across the data processing system 105 and the distributed computing environment 120.

The data processing system 105 can include one or more processors coupled to non-transitory memory. The data processing system 105 can obtain, from the distributed computing environment 120 comprising at least one classical system 130 and at least one quantum system 132, telemetry data corresponding to a processing job. The data processing system 105 can determine, based on the telemetry data, that an error resolution technique is to be applied to a quantum portion of the processing job. The data processing system 105 can select, for the quantum portion of the processing job, the error resolution technique from a plurality of error correction techniques 180 and a plurality of error mitigation techniques 185. The data processing system 105 can update a hierarchical data structure 175 representing the processing job to include the error resolution technique in association with the quantum portion of the processing job.

To implement the error correction techniques 180 and/or error mitigation techniques 185 (collectively referred to as error resolution techniques), the data processing system 105 can execute the error manager 160. The error manager 160 may be used to automatically determine how to apply error resolution techniques to the outputs of quantum tasks 174. In some implementations, such techniques may be implemented as a classical task 172 that is added to the hierarchical data structure 175 representing a processing job 170. Such tasks may be dynamically included in the hierarchical data structure 175 for a processing job 170 in association with quantum tasks 174 as they are assigned and/or executed by the quantum systems 132.

In some implementations, the error manager 160 may update the hierarchical data structure 175 and/or select one or error mitigation techniques 185 and/or error correction techniques 180 as a function of telemetry data obtained from the quantum system(s) 185. The data processing system 105 can execute the telemetry data obtainer 155 to obtain telemetry data from the quantum system(s) 122. The telemetry data obtainer 155 can include hardware, software, or combinations thereof. The telemetry data obtainer 155 can obtain telemetry data from the distributed computing environment 120, the telemetry data corresponding to a processing job. The telemetry data obtainer 155 can access operational parameters from quantum systems 132 in the distributed computing environment 120.

In some implementations, the telemetry data obtainer 155 can retrieve values such as noise metrics, qubit fidelity values, two-qubit gate fidelity values, measurement fidelity values, and/or coherence time values associated with one or more QPUs of the quantum systems 132. The telemetry data obtainer 155 can obtain/retrieve the telemetry data in response to a request generated by the data processing system 105 or can access telemetry data at predetermined intervals from the distributed computing environment 120. In some implementations, the telemetry data obtainer 155 can associate the obtained telemetry data with a processing job identifier and provide the telemetry data to the error manager 160 or other components of the data processing system 105 for further processing.

In some implementations, the telemetry data obtainer 155 can obtain telemetry data from quantum processing units of the quantum systems 132, where the telemetry data includes at least one of a noise metric, a qubit fidelity value, a two-qubit gate fidelity value, a measurement fidelity value, and a coherence time value. The telemetry data obtainer 155 can use the obtained telemetry data to generate a per-QPU error model/profile by associating each retrieved metric with a specific QPU of the quantum systems 132 of the distributed computing environment. In some implementations, the telemetry data obtainer 155 can aggregate or update the error model for a QPU by incorporating the most recent values for noise, qubit fidelity, two-qubit gate fidelity, measurement fidelity, and coherence time, among others, to characterize the operational error rates and reliability of that QPU. The telemetry data obtainer 155 can store the generated per-QPU error model/profile for subsequent use by other components of the data processing system 105, such as the error manager 160, during selection or adaptation of error mitigation techniques 180 or error correction techniques 185.

The telemetry data obtainer 155 can obtain telemetry data from quantum systems 132 during execution of a current processing job 170 or during execution of other processing jobs 170. In some implementations, the telemetry data obtainer 155 can obtain telemetry data at predetermined intervals, in response to a request generated by one or more external systems, in response to operator input at the data processing system 105, and/or in response to initiating execution of one or more quantum tasks 174 via one or more quantum systems 132. In some implementations, the telemetry data obtainer 155 can store/maintain the obtained telemetry data as historical measurements in storage 115 for subsequent use in generating or updating a QPU error model/profile for a corresponding (e.g., associated via identifier, etc.) quantum system 132. The telemetry data obtainer 155 can associate each telemetry data value with a corresponding QPU/quantum system 132 and/or processing job 170, such that the error manager 160 to access both live and historical telemetry data when determining which error resolution techniques are to be used in connection with quantum tasks 174 assigned to a quantum system 132 to carry out a processing job 170.

In generating the QPU error model or profile for the quantum system 132 and/or one or more quantum processing units thereof, the error manager 160 can determine a measured coherence time for the quantum system 132 and/or the quantum processing units by accessing a set of historical measurements of telemetry data associated with the quantum system 132. The error manager 160 can extract, from the obtained telemetry data corresponding to the quantum system 132, a set of coherence time values measured from the quantum system 132 and/or the QPUs thereof. In one example, the error manager 160 can apply a statistical operation, such as calculating a mean, median, or weighted average, to the extracted coherence time values to generate a measured coherence time representative of the operational characteristics of the quantum system 132 and/or one or more QPUs thereof. In some implementations, the error manager 160 can select a subset of the historical measurements based on recency and can generate the measured coherence time using only the selected subset. The measured coherence time generated by the error manager 160 can be included as a parameter in the QPU error model/profile for subsequent use in determining error resolution techniques.

The error manager 160 can determine whether to apply an error resolution technique to one or more quantum tasks 174 of a processing job 170 by evaluating operational parameters associated with the quantum tasks 174 and the quantum systems 132 to which the quantum tasks 174 are assigned (e.g., as indicated in the hierarchical data structure 175, which may include, represent, or be associated with a processing schedule as described herein). The error manager 160 can access the error model/profile (and/or the telemetry data thereof) associated with the QPU(s) of the quantum system(s) 132 that are to execute the corresponding quantum tasks 174. In some implementations, the error manager 160 can compare a required error tolerance or fidelity threshold specified in the metadata of a quantum task 174 (e.g., derived from data of the processing job 170) to the operational parameters indicated in the error model/profile of the assigned quantum system 132. The error manager 160 can determine that an error resolution technique is to be applied when the operational parameters of the quantum system 132 do not satisfy the required error tolerance and/or when the measured coherence time is less than a requested coherence time for the quantum task 174.

In one example, the error manager 160 can determine that a quantum error correction technique 180 is to be applied to a quantum task 174 when a requested coherence time for the quantum task 174 exceeds the measured coherence time of the assigned quantum system 132 (e.g., as indicated in the error model/profile for the corresponding quantum system 132). In some implementations, the error manager 160 can determine the requested coherence time for the quantum portion based at least in part on the gate depth of the quantum circuit(s) used to carry out the quantum task 174. To do so, the error manager 160 can access a circuit description specified as part of the quantum task 174 and identify a total gate count and/or a maximum circuit depth value by traversing the sequence of quantum operations/quantum gates specified for the quantum circuit. In one example, the error manager 160 can apply a mapping function that associates the identified gate depth with a minimum coherence time required for successful execution of the quantum circuit, where the mapping function can account for the duration of individual gate operations and any idle intervals between gates. The mapping may be a lookup table, in which quantum gates/quantum circuits are associated with corresponding coherence time values. In some implementations, the lookup table may be specific to the quantum system 132 to which the quantum task 174 is assigned. The error manager 160 can output the requested coherence time as a parameter for use in selecting an error resolution technique, as described herein.

The error manager 160 can select the error resolution technique based on the requested coherence time and the measured coherence time. As noted above, the error manager 160 can select among the quantum error correction techniques 180 when the requested coherence time exceeds the measured coherence time of the quantum system 132 to which the quantum task 174 is assigned for execution. In some implementations, the error manager 160 can access a set of candidate quantum error correction techniques 180 and can evaluate each candidate technique based on parameters such as code distance, qubit overhead, and/or compatibility with the measured error rates of the quantum system 132. Quantum error correction techniques 180 can involve encoding a logical qubit into an entangled state of multiple physical qubits, measuring error syndromes using ancillary qubits to detect the occurrence and type of errors without collapsing the encoded quantum information, and applying corrective operations to restore the encoded state to the code space. For example, quantum error correction techniques 180 can include Shor codes that encode a logical qubit into nine physical qubits to protect against arbitrary single-qubit errors, Steane codes that use seven physical qubits per logical qubit to correct any single-qubit error, or surface codes that encode logical qubits in two-dimensional lattices of physical qubits and can tolerate relatively high physical error rates, among others.

The error manager 160 can determine a subset of quantum error correction techniques 180 that satisfy a minimum coherence time requirement for a quantum task 174 by accessing the measured coherence time parameter associated with a quantum system 132 assigned to execute the quantum task 174 and comparing the measured coherence time to the minimum coherence time required for successful execution of the quantum circuit specified in the quantum task 174. The error manager 160 can access a set of candidate quantum error correction techniques 180, each associated with code parameters such as code distance, qubit overhead, and compatibility with the operational characteristics of the quantum system 132, and can identify those quantum error correction techniques 180 that provide logical qubit protection for a circuit duration at least as great as the minimum coherence time requirement of the quantum task 174. Such information may be stored in a lookup table or similar data structure.

The error manager 160 can select one or more quantum error correction techniques 180 from the subset according to a selection policy that can account for resource availability, error budget, or job priority. In some implementations, the error manager 160 can access metadata associated with the quantum task 174 and the quantum system 132, such as available physical qubit count, current error rates, and assigned error budget, and can apply a rule-based or probabilistic selection function to select a quantum error correction technique 180 that satisfies the resource and error tolerance constraints while aligning with the job priority indicated in the hierarchical data structure 175. In some implementations, the selection of the quantum error correction technique 180 may be based on respective scores assigned to the candidate quantum error correction techniques 180, as described in further detail herein.

In some implementations, the error manager 160 can determine that a quantum error mitigation technique 185 is to be applied when the measured operational parameters (e.g., error model/profile, telemetry data) indicate that the quantum system 132 can execute the quantum task 174 within the requested coherence time. Quantum error mitigation techniques 185 can be used to reduce or estimate the impact of errors on quantum computations without encoding logical qubits or applying active error correction during circuit execution. Quantum error mitigation techniques 185 can include passive or post-processing methods such as zero-noise extrapolation, probabilistic error cancellation, measurement error mitigation, and/or symmetry verification, among others. Quantum error mitigation techniques 185 may be implemented as additional classical tasks 172, in some implementations. In some implementations, both error correction techniques 180 and error mitigation techniques 185 may be applied to a quantum task 174.

To determine which error correction technique 180 or error mitigation technique 185 to use in connection with a quantum task 174 (e.g., once one or both are determined to be applied to the quantum task 174), error manager 160 can generate scores that represent a likelihood of expected fidelity upon applying the corresponding error correction technique 180 or the corresponding error mitigation technique 185. In some implementations, error manager 160 can generate such scores using rule-based approaches that evaluate a set of operational parameters associated with quantum task 174 and the quantum system 132 assigned to execute the quantum task 174. The error manager 160 can access metadata for quantum task 174, such as circuit depth, required fidelity, and error budget, and can retrieve operational metrics for quantum system 132 (e.g., from the error model/profile, etc.), such as measured coherence time, gate fidelity, and qubit count, for use in calculation of the scores.

In some implementations, the error manager 160 can apply a set of predetermined rules that map combinations of circuit depth and measured coherence time to an expected logical error rate for each candidate error correction technique 180, for example, by referencing a lookup table that associates code distance and physical error rates with logical fidelity. Such lookup tables may correspond to specific QPUs of quantum systems 132. In some implementations, error manager 160 can assign a score to each error mitigation technique 185 by evaluating the compatibility of the mitigation technique with the observed error model of quantum system 132, such as by applying one or more weight values (e.g., as a weighted sum). In one example, the calculation of the weighted sum can result in measurement error mitigation being scored higher when readout error rates exceed a threshold, or can result in zero-noise extrapolation being scored higher when gate error rates are within a specified range. In some implementations, the error manager 160 can generate a ranked list of candidate techniques by comparing the resulting scores for each error correction technique 180 or each error mitigation technique 185.

In some implementations, error manager 160 can generate scores for candidate error correction techniques 180 and error mitigation techniques 185 using a probabilistic approach based on machine-learning models trained on historical execution data and QPU calibration records. For example, the error manager 160 can access or generate one or more features (e.g., a feature vector) for quantum task 174 and quantum system 132, where the feature vector includes information from the error model/profile of the quantum system 174, such as circuit parameters (e.g., gate count, circuit width, circuit depth), QPU operational metrics (e.g., average gate fidelity, T1 and T2 coherence times, measurement error rates), and job-specific metadata (e.g., error budget, priority).

In some implementations, the error manager 160 can input the feature vector into a regression model that is trained to output a predicted fidelity score for each candidate error correction technique 180 and each candidate error mitigation technique 185. Any suitable regression model or machine-learning model may be used, including but not limited to linear regression models, decision tree models, random forest models, gradient boosting models, support vector machine models, neural network models, and/or combinations thereof (e.g., ensemble models). In some implementations, error manager 160 can use a classification model to predict the probability that a given error resolution technique will achieve a target error rate and can assign this probability as the score for that technique.

The error manager 160 can select the error correction technique 180 and/or error mitigation technique 185 with the highest predicted fidelity score or probability, and can update the hierarchical data structure 175 to associate the selected technique with quantum task 174. When the error manager 160 selects an error correction technique 180, the error manager 160 may generate an additional quantum task 174 or modify an existing quantum task 174 to include operations for a selected quantum error correction technique 180. The error manager 160 can update the hierarchical data structure 175 by inserting a new node representing the quantum error correction technique 180 as a child or sibling node to the original quantum task 174, and/or by modifying the metadata of an existing quantum task 174 node to specify the selected error correction technique 180, any associated parameters, and/or any associated resource requirements such as increased qubit count or circuit depth. The error manager 160 can annotate (e.g., with a flag or edge) the relevant node or edge in the hierarchical data structure 175 to indicate the dependency between the original quantum task 174 and the error correction operations, and can update the execution order and resource assignment data to reflect the inclusion of the error correction technique 180 in the processing schedule.

When the error manager 160 selects an error mitigation technique 185, the error manager 160 may generate an additional classical task 172 that can use the output of the quantum task 174 and applies classical post-processing operations such as measurement error mitigation, zero-noise extrapolation, and/or symmetry verification, among other operations described herein. The error manager 160 can update the hierarchical data structure 175 by inserting a new node representing the classical error mitigation task as a dependent child node of the quantum task 174 node, and by specifying in the metadata of the new classical task 172 node the selected error mitigation technique 185, any input data references, and any operational parameters used in connection with the mitigation process. The error manager 160 can update the dependency edges in the hierarchical data structure 175 to indicate that execution of the classical task 172 is contingent on completion of the quantum task 174, and can update the group-level metadata to reflect the association of the error mitigation technique 185 with the corresponding quantum-classical task pair.

Once the hierarchical data structure 175 has been updated according to each error resolution technique selected for one or more of the quantum tasks 174, the job executor 150 can execute the processing job 170 according to the hierarchical data structure 175, according to the techniques described herein. The job executor 150 can access the hierarchical data structure 175 to determine the execution order, resource assignments, and dependency relationships among quantum tasks 174, classical tasks 172, and any associated error mitigation or correction tasks.

As described herein, the job executor 150 can allocate execution windows (e.g., via time-slicing, etc.) and initiate task execution on designated quantum systems 132 and classical systems 130 as specified by the hierarchical data structure 175. In some implementations, the job executor 150 can synchronize pipelined execution of sequential quantum and classical tasks by coordinating time slicing across heterogeneous resources and updating the execution state in response to completion of prerequisite tasks. Further details of time-slicing are described in connection with FIGS. 6 and 7. The job executor 150 can aggregate intermediate and final results from quantum tasks 174, classical tasks 172, and/or error mitigation or correction operations, and can propagate results to dependent tasks in accordance with the execution dependencies encoded in the hierarchical data structure 175.

During execution of the processing job 170, the telemetry data obtainer 155 can obtain telemetry data from the quantum systems 132 executing the quantum tasks 174 specified in the hierarchical data structure 174. The telemetry data obtainer 155 can access operational parameters from each quantum system 132, including values such as qubit fidelity, gate fidelity, measurement fidelity, and coherence time. In some implementations, the telemetry data obtainer 155 can retrieve telemetry data at predetermined intervals or in response to state changes in the execution of quantum tasks 174. The telemetry data obtainer 155 can associate the obtained telemetry data with the corresponding quantum tasks 174 and update internal representations of system state for use by the error manager 160 and other components of the data processing system 105. In some implementations, the telemetry data obtainer 155 can provide the telemetry data to facilitate adaptive selection of error mitigation or correction techniques during execution of the processing job 170.

The data processing system 105 can execute the error manager 160 to update an error model or profile for a quantum system 132 during execution of a processing job 170. The error manager 160 can access telemetry data obtained from the quantum system 132 can update an error model/profile for the quantum system 132 by incorporating the most recent telemetry data into a set of operational parameters associated with the quantum system 132, as described herein. In some implementations, the error manager 160 can store the telemetry data as part of the set of historical and current error metrics for each quantum system 132 and can use the stored data to calculate updated statistical values (e.g., mean error rates, moving averages, etc.) for each relevant operational parameter. The error manager 160 can update the error model/profile to reflect changes in hardware calibration, environmental conditions, and/or observed error rates during execution of the processing job 170.

The error manager 160 can determine whether measured error rates for current or yet-to-be-executed quantum tasks 174, either before or after application of an error resolution technique (if any are currently applied to executed quantum tasks 174), exceed the associated error budget of the quantum task 174 and/or for a group of quantum tasks 174 associated with the processing job 170. The error manager 160 can access the updated error model/profile for the quantum system 132 and can compare the measured error rates and/or statistical metrics to error budget values specified in the hierarchical data structure 175, which may include but are not limited to segment-specific error tolerances for estimator groups, shot groups, or other groupings. In some implementations, the error manager 160 can evaluate the effectiveness of a currently applied error resolution technique by comparing post-mitigation and/or post-correction error rates to the allocated error budget. If the measured error rates exceed the error budget, the error manager 160 can flag the corresponding quantum task 174 or group for re-execution and re-evaluation to determine a new error resolution technique.

In response to detecting that measured error rates exceed the error budget, the error manager 160 can re-select one or more error resolution techniques (and/or parameters thereof) for the affected quantum task 174 or group of quantum tasks 174. The error manager 160 can access a set of candidate error mitigation techniques 185 and quantum error correction techniques 180, and can calculate updated scores for each candidate technique using the most recent error model/profile, operational parameters of the quantum system 132, and/or job-specific metadata such as circuit depth, required fidelity, and error tolerance, using similar techniques to those described herein. The error manager 160 can select a new error resolution technique with a higher predicted fidelity score and can update the hierarchical data structure 175 to associate the selected technique with the relevant quantum task 174 or group. The error manager 160 can trigger reallocation of resources and/or modification of execution parameters as needed to implement the newly selected error resolution technique during ongoing execution of the processing job 170.

By employing the techniques described herein, the data processing system 105 can execute hybrid quantum-classical computing operations by partitioning submitted jobs into quantum and classical components, generating a hierarchical grouping structure that encodes resource-specific dependencies, and allocating tasks to quantum systems 132 and classical systems 130. The data processing system 105 can dynamically allocate execution time slices across heterogeneous resources, coordinate pipelined execution of sequentially dependent quantum and classical operations, and adapt job grouping, resource allocation, and pipeline stages in response to real-time system metrics and intermediate results. The data processing system 105 can use the error manager 160 to further apply integrated error mitigation and correction strategies by selecting among quantum error correction codes and classical post-processing techniques based on live quantum processing unit calibration data, hierarchical error budgets, and job-specific requirements. By orchestrating computation across quantum-classical units and shared high-latency classical resources, the data processing system 105 can facilitate efficient scheduling, adaptive execution, and hierarchical error management for hybrid quantum-classical workloads, resulting in improved computing performance and fewer computational errors.

Referring now to FIG. 2, illustrated is a block diagram of an example hierarchical data structure 200 that may be used in connection with the techniques described herein. The hierarchical data structure 200 can include an overall job root node 202, a quantum tasks node 204, a classical tasks node 206, a QPU-specific job node 208, an estimator group node 210, a CPU-specific job node 212, a GPU-specific job node 214, and an estimator group node 216.

The hierarchical data structure 200 (e.g., the hierarchical data structure 175) can be used to represent the organization and partitioning of hybrid quantum-classical computational workloads, with the overall job root node 202 serving as the top-level grouping that can represent the processing job (e.g., a processing job 170). The quantum tasks node 204 and the classical tasks node 206 can represent the primary partitioning of the workload into quantum and classical components, respectively. The quantum tasks node 204 can be associated with (e.g., connected with edges) various quantum operations (e.g., quantum tasks 174) of the processing job. The classical tasks node 206 can be associated with (e.g., connected with edges) various classical operations (e.g., classical tasks 172) of the processing job.

As shown, the overall job root node 202 is associated with two primary branches: a quantum tasks node 204 and a classical tasks node 206, which respectively group all quantum and classical components (e.g., quantum tasks 174 and classical tasks 172) of the processing job. Under the quantum tasks node 204, the hierarchical data structure 200 further branches into a QPU-specific job node 208 (representing quantum sub-tasks allocated to a particular quantum processing unit/quantum system) and an estimator group node 210 (which can correspond to quantum circuit executions for computing specific quantities, such as expectation values). The estimator group node 210 is further subdivided into a lower-level group, shown in the figure as a shot group node 216, which can represent repeated executions ("shots") of a given quantum circuit for statistical measurement. On the classical operations branch, the classical tasks node 206 is associated with classical processing jobs (e.g., classical tasks 172) organized according to computing resource type, which in this example include a CPU-specific job node 212 and a GPU-specific job node 214, which correspond to classical sub-tasks assigned to CPUs and GPUs, respectively.

The hierarchical data structure 200 illustrated in FIG. 2 can be similar to and may include any of the features of the hierarchical data structure 175 described in connection with FIG. 1. The hierarchical data structure 200 in this example can represent a simplified format for purposes of illustration and can include nodes or entries corresponding to discrete scheduling units/operations, resource-specific groupings, and/or processing dependencies among quantum and classical tasks. The hierarchical data structure 200 may encode a processing schedule, inter-task dependencies, resource assignments, group-level metadata such as priority, error tolerance/budget, and affinity constraints, among others, as described in connection with FIG. 1. In some implementations, the hierarchical data structure 200 can include additional levels of grouping, any number of quantum or classical tasks, metadata fields, and/or dependency edges to facilitate granular scheduling, resource allocation, and/or execution order determination within a hybrid quantum-classical computing environment.

Referring now to FIG. 3, illustrated is a flowchart 300 of an example hierarchical scheduling and execution process. The process shown in the flowchart 300 may be implemented, for example, using the data processing system 105 and/or any of the components thereof. In brief overview of the process shown in the flowchart 300, the process can include performing an application partitioning process 302, performing a job grouping process 304, performing a scheduling process 306, performing a cross-resource time slicing process 308, performing an adaptive execution process 310, performing an error handling process 312, and interacting with a distributed computing environment 120.

The process can include performing an application partitioning process 302. To do so, any of the operations of the operation determiner 140 of FIG. 1 can be performed. Further details of the application partitioning process 302 are described in connection with FIGS. 1 and 4. The application partitioning process 302 can include parsing a received processing job (e.g., a processing job 170 and/or a specification thereof) to extract discrete computational operations, classifying each operation as either quantum or classical based on resource indicators or algorithm descriptors, and generating a structured representation associating each identified operation with its corresponding resource type. In some implementations, the application partitioning process 302 can involve extracting, identifying, or determining dependency relationships between quantum and classical operations by referencing data flow or sequencing constraints specified in the job metadata. The application partitioning process 302 can include parsing the job metadata/specification to identify explicit references indicating that the output of a quantum operation is required as an input to a subsequent quantum/classical operation, and/or that a classical preprocessing step must complete before a subsequent quantum/classical task is initiated. The application partitioning process 302 can output a set of quantum operations (e.g., quantum tasks 174) and a set of classical operations (e.g., classical tasks 172), each associated with resource requirements, execution constraints, and dependency links, for use in subsequent grouping and scheduling operations.

The process can include performing a job grouping process 304. To do so, any of the operations of the data structure generator 145 of FIG. 1 can be performed. Further details of the job grouping process 304 are described in connection with FIGS. 1 and 2. The job grouping process 304 can receive the partitioned set of quantum operations and classical operations generated by the application partitioning process 302 and can generate a hierarchical grouping structure (e.g., the hierarchical data structure 200, the hierarchical data structure 175, etc.) that classifies each operation according to resource type, processing dependency, and/or execution stage. The job grouping process 304 can assign each quantum operation to a quantum tasks group and each classical operation to a classical tasks group, and can further subdivide each group into resource-specific subgroups such as QPU-specific job groups, CPU-specific job groups, or GPU-specific job groups. In some implementations, the job grouping process 304 can generate estimator groupings for quantum operations that estimate specific quantities and shot groupings for repeated quantum circuit executions, and can encode inter-group dependencies by generating explicit links between groups that reflect required execution order or data flow. The job grouping process 304 can associate group-level metadata with each group, including priority, error tolerance, or resource requirements, and can output a hierarchical data structure (e.g., the hierarchical data structure 175) that encodes the multi-level grouping and dependencies for use in subsequent scheduling and execution operations.

The process can include performing a scheduling process 306. To do so, any of the operations of the job executor 150 of FIG. 1 may be performed, which may include implementing a gang scheduler with affinity rules as described herein. Further details of the scheduling process 306 are described in connection with FIGS. 1 and 5. The scheduling process 306 can include generating an execution schedule for quantum and classical operations by accessing the hierarchical groupings produced by the job grouping process 304 and applying dependency relationships and resource requirements encoded in the hierarchical structure. In some implementations, the scheduling process 306 can include constructing a directed dependency graph that represents the execution order and interdependencies among quantum and classical job components, and can include applying affinity rules to determine optimal placement of related tasks on available resources.

For example, the scheduling process 306 can include assigning estimator groups to the same QPU (e.g., quantum system 132) and/or allocating dependent classical tasks (e.g., classical tasks 172) to classical nodes (e.g., classical systems 130) associated with a corresponding quantum system. The scheduling process 306 can include identifying pipelining opportunities by detecting sequences of tasks that can be executed in overlapping time intervals (e.g., as described in further detail in connection with FIG. 5), and can include optimizing the schedule during execution of the processing job based on observed and/or predicted performance metrics and affinity constraints. Affinity constraints in the context of the scheduling process 306 can include requirements for co-locating quantum tasks/groups on the same quantum system 132 and/or QPU thereof, assigning dependent classical tasks 172 to classical systems 130 with low-latency connectivity to the relevant quantum system 132, and/or matching resource-specific jobs/tasks to hardware instances with compatible or requested (e.g., in the job specification) operational characteristics. In some implementations, the scheduling process 306 can include obtaining telemetry data from the distributed computing system to identify error resolution techniques that may be applied to one or more quantum tasks, as described herein. The scheduling process can include outputting a processing schedule that encodes the allocation of quantum and classical tasks to the distributed computing environment 120 for subsequent execution.

The process can include performing a cross-resource time slicing process 308. To do so, any of the operations of the job executor 150 of FIG. 1 may be performed. Further details of the cross-resource time slicing process 308 are described in connection with FIGS. 1, 5, and 6. The cross-resource time slicing process 308 can include allocating execution time across heterogeneous resources identified in the job grouping process 304, such as quantum tasks (e.g., quantum tasks 174), classical tasks (e.g., classical tasks 172), or resource-specific job groupings, by generating fine-grained configurable time slots for each resource type. In some implementations, the cross-resource time slicing process 308 can include distributing time slices at multiple levels of the hierarchical grouping, for example, among shots, estimator groups, or overall jobs, to facilitate pipelined execution of sequentially dependent operations. For example, the cross-resource time slicing process 308 can include synchronizing time slot allocation between quantum and classical resources to enable overlapping execution of quantum tasks (e.g., quantum tasks 174) and classical tasks (e.g., classical tasks 172) that are linked by dependency relationships established in the job grouping process 304.

The cross-resource time slicing process 308 can include dynamically adjusting the duration and distribution of time slices based on job progress, resource requirements, or observed performance metrics, and can include enabling cross-job sharing of resources by interleaving time slots among multiple jobs scheduled for execution. In some implementations, the cross-resource time slicing process 308 can include coordinating time slice boundaries to maximize pipeline continuity and reduce idle time across quantum and classical resources, and can include propagating updated time slicing parameters to the adaptive execution process 310 for adjustment during job execution. Further details relating to time-slicing are described in connection with FIG. 6.

The process can include performing an adaptive execution process 310. To do so, any of the operations of the job executor 150 of FIG. 1 may be performed. Further details of the cross-resource time slicing process 308 are described in connection with FIGS. 1 and 5-7. The adaptive execution process 310 can include managing the execution of scheduled quantum and classical operations while dynamically adjusting pipeline stages, execution order, and/pr resource allocation in response to observed system state and job progress. In some implementations, the adaptive execution process 310 can include modifying the boundaries between sequential quantum and classical tasks to facilitate pipelined execution across heterogeneous resources, such as by shifting the initiation of a classical operation to overlap with the completion of a dependent quantum operation.

For example, the adaptive execution process 310 can include reallocating quantum or classical tasks to different processing nodes (e.g., quantum systems 132, classical systems 130) of the distributed computing environment 120 based on availability or performance metrics obtained during execution, and/or adjusting the sequencing of estimator groups, shot groups. or other quantum tasks to maximize resource utilization. The adaptive execution process 310 can include aggregating partial results from distributed time slices, updating the execution plan to reflect changes in resource availability or job requirements, and managing quantum-to-classical and classical-to-quantum transitions to minimize idle time across the distributed computing environment 120.

The process can include performing an error handling process 312. To do so, any of the operations of the telemetry data obtainer 155 and the error manager 160 of FIG. 1 may be performed. Further details of the cross-resource time slicing process 308 are described in connection with FIGS. 1 and 5-7. The error handling process 312 can include obtaining telemetry data from the distributed computing environment 120 using a telemetry data obtainer and updating an execution plan in response to observed error rates or hardware state changes using an error handler. In some implementations, the error handling process 312 can include selecting or adapting error mitigation or correction strategies for quantum or classical operations based on real-time system metrics, job requirements, or error budgets. For example, the error handling process 312 can include identifying a quantum operation for which measured error rates exceed a specified threshold (e.g., an error budget) and updating the execution plan/processing schedule to apply a different error resolution technique and/or to reallocate the operation to an alternative resource. The error handling process 312 can include propagating changes to group-level error budgets (e.g., calculated according to propagated error resulting from dependent operations) and modifying the hierarchical data structure/processing schedule with additional tasks/parameters to reflect the selected error mitigation or correction strategy.

In some implementations, the error handling process 312 can include triggering re-execution of one or more operations and/or adjusting pipeline stages to maintain computational accuracy across the distributed computing environment 120. For example, the error handling process 312 can identify a quantum and/or classical operation for which an error budget or accuracy threshold has not been satisfied and initiate re-execution of the affected operation on the same or an alternative resource within the distributed computing environment 120. In some implementations, the error handling process 312 can adjust the boundaries between pipeline stages by modifying the sequencing of quantum and classical tasks, reallocating tasks to different quantum systems or classical systems, and/or updating the execution order of interdependent operations to compensate for observed deviations in computational accuracy. The error handling process 312 can access updated job state, resource availability, and/or error model parameters when determining whether to trigger re-execution or adjust pipeline stages, and can propagate changes to the hierarchical data structure representing the processing schedule to reflect the revised execution plan. The operations of the error handling process 312 can be executed with the adaptive execution process 310 to execute error correction techniques (e.g., error correction techniques 180) and/or error mitigation techniques (e.g., error mitigation techniques 185) as described in connection with FIGS. 1 and 9.

Referring now to FIG. 4, illustrated is a method 400 of partitioning a hybrid processing job into quantum and classical operations. The method 400 may be performed, for example, by the data processing system 105 and/or any of the components thereof. In brief overview of the method 400, the method 400 can include obtaining a job (ACT 402), identifying quantum and classical operations (ACT 404), determining a resource type for each operation (ACT 406), generating quantum partitions (ACT 408), defining quantum requirements (ACT 410), generating classical partitions (ACT 412), defining classical requirements (ACT 414), specifying inter-partition dependencies (ACT 416), and generating a hierarchical data structure (ACT 418).

The method 400, at ACT 402, can include obtaining a job. To do so, any of the operations of the processing job obtainer 135 of FIG. 1 can be performed. The data processing system can receive a job submission through an application-level partitioning interface (e.g., as depicted in FIG. 1), where the job specification may be provided in a structured format such as a domain-specific language or a markup language, and can include metadata describing resource requirements, partitioning strategies, and execution priorities. In some implementations, the job submission can be received from an external user or automated system, and can be parsed to extract identifiers, job type indicators, and dependency information for subsequent processing. For example, the job specification can reference input data locations, required qubit counts, and preferred hardware attributes for quantum or classical operations (e.g., classical systems 130 or quantum systems 132), among others.

The method 400, at ACT 404, can include identifying quantum and classical operations. To do so, any of the operations of the operation determiner 140 of FIG. 1 can be performed. The data processing system can parse the job specification to extract discrete computational operations and can classify each operation as either a quantum operation or a classical operation based on algorithm descriptors, resource indicators, or explicit annotations in the job metadata. In some implementations, the classification can be performed by matching operation types or function signatures to a library of known quantum and classical kernels, or by evaluating resource requirements such as qubit usage or processor affinity. For example, quantum circuit definitions can be identified as quantum operations (e.g., quantum tasks 174), while numerical simulations or data preprocessing steps can be identified as classical operations (e.g., classical tasks 172).

The method 400, at ACT 406, can include determining a resource type for each operation. To do so, any of the operations of the operation determiner 140 of FIG. 1 can be performed. The data processing system can associate each identified operation with a specific resource type, such as a quantum processing unit (e.g., quantum systems 132), a central processing unit (e.g., classical systems 130), a graphics processing unit, or a field-programmable gate array, among others, by evaluating the operation's requirements and the available hardware resources described in the job metadata. In some implementations, the resource type determination can involve mapping algorithmic constraints, such as required gate fidelity or memory size, to compatible hardware classes. For example, an operation requiring parallel matrix multiplication can be mapped to a GPU, while a quantum state preparation step can be mapped to a QPU.

The method 400, at ACT 408, can include generating quantum partitions. To do so, any of the operations of the operation determiner 140 of FIG. 1 can be performed. The ACT 408 can be performed with respect to quantum tasks (e.g., quantum tasks 174) identified in ACT 406. The data processing system can group quantum operations (e.g., quantum tasks 174) into partitions based on resource type, execution dependencies, and grouping criteria such as estimator groups or shot groups, as specified in the job metadata or determined by dependency analysis. In some implementations, quantum partitions can be formed by clustering quantum operations that share input data, require execution on the same quantum system (e.g., quantum system 132), and/or contribute to a common estimator group for expectation value computation. For example, repeated executions of a quantum circuit for statistical measurement can be grouped into a shot group partition, and in another example, multiple estimator circuits can be grouped into an estimator group partition.

The method 400, at ACT 410, can include defining quantum requirements. In doing so, any of the operations of the data structure generator 145 of FIG. 1 can be performed. The ACT 410 can be performed with respect to the partitions generated in ACT 408. The data processing system can assign resource requirements and execution constraints to each quantum partition (e.g., quantum tasks 174), including parameters such as required qubit count, preferred/requested QPU characteristics, minimum coherence time, and error tolerance thresholds (e.g., error budgets), as specified in the job metadata and/or inferred from the quantum circuit definitions of the quantum tasks. In some implementations, the quantum requirements can include affinity metadata for co-location of related quantum operations, and/or error budget allocations for estimator or shot groups. For example, a quantum partition may specify an assignment to a QPU with a minimum gate fidelity and/or a specific qubit topology.

The method 400, at ACT 412, can include generating classical partitions. To do so, any of the operations of the operation determiner 140 of FIG. 1 can be performed. The ACT 412 can be performed with respect to classical tasks (e.g., classical tasks 172) identified in ACT 406. The data processing system can group classical operations (e.g., classical tasks 172) into partitions according to resource type, execution order, and affinity constraints, as indicated in the job specification or derived from dependency relationships between tasks, as described in connection with FIG. 1. In some implementations, classical partitions can be formed by aggregating operations that use the same type of classical resource (e.g., CPU, GPU, FPGA, etc.), or by grouping operations that are sequentially dependent and/or share intermediate data. For example, a set of data preprocessing steps can be grouped into a CPU-specific partition, and a set of machine learning inference operations can be grouped into a GPU-specific partition.

The method 400, at ACT 414, can include defining classical requirements. To do so, any of the operations of the data structure generator 145 of FIG. 1 can be performed. The ACT 414 can be performed with respect to the partitions generated in ACT 412. The data processing system can assign resource requirements and execution constraints to each classical partition (e.g., classical tasks 172), including parameters such as required processor type, memory size, bandwidth, execution priority, and affinity constraints, as indicated in the job metadata or derived from the operation characteristics. In some implementations, the classical requirements can specify preferred hardware attributes, such as a minimum number of processing cores, a specific accelerator type, or the like, and can include scheduling constraints such as earliest start time and/or execution deadline in the context of the processing job. For example, a classical partition may require allocation to a CPU with high memory bandwidth or to a GPU with a minimum number of compute units. Similar approaches may be used to identify dependencies between classical tasks.

The method 400, at ACT 416, can include specifying inter-partition dependencies. To do so, any of the operations of the data structure generator 145 of FIG. 1 can be performed. The data processing system can analyze the job metadata and the identified operations to determine dependency relationships between quantum partitions (e.g., quantum tasks 174) and classical partitions (e.g., classical tasks 172), and can encode these dependencies as directed edges or explicit dependency links in an intermediate data structure (e.g., hierarchical data structure 175). In some implementations, inter-partition dependencies can be identified by determining where output data from one partition is used as input data to another, and/or by identifying execution order constraints based on algorithmic requirements specified in quantum or classical partitions/tasks. For example, a dependency can be established from a quantum partition to a classical partition when the output of a quantum measurement operation is required as input to a classical post-processing step.

The method 400, at ACT 418, can include generating a hierarchical data structure. To do so, any of the operations of the data structure generator 145 of FIG. 1 can be performed. The data processing system can construct a hierarchical data structure (e.g., hierarchical data structure 175), such as a directed acyclic graph or a tree, that encodes the partitions, resource requirements, and inter-partition dependencies for the job, with nodes representing quantum partitions (e.g., quantum tasks 174), classical partitions (e.g., classical tasks 172), and groupings such as estimator groups or shot groups. In some implementations, the hierarchical data structure can include metadata fields for resource assignments, execution priorities, error budgets, and affinity constraints, and can be accessed by the scheduler and execution engine (e.g., job executor 150) to facilitate scheduling, time slicing, and adaptive execution. The hierarchical data structure can be or include a directed dependency graph, which can specify a processing schedule for the quantum and classical tasks of the processing job.

Figure 5:
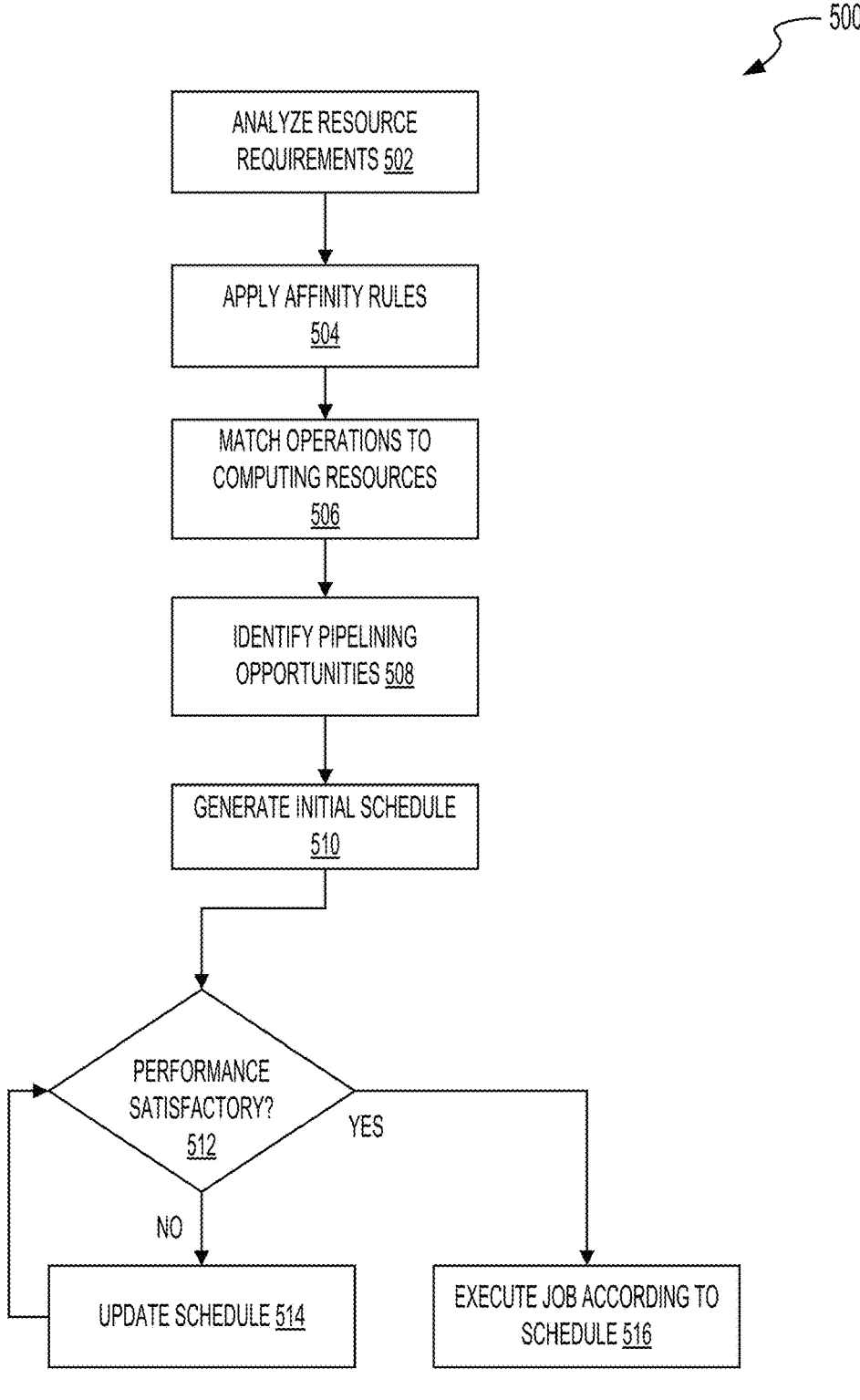
FIG. 5 is a flowchart illustrating an example scheduling process for allocating and optimizing hybrid quantum-classical computing resources, in accordance with one or more implementations.

Referring now to FIG. 5, illustrated is a method 500 depicting a scheduling process for allocating and optimizing hybrid quantum-classical computing resources. The method 500 may be performed, for example, by the data processing system 105 and/or any of the components thereof, including but not necessarily limited to the data structure generator 145 and the job executor 150. The method 500 can include analyzing resource requirements (ACT 502), applying affinity rules (ACT 504), matching operations to computing resources (ACT 506), identifying pipelining opportunities (ACT 508), generating an initial schedule (ACT 510), determining whether estimated performance of the schedule is satisfactory (ACT 512), updating the schedule (ACT 514), and executing the job according to the schedule (ACT 516).

The method 500, at ACT 502, can include analyzing resource requirements. To do so, any of the operations of the data structure generator 145 of FIG. 1 can be performed. The data processing system can access, for one or more job tasks specified in the hierarchical data structure (e.g., hierarchical data structure 175), metadata specifying resource attributes of resources that are to be used to execute the job tasks (e.g., quantum tasks 174, classical tasks 172, etc.). Such attributes may include but are not limited to required qubit count, QPU characteristics (e.g., coherence time or gate fidelity, etc.), CPU core count, GPU memory, or accelerator type. The data processing system can extract these attributes from structured job specifications and/or annotations derived from a processing job (e.g., processing job 170), as described in connection with FIGS. 1 and 4. In some implementations, the data processing system can access group-level metadata for estimator groups, shot groups, and/or computing resource-specific jobs to determine aggregate requirements for bandwidth, memory, and/or execution duration for multiple quantum and/or classical asks. For example, the data processing system can parse partition definitions to identify dependencies that impose minimum and/or maximum resource constraints, and can generate a resource requirement matrix that maps each job component to compatible hardware classes or resource pools.

The method 500, at ACT 504, can include applying affinity rules. To do so, any of the operations of the data structure generator 145 of FIG. 1 can be performed. The data processing system can evaluate affinity constraints specified in the job metadata or derived from dependency relationships, which may include but are not limited to co-location of quantum groups (e.g., estimator groups, etc.) on the same QPU, assignment of dependent classical tasks to low-latency nodes (e.g., classical systems 130) associated with a certain QPU, and/or grouping of quantum and classical components on the same quantum-classical system (e.g., quantum-classical system 1100 of FIG. 11). In some implementations, the data processing system can traverse the hierarchical data structure (e.g., a directed dependency graph, using any suitable graph traversal function, etc.) to propagate affinity metadata between parent and child nodes representing computing tasks of the processing job, as described herein. The data processing system can update candidate resource assignments to reflect affinity requirements. For example, the data processing system can restrict the eligible resource pool for a quantum job to QPUs that are already allocated to related estimator groups. In or can assign a classical post-processing task to a classical node with a direct communication link to the quantum processing unit that executed the preceding quantum task.

The method 500, at ACT 506, can include matching operations (e.g., quantum tasks 174, classical tasks 172) to computing resources (e.g., classical systems 130, quantum systems 132). To do so, any of the operations of the data structure generator 145 of FIG. 1 can be performed. The data processing system can compare the resource requirement matrix and affinity-constrained candidate lists to the current inventory of available QPUs, classical systems and/or specific processing devices (e.g., GPUs, FPGAs, other accelerators), and can select resource assignments that satisfy both functional requirements and affinity constraints, as described herein. In some implementations, the data processing system can apply a resource matching/allocation function that prioritizes optimal resource utilization, which may prioritize assignment according to various metrics (e.g., minimizing idle time on QPUs, balancing load across classical systems, etc.). For example, the data processing system can assign a quantum job having high requested coherence time to a QPU with the highest measured coherence time, and/or can allocate a group of classical tasks to a GPU with sufficient memory and available compute units to execute such operations in parallel.

The method 500, at ACT 508, can include identifying pipelining opportunities. The data processing system can analyze dependency relationships and scheduled resource assignments to detect sequences of quantum and classical tasks that can be executed in overlapping time intervals, such as when a classical pre-processing step can begin before all quantum shots have completed, or when classical post-processing can proceed on partial quantum measurement results. In some implementations, the data processing system can generate a pipelining plan by segmenting job components into pipeline stages and aligning their execution windows to maximize overlap. For example, the data processing system can identify that estimator groups assigned to different quantum processing units can execute in parallel, with classical aggregation tasks consuming results as they become available.

In one example, the data processing system can determine that a pipelined quantum-classical feedback loop can be initiated before all quantum tasks in a group have finished, such that a classical optimization routine may update parameters for subsequent quantum circuit executions based on partial measurement data. The data processing system can assign overlapping time slices to QPUs and classical systems to facilitate pipeline stages, for example, by allocating a time window for classical post-processing to begin as soon as the first subset of quantum measurement results is available. In some implementations, the data processing system can detect that shot groups or estimator groups mapped to different QPUs can be scheduled with staggered start times, such that downstream classical tasks can process intermediate results without necessarily waiting for the completion of all upstream quantum operations. Any type of possible operation, including quantum tasks, classical tasks, or combinations thereof, can be identified using similar techniques.

The method 500, at ACT 510, can include generating an initial schedule. To do so, any of the operations of the data structure generator 145 of FIG. 1 can be performed. The data processing system can construct a schedule that specifies the start time, duration, and/or assigned resource for each task of the processing job, which may specify resource requirements, affinity constraints, and/or pipelining operations. In some implementations, the data processing system can represent the schedule as a directed acyclic graph in the hierarchical data structure with nodes corresponding to tasks (and/or groups of tasks) and edges encoding execution order and/or resource dependencies. For example, the data processing system can generate and/or update a directed acyclic graph of the hierarchical data structure in which each node represents a quantum task or a classical task, and each edge specifies a dependency or required execution sequence between nodes. In some implementations, the data processing system can encode groups of tasks, such as group-level scheduling units (e.g., estimator groups, shot groups, etc.), as nodes in the hierarchical data structure, and can generate edges to reflect data dependencies and/or affinity constraints among tasks assigned to different resources. In some implementations, the data processing system can generate the schedule using a gang scheduler function. The gang scheduler function can allocate interdependent quantum and/or classical tasks to computing resources using the hierarchical data structure, as described in connection with FIG. 1. Generating the processing schedule for the processing job may include performing any of the error resolution techniques described herein, including those described in connection with FIG. 1 and/or FIG. 9.

The method 500, at ACT 512, can include determining whether estimated performance of the schedule is satisfactory. To do so, any of the operations of the data structure generator 145 of FIG. 1 can be performed. The data processing system can evaluate the generated schedule against performance metrics such as total execution time, resource utilization, job priority fulfillment, and/or deadline satisfaction, using predictive models or historical performance data. In some implementations, the data processing system can access a set of predictive models that estimate expected execution time or resource consumption for each scheduled job component based on input parameters such as resource type, task complexity, or dependency structure. For example, the data processing system can input the number of qubits requested for a quantum task, the number of CPU cores allocated to a classical task, and/or the depth of a dependency chain into a predictive model (e.g., a rules-based function such as a lookup table, a regression model, etc.) to generate an estimated completion time for each task of the processing system. In some implementations, the data processing system can compare the estimated performance metrics against job- or task-specific constraints, such as a maximum allowable runtime or a required priority threshold, to determine whether the generated schedule satisfies the operational requirements.

For example, the data processing system can compare the predicted completion time of a job to a deadline value specified in job metadata, and/or can calculate a resource utilization score for the task(s) by aggregating the expected usage of computing resource across the scheduled time slices for the processing job. In some implementations, the data processing system can simulate execution of the schedule to estimate bottlenecks, idle intervals, or resource contention. To do so, the data processing system can generate time estimates for the execution of certain tasks when assigned to QPUs, CPUs, GPUs, and/or other accelerators based on the current processing schedule. For example, the data processing system 105 can assign simulated start times and durations to each scheduled task and compute expected resource occupancy, to identify times periods where one or more resources (e.g., QPUs, CPUs, GPUs, etc.) remain idle while others execute dependent operations. In another example, the data processing system can detect that a QPU is oversubscribed due to overlapping estimator groups, and/or that a classical node is underutilized during quantum circuit execution. If the estimated performance is satisfactory, the data processing system proceeds to execute ACT 516. If the estimated performance is not satisfactory, the data processing system proceeds to execute ACT 514.

The method 500, at ACT 514, can include updating the processing schedule. The data processing system can modify resource assignments, time slices, or execution order in response to detected performance issues, affinity violations, and/or resource contention. Using the method 500, the data processing system can iterate schedule generation until estimated performance metrics meet predefined thresholds, via returning to ACT 512 to determine whether the updated schedule satisfies performance metrics for the processing job. In some implementations, to update the processing schedule, the data processing system can reallocate job components to alternative resources, adjust pipeline stage boundaries, and/or redistribute time slices among competing tasks. For example, the data processing system can move a classical aggregation task to a less loaded classical system, and/or may stagger quantum task execution to reduce contention on a shared quantum system. In some implementations, the data processing system can identify a quantum estimator group assigned to a QPU that exhibits high queue depth and can reassign one or more estimator groups to a different QPU with lower utilization.

In some implementations, the data processing system can adjust the duration or frequency of time slices allocated to quantum systems or classical systems to balance resource usage, for example, by increasing the time slice for a quantum task with high priority and/or by reducing the time slice for a classical task that is not meeting a performance target. Similar operations can be performed for any task in the processing job to ameliorate any deficiencies identified in ACT 512. In some implementations, the data processing system can update the execution order of interdependent tasks to facilitate pipelined execution, for example, by advancing a classical post-processing task to overlap with the completion of a quantum measurement operation, and/or by delaying the start of a quantum task execution to align with the availability of input data from preceding classical task(s).

The method 500, at ACT 516, can include executing the job according to the schedule. To do so, any of the operations of the job executor 150 of FIG. 1 can be performed. The processing job may be executed, for example, by communicating with classical systems (e.g., classical systems 130) and quantum systems (e.g., quantum systems 132) of a distributed computing environment (e.g., the distributed computing environment 120 of FIG. 1). The data processing system can initiate execution of each task on its assigned computing resource according to the scheduled start time and duration (e.g., time slice, etc.) specified in the processing schedule, and can coordinate data transfer and pipeline stage transitions as specified in the processing schedule via communications. In some implementations, the data processing system can trigger quantum circuit execution on a quantum processing unit, launch classical computation on a graphics processing unit or central processing unit, and synchronize result aggregation or post-processing across pipeline stages. For example, the data processing system can allocate QPU time slices for estimator group execution, followed by immediate classical post-processing on a corresponding classical system, and can advance to subsequent job tasks as dependencies are satisfied, according to the processing schedule. Executing the processing job may include performing any of the error resolution techniques described herein.

Figure 6:
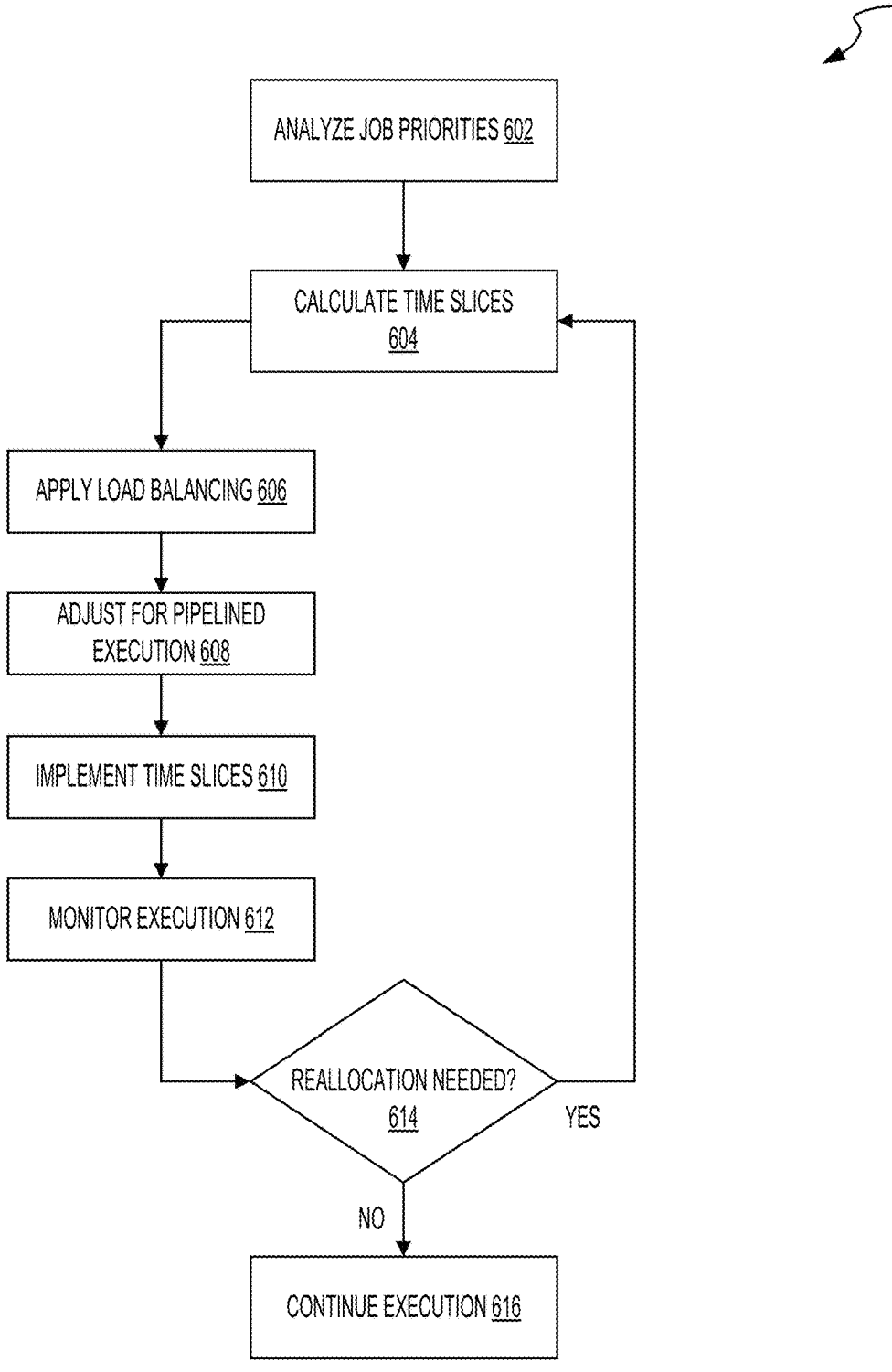
FIG. 6 is a flowchart illustrating an example dynamic cross-resource time slicing process for hierarchical quantum-classical scheduling, in accordance with one or more implementations.

Referring now to FIG. 6, illustrated is a flow chart of a method 600 depicting an example dynamic cross-resource time slicing process that may be implemented as part of hierarchical quantum-classical scheduling techniques. The method 600 may be performed, for example, by the data processing system 105 and/or any of the components thereof, including but not necessarily limited to the data structure generator 145 and the job executor 150. In brief overview of the method 600, the method 600 can include analyzing job priorities (ACT 602), calculating time slices (ACT 604), applying load balancing (ACT 606), adjusting for pipelined execution (ACT 608), implementing time slices (ACT 610), monitoring execution (ACT 612), determining whether reallocation is needed (ACT 614), and continuing execution (ACT 616).

The method 600, at ACT 602, can include analyzing priorities of tasks (e.g., classical tasks 172, quantum tasks 174), for example, of to-be-executed tasks represented in a processing schedule of a hierarchical data structure (e.g., hierarchical data structure 175) of a processing job (e.g., processing job 170). To do so, the data processing system can execute any of the operations of the job executor 150 of FIG. 1. The data processing system can access the hierarchical data structure to retrieve scheduling metadata associated with each task node (e.g., priority scores, deadline indicators, dependency information, etc.). In some implementations, the data processing system can evaluate priority annotations that are assigned during job partitioning or grouping, for example, by identifying a priority field in each node that reflects user-supplied priority, system-level policy, and/or dynamically computed priority based on task dependencies. In one example, the data processing system can compare priority values across quantum tasks and classical tasks to determine a relative execution order or to facilitate time slice allocation. Such approaches may include any of the operations described in connection with FIG. 5, in which processing schedules are generated.

The method 600, at ACT 604, can include calculating time slices. To do so, the data processing system can execute any of the operations of the job executor 150 of FIG. 1. The data processing system can determine the duration and allocation of execution windows for each task of a processing job. In some implementations, the data processing system can generate a time slice allocation matrix that specifies the start time, end time, and assigned resource (e.g., quantum system 132, classical system 130, processing component(s) thereof, etc.) for each task, where the matrix can be updated dynamically in response to processing job execution progress and/or observed system performance (e.g., monitored performance metrics during execution, as described herein).

The data processing system can allocate longer time slices to quantum or classical tasks associated with high-priority jobs or jobs with large resource requirements and can synchronize time slice boundaries across quantum systems and classical systems to facilitate pipelined execution. In some implementations, the data processing system can determine a priority score or resource requirement metric for each processing job and can assign a time slice duration to each quantum or classical task based on the computed score or metric. For example, the data processing system can allocate an extended execution window to a quantum or classical task associated with a high-priority indicator or a large qubit count and can align the start and end times of time slices across quantum systems and classical systems to enable sequential or overlapping execution of interdependent quantum tasks and classical tasks. The data processing system can access scheduling metadata, such as dependency relationships or affinity constraints, to determine which quantum or classical tasks require synchronized time slices and can update the time slice allocation matrix accordingly.

The data processing system can adjust the granularity of time slices at multiple levels of the job hierarchy (e.g., between shots, estimator groups, other tasks, etc.), to maximize resource utilization and minimize idle time. In some implementations, the data processing system can partition the execution timeline into fine-grained intervals for shot-level scheduling, intermediate intervals for estimator group-level scheduling, and/or coarse intervals for overall task- or group-level scheduling. For example, the data processing system can allocate short time slices to individual shot groups within a quantum task, medium-duration time slices to estimator groups that aggregate results from multiple shots, or long-duration time slices to processing jobs that encompass multiple estimator groups and classical tasks. Time intervals may be assigned as a function of task type, computing resource (e.g., to which the task is assigned) type, and/or type. The data processing system can select any suitable appropriate time slice granularity based on task requirements/assignments, resource availability, and/or observed system, and can update the hierarchical data structure to reflect the current allocation of time slices at each level of the processing job.

The cross-resource time slicing process can allocate execution time slices for unrelated processing jobs such that tasks from multiple jobs can be interleaved across available quantum and classical resources to maximize performance. In some implementations, the time slicing process can determine a set of candidate time slices for each processing job based on job priority, resource requirements, and current system load, and can assign non-overlapping execution windows to unrelated jobs on the same resource. For example, the time slicing process can allocate alternating time intervals on one or more quantum or classical systems to a first processing job and a second processing job. The allocation of time slices can be dynamically adjusted in response to observed job progress and/or changes in resource availability, such that the execution of tasks from unrelated jobs remains balanced and resource utilization is maximized. In some implementations, the time slicing process can update one or more time slice allocation matrices for the processing job(s) to indicate the interleaved execution plan.

The method 600, at ACT 606, can include applying load balancing. To do so, the data processing system can execute any of the operations of the job executor 150 of FIG. 1. Any suitable load balancing approach can be used to assign the time-sliced operations of the tasks determined in ACT 604 to the computing resources (e.g., classical systems 130, quantum systems 132) of the distributed computing environment (e.g., distributed computing environment 120). The data processing system can evaluate the current load on each computing resource in the distributed computing environment by accessing resource utilization metrics and can redistribute job assignments to balance the workload across available quantum and classical systems. In some implementations, the data processing system can migrate tasks from overloaded resources to underutilized resources, communicating/coordinating communication with the corresponding computing resources, and by updating the resource assignment fields in the hierarchical data structure and reallocating corresponding time slices. In one example, the data processing system can move a set of classical tasks from a heavily loaded CPU to a less utilized CPU and/or GPU, or can reassign quantum tasks to QPUs of alternative quantum systems.

The data processing system can recalculate time slice allocations and update the scheduling queue to reflect the new resource assignments, such that the processing load (e.g., processing tasks) are distributed in accordance with the execution order in the hierarchical data structure for the processing job. In some implementations, the data processing system can determine updated time slice durations for each resource by evaluating current task priorities, current computing resource utilization of the distributed computing system, and dependency relationships of yet-to-be-executed tasks included in the hierarchical data structure. For example, the data processing system can assign longer time slices to high-priority quantum tasks allocated to QPUs, or redistribute classical tasks among available classical systems to balance load and maintain pipeline continuity across sequential execution stages, using any suitable load balancing or time slicing function.

The method 600, at ACT 608, can include adjusting the assignment of one or more tasks/time slices for pipelined execution. To do so, the data processing system can execute any of the operations of the job executor 150 of FIG. 1. The data processing system can analyze dependency relationships among tasks and identify sequences of quantum and classical operations that can be executed in overlapping time intervals. In some implementations, the data processing system can segment groups/tasks specified in the hierarchical data structure (or the processing schedule thereof) into pipeline stages and align their execution time slices to maximize overlap, for example, by initiating a classical post-processing task as soon as corresponding partial quantum measurement results become available. In another example, the data processing system can stagger the start times of estimator/shot groups assigned to different quantum systems. The data processing system can update the processing schedule/hierarchical data structure and/or time slice allocation matrix to reflect adjusted pipeline boundaries and execution order of the tasks in the processing job.

The method 600, at ACT 610, can include implementing time slices. To do so, the data processing system can execute any of the operations of the job executor 150 of FIG. 1. The data processing system can initiate execution of each task on its assigned resource according to the scheduled start time and duration specified in the time slice allocation matrix. In some implementations, the data processing system can transmit input data, executable instructions/code, and/or configuration parameters to the designated quantum systems and/or classical systems at the beginning of each time slice and can coordinate the transfer of intermediate results between sequential or dependent operations using similar operations. For example, the data processing system can communicate instructions to one or more systems (or an orchestrator) of a distributed computing environment to trigger quantum circuit execution on a QPU during an allocated time slice and can launch classical computation on a GPU and/or CPU during a subsequent or overlapping time slice. The data processing system can repeatedly initiate and obtain results for each time slice to execute the tasks of the processing job.

The method 600, at ACT 612, can include monitoring execution of the processing job at the distributed computing environment. To do so, the data processing system can execute any of the operations of the job executor 150 of FIG. 1. The data processing system can access execution state information for each task assigned to quantum and/or classical systems of the distributed computing environment and can determine whether the assigned resource has completed execution, remains in progress, or is awaiting a dependency. In some implementations, the data processing system can access intermediate results or progress indicators generated by the computing systems of the distributed computing environment and can compare obtained execution progress to expected execution order encoded in the hierarchical data structure.

In some implementations, monitoring execution of the processing job can include obtaining performance metrics and/or resource utilization data of the quantum/classical systems executing the time slices generated for the tasks of the processing job. The data processing system can access utilization statistics and performance counters from each quantum and/or classical system assigned to execute one or more time slices, including but not limited to error rate, processor load, memory consumption, or QPU gate execution rates, among others. In some implementations, the data processing system can compare the obtained metrics to expected resource usage parameters specified in the hierarchical data structure for the processing job to determine whether execution progress aligns with the allocated time slices or whether dynamic adjustment of resource assignments is indicated.

The method 600, at ACT 614, can include determining whether reallocation is needed. To do so, the data processing system can execute any of the operations of the job executor 150 of FIG. 1. The data processing system can use the data obtained in ACT 612 to identify tasks or job segments that may benefit from reallocation to different computing resources in the distributed computing environment. In some implementations, the data processing system can detect that a computing resource has become unavailable, overloaded, and/or underutilized and can determine that one or more tasks should be migrated to improve resource utilization. For example, the data processing system can identify a classical task that remains pending on a classical system that has become heavily loaded and can determine that the task is to be reallocated to another classical system with available capacity. This process can be repeated for each task awaiting execution, with priority given to tasks that are currently being executed and/or tasks that are enqueued for execution. If the data processing system determines that reallocation is not needed, the process can continue execution of the processing job at ACT 616. If the data processing system determines that reallocation is needed, the process can move back to ACT 604 to recalculate time slices.

The method 600, at ACT 616, can include continuing execution. To do so, the data processing system can execute any of the operations of the job executor 150 of FIG. 1. The data processing system can proceed with the execution of tasks, and monitoring performance as in ACT 612, according to time slice allocations determined in ACTS 604-608, including initiating time slices for unexecuted tasks and coordinating data transfers among computing systems (e.g., via instructions to the distributed computing environment) as dependencies are satisfied. In some implementations, the data processing system can repeat the process of monitoring execution, determining whether reallocation is needed, and updating resource assignments and time slices until all tasks associated with the processing job have completed execution according to the techniques described herein.

Figure 7:
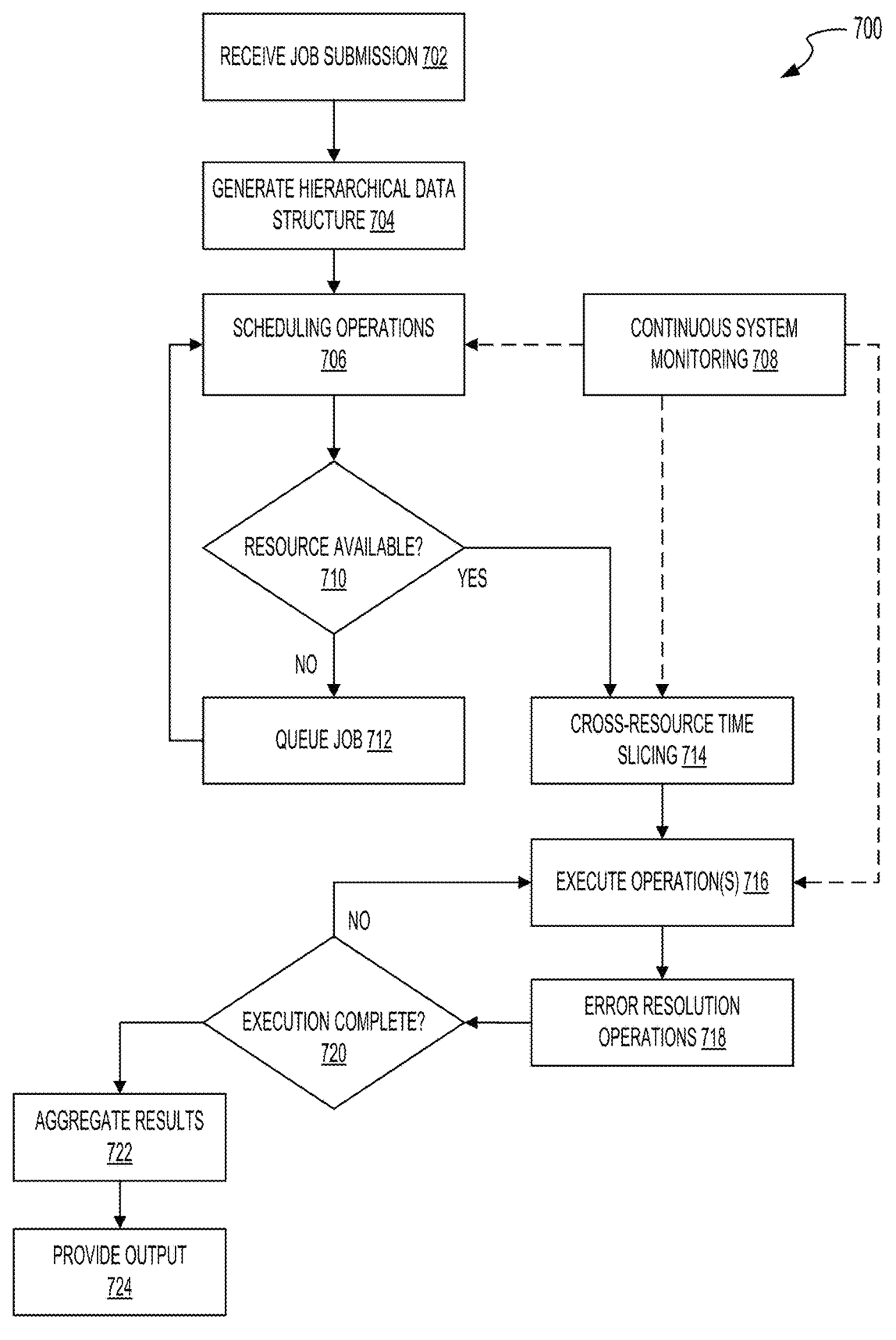
FIG. 7 is a flowchart illustrating an example process for allocating and executing processing jobs using hierarchical quantum-classical scheduling techniques, in accordance with one or more implementations.

Referring now to FIG. 7, illustrated is a method 700 depicting an example process for allocating and executing processing jobs using hierarchical quantum-classical scheduling techniques. The method 600 may be performed, for example, by the data processing system 105 and/or any of the components thereof. In brief overview of the method 700, the method 700 can include receiving a job submission (ACT 702), generating a hierarchical data structure (ACT 704), performing scheduling operations (ACT 706), performing continuous system monitoring (ACT 708), determining whether resources are available for the requested processing job (ACT 710), queueing the job (ACT 712), performing cross-resource time slicing (ACT 714), executing one or more operations (ACT 716), performing error resolution operations (ACT 718), determining whether execution is complete (ACT 720), aggregating results (ACT 722), and providing output (ACT 724).

The method 700, at ACT 702, can include receiving one or more job submission(s). To do so, the data processing system may perform any of the operations described in connection with the processing job obtainer 135 of FIG. 1. The data processing system can receive a quantum-classical job specification through an API or any other suitable interface. The job specification (e.g., for a processing job 170) may include specify different types of tasks, resource requirements, dependency annotations, and/or priority indicators. In some implementations, the data processing system can parse the received job submission to extract partition types such as quantum sub-tasks, classical pre- or post-processing operations, or GPU-accelerated kernels, and can access structured metadata describing resource constraints and execution dependencies, as described in connection with FIGS. 1-6.

The method 700, at ACT 704, can include generating a hierarchical data structure for submitted processing jobs. To do so, the data processing system may perform any of the operations described in connection with the operation determiner 140 and the data structure generator 145 of FIG. 1. The data processing system can generate a hierarchical data structure that can encode the partitioned job tasks as multi-level groupings, such as quantum tasks, classical tasks, resource-specific jobs, estimator groups, and shot groups, as described in connection with FIGS. 2 and 4. In some implementations, the data processing system can assign metadata fields to each node in the hierarchical data structure, including resource requirements, execution priority, error budgets, and affinity constraints, and can generate edges to represent processing dependencies among the grouped tasks. The data processing system can generate a hierarchical data structure for each processing job obtained in ACT 702.

The method 700, at ACT 706, can include performing scheduling operations. To do so, the data processing system can perform any of the operations described in connection with the data structure generator 145 of FIG. 1. The data processing system can perform scheduling operations by traversing the hierarchical data structure to determine execution order, resource allocation, and affinity relationships among job tasks, as described herein. In some implementations, the data processing system can implement a gang scheduling function, as described herein, to allocate interdependent quantum and/or classical tasks to corresponding computing resources (e.g., classical systems 130, quantum systems 132), and can identify pipelining opportunities based on dependency links and resource availability.

The method 700, at ACT 708, can include performing continuous system monitoring. ACT 708 may be performed in parallel with other ACTs of the method 700. The data processing system can perform continuous system monitoring by obtaining metrics from quantum and classical systems of a distributed computing environment (e.g., the distributed computing environment 120) upon which the processing jobs received at ACT 702 are to be generated. Such metrics may include, but are not limited to, computing resource utilization, job execution progress, and operational parameters, among any other metrics described herein. In some implementations, the data processing system can monitor the execution state of multiple processing jobs in a scheduling queue, updating the status of each job and its associated tasks as resources become available or as execution progresses. For example, the data processing system can detect when a resource assigned to a first processing job becomes idle and can reallocate the resource to a pending task from a second processing job, thereby enabling interleaved execution of multiple jobs.

The method 700, at ACT 710, can include determining whether resources are available for the requested processing job. The data processing system can determine whether resources are available by comparing the resource requirements specified in the hierarchical data structure of a given job to the current inventory of available quantum and classical resources, which may be obtained in ACT 708. If computing resources are available to begin executing one or more tasks of the processing job (e.g., other processing jobs are not already enqueued/assigned to be executed by computing resources, etc.), the data processing system can proceed to ACT 714. If processing resources are not yet available, the data processing system can proceed to ACT 712 to enqueue the processing job future execution.

The method 700, at ACT 712, can include queueing the processing job. The data processing system can queue the job by inserting a reference to the job into a scheduling queue when required resources are not available, and can assign a queue position based on scheduling policy, job priority, and/or deadline constraints. In some implementations, the data processing system can update the state of the processing job to indicate pending status and can periodically reevaluate resource availability to determine when the job can proceed. The scheduling queue can maintain references to multiple processing jobs awaiting execution, and the data processing system can reorder the queue in response to changes in resource availability, job priority, or scheduling policy. For example, the data processing system can promote a high-priority job to an earlier position in the queue when additional resources become available, and/or can defer execution of a job with unsatisfied resource constraints until a compatible resource is released by another processing job.

The method 700, at ACT 714, can include performing cross-resource time slicing. To do so, any of the operations of the data structure generator 145 and/or the job executor 150 can be performed. The data processing system can perform cross-resource time slicing by allocating execution windows for quantum and classical tasks across available resources, generating time slice assignments at multiple levels of the job hierarchy. In some implementations, the data processing system can synchronize time slices among interdependent tasks to facilitate pipelined execution and can dynamically adjust time slice durations in response to job progress or resource contention. When multiple processing jobs are scheduled for execution, the data processing system can interleave time slices for tasks from different jobs on shared resources (e.g., quantum systems 132, classical systems 130). For example, the data processing system can allocate alternate time slices between quantum tasks from a first processing job and quantum tasks from a second processing job, and can perform similar operations for classical operations, as described herein.

The method 700, at ACT 716, can include executing one or more operations according to the time slicing performed at ACT 716. The data processing system can execute one or more operations by initiating task execution on the assigned quantum or classical systems according to the determined processing schedule(s) and time slice assignments for each processing job. To do so, any of the operations of the job executor 150 of FIG. 1 can be performed. The data processing system can execute operations from multiple processing jobs simultaneously (e.g., on different quantum/classical systems of the distributed computing environment, etc.) and/or in an interleaved manner, such that resources are allocated according to a composite schedule generated from the jobs present in the scheduling queue. Such processing schedules may be generated using any of the operations described herein, including those described in connection with FIGS. 4-6.

The method 700, at ACT 718, can include performing error resolution operations. To do so, any of the operations of the telemetry data obtainer 155 and/or the error manager 160 of FIG. 1 can be performed. The data processing system can perform error resolution operations by selecting and applying error mitigation and/or correction techniques to quantum tasks based on job requirements, quantum system error models/profiles, and/or observed error rates, as described in connection with FIGS. 1 and 8. In some implementations, the data processing system can select among candidate error correction codes or mitigation strategies and insert additional tasks into the hierarchical data structure for a processing job to implement the selected error resolution operations, as described herein. When multiple processing jobs are executed simultaneously or interleaved, the data processing system can apply error resolution operations independently for each job, for example, by updating the corresponding hierarchical data structures to reflect the selected techniques and any changes to error budgets or task dependencies according to the techniques described herein.

The method 700, at ACT 720, can include determining whether execution of a processing job is complete. The data processing system can determine whether execution is complete by evaluating the execution status of all tasks represented in the hierarchical data structure for the processing job, and by checking for completion flags and/or pending dependencies or tasks that have not yet been executed. If all tasks for a processing job have been executed, the data processing system can proceed to ACT 722. If at least some tasks of the processing job are still to be executed, the data processing system can return to ACT 716 to execute the yet unexecuted classical and/or quantum tasks. When multiple processing jobs are being executed, the data processing system can monitor the completion status of each job independently.

The method 700, at ACT 722, can include aggregating results for a completed processing job. The data processing system can aggregate results by collecting output data from completed quantum and/or classical tasks, which may involve combining partial results according to dependency relationships, groupings, and/or aggregation operations specified in the hierarchical data structure. In some implementations, the data processing system can perform aggregation operations that include but are not limited to merging, concatenation, and/or statistical computation to generate one or more sets of output data for the processing job. When multiple processing jobs are executed simultaneously or interleaved, the data processing system can aggregate results for each job independently to generate separate sets of output data corresponding to each processing job.

The method 700, at ACT 724, can include providing output. The data processing system can provide output by transmitting the aggregated results to any requesting entity and/or designated storage location (e.g., as specified in the job submission, job metadata, etc.). In some implementations, the data processing system can generate a response including result identifiers, output data references, status indicators and/or any additional metadata for one or more tasks as part of the aggregated results. For multiple processing jobs executed simultaneously or interleaved, the data processing system can provide output for each job independently, using similar techniques.

Referring now to FIG. 8, illustrated is a method 800 of hierarchical scheduling and execution of hybrid quantum-classical computing jobs in a distributed computing system. The method 800 may be performed, for example, by the data processing system 105 described in connection with FIG. 1, for example, to schedule and execute processing jobs via a distributed computing environment such as the distributed computing environment 120 of FIG. 1. In brief overview of the method 800, the method 800 can include obtaining a processing job for a distributed computing system including classical and quantum computing systems (ACT 805), determining a set of classical computing operations and a set of quantum computing operations for the processing job (ACT 810), generating a hierarchical data structure for the processing job based on the classical and quantum operations (ACT 815), and executing the processing job according to the hierarchical data structure via subsets of classical and quantum computing systems (ACT 820).

The method 800, at ACT 805, can include obtaining a processing job (e.g., processing job 170) for a distributed computing system (e.g., distributed computing environment 120) including classical computing systems (e.g., classical systems 130) and quantum computing systems (e.g., quantum systems 132). The processing job may be obtained via an API and/or any other suitable interface. The processing job may be provided as a processing job specification, as described herein. In some implementations, the processing job can be received as a structured job description in a domain-specific language, a markup language, or a data format such as YAML or JSON. For example, the processing job can be submitted by a client device or a remote orchestration system, and may specify partitioning strategies, resource requirements, dependency annotations, and/or execution priorities. In some implementations, the processing job can be obtained through a web-based user interface, a command-line submission tool, and/or a message-passing protocol such as gRPC or Advanced Message Queuing Protocol (AMQP), among others. The processing job can include references to input data locations, output data destinations, and metadata describing quantum and classical task segmentation, as described herein.

The method 800, at ACT 810, can include determining a set of classical computing operations (e.g., classical tasks 172) and a set of quantum computing operations (e.g., quantum tasks 174) for the processing job. To do so, any of the operations of the operation determiner 140 of FIG. 1 can be performed. The data processing system can parse the job specification to classify each computational task as either a classical computing operation or a quantum computing operation based on algorithm descriptors, resource indicators, and/or explicit annotations in the job specification. In some implementations, the data processing system can generate a structured representation of the classical computing operations and the quantum computing operations, each associated with resource requirements, execution constraints, and dependency links. For example, the data processing system can identify classical pre-processing, quantum circuit execution, and/or classical post-processing segments.

The method 800, at ACT 815, can include generating a hierarchical data structure (e.g., a hierarchical data structure 175) for the processing job based on the set of classical computing operations and the set of quantum computing operations. The data processing system can generate a hierarchical data structure, such as a directed graph data structure, that encodes multi-level relationships among the classical computing operations and the quantum computing operations, including groupings, dependencies, and/or priority scores. In some implementations, the data processing system can generate the hierarchical data structure to include a processing schedule that accounts for resource availability, time-slicing, and affinity constraints, and can update the structure in response to observed execution state or system monitoring, for example, as described in connection with FIGS. 4-6. For example, the data processing system can assign nodes to represent resource-specific tasks, estimator groups, and/or shot groups, and can update the hierarchical data structure according to estimated resource allocation and/or execution order, as described herein.

The method 800, at ACT 820, can include executing the processing job according to the hierarchical data structure via a subset of the classical computing systems and a subset of the quantum computing systems. To do so, any of the operations of the job executor 150 of FIG. 1 can be performed. The data processing system can allocate the set of classical computing operations to a subset of the classical computing systems and the set of quantum computing operations to a subset of the quantum computing systems according to a gang scheduler function, and can execute the processing job by initiating task execution in accordance with the processing schedule of the hierarchical data structure and time-slicing assignments encoded in the hierarchical data structure. Time-slicing operations are described in further detail in connection with FIG. 6, any operations of which may be executed as part of ACT 820. In some implementations, the data processing system can monitor execution progress, update the hierarchical data structure in response to system state, and dynamically re-allocate at least one of the classical/quantum computing operations to a second subset of the classical/quantum computing systems based on updated scheduling decisions, as described herein.

Referring now to FIG. 9, illustrated is a method 900 of adaptive selection and application of error resolution techniques in a hierarchical quantum-classical job scheduling system. The method 900 may be performed, for example, by the data processing system 105 described in connection with FIG. 1, for example, to select and apply error resolution techniques for processing jobs including quantum tasks executed via a distributed computing environment such as the distributed computing environment 120 of FIG. 1. In brief overview of the method 900, the method 900 can include obtaining telemetry data corresponding to a processing job (ACT 905), determining, based on the telemetry data, that an error resolution technique is to be applied to a quantum portion of the processing job (ACT 910), selecting, for the quantum portion, the error resolution technique from a plurality of error correction techniques and a plurality of error mitigation techniques (ACT 915), and updating a hierarchical data structure representing the processing job to include the error resolution technique in association with the quantum portion of the processing job (ACT 920).

The method 900, at ACT 905, can include obtaining telemetry data corresponding to a processing job (e.g., processing job 170). To do so, any of the operations of the telemetry data obtainer 155 of FIG. 1 can be performed. The data processing system can obtain telemetry data from a quantum system (e.g., one or more quantum systems 132) and/or one or more QPUs thereof assigned to execute a quantum portion (e.g., a quantum task 174) of the processing job. As described herein, the telemetry data can include but is not limited to a noise metric, a qubit fidelity value, a two-qubit gate fidelity value, a measurement fidelity value, or a coherence time value. The noise metric can represent a quantitative measure of unwanted disturbances affecting quantum operations. The qubit fidelity value can indicate the accuracy with which a quantum state is prepared or maintained. The two-qubit gate fidelity value can specify the precision of operations involving pairs of qubits. The measurement fidelity value can quantify the reliability of readout processes performed on quantum states. The coherence time value can denote the duration over which a qubit retains its quantum state before decoherence occurs. In some implementations, the data processing system can access a set of historical measurements for use with or in place of the obtained telemetry data.

The method 900, at ACT 910, can include determining, based on the telemetry data, that an error resolution technique is to be applied to a quantum portion (e.g., a quantum task 174) of the processing job. To do so, any of the operations of the error manager 160 of FIG. 1 can be performed. The data processing system can determine, for the quantum portion, whether the operational parameters indicated by the telemetry data satisfy a required error budget or a requested coherence time, where the requested coherence time can be determined based at least in part on a gate depth of a quantum circuit to be executed. In some implementations, the data processing system can compare the requested coherence time of one or more quantum tasks (e.g., identified from the processing job according to the techniques described herein) to a measured or estimated coherence time for one or more quantum systems derived from the telemetry data, and can determine that an error resolution technique is to be applied when the measured coherence time does not satisfy the requested coherence time. In some implementations, the data processing system can determine that when the error budget is not met, for example, due to a historical error rate of one or more quantum systems indicated in historical telemetry data, as described herein.

The method 900, at ACT 915, can include selecting, for the quantum portion, the error resolution technique from a plurality of error correction techniques (e.g., error correction techniques 180) and a plurality of error mitigation techniques (e.g., error mitigation techniques 185). To do so, any of the operations of the error manager 160 of FIG. 1 can be performed. The data processing system can select the error resolution technique by evaluating operational parameters associated with the quantum portion and the quantum computing system to which the quantum portion is assigned.

For example, the data processing system can determine a requested coherence time for the quantum portion based at least in part on a gate depth of a quantum circuit to be executed, and can compare the requested coherence time to a measured coherence time for the quantum computing system derived from telemetry data and/or historical measurements, as described in connection with FIG. 1. In some implementations, the data processing system can select an error correction technique when the requested coherence time exceeds the measured coherence time, or can select an error mitigation technique when the measured coherence time satisfies the requested coherence time. In some implementations, the data processing system can further base the selection on an error budget for the quantum portion and/or a predicted fidelity score for each candidate technique.

In some implementations, the data processing system can generate, for each candidate error correction technique and/or for each candidate error mitigation technique, a respective score representing a likelihood of expected fidelity upon applying the technique. The data processing system can evaluate operational parameters associated with a quantum portion of a processing job and a quantum computing system to which the quantum portion is assigned, and can apply a rule-based or probabilistic scoring function to each candidate technique, as described in connection with FIG. 1. For example, the data processing system can access metadata describing circuit depth, required fidelity, and/or error budget for the quantum portion, and can retrieve operational metrics (e.g., as part of the telemetry data in ACT 905) for the quantum computing system. In some implementations, the data processing system can reference a lookup table that associates code distance and physical error rates with logical fidelity for candidate error correction techniques.

The method 900, at ACT 920, can include updating a hierarchical data structure representing the processing job to include the error resolution technique in association with the quantum portion of the processing job. To do so, any of the operations of the error manager 160 of FIG. 1 can be performed. The data processing system can update a directed graph data structure (e.g., the hierarchical data structure 175 or a portion thereof) representing the processing job by adding at least one node corresponding to the selected error resolution technique. In some implementations, the node may represent at least one additional classical computing task that is to implement the selected error resolution technique for the quantum portion of the processing job, as described herein. In some implementations, the data processing system can associate the selected error resolution technique, any updated resource requirements, and any dependencies with the quantum portion in the hierarchical data structure. The data processing system can execute the quantum portion of the processing job and any associated error mitigation techniques as part of the execution process for the processing job, as described herein.

Figure 10:
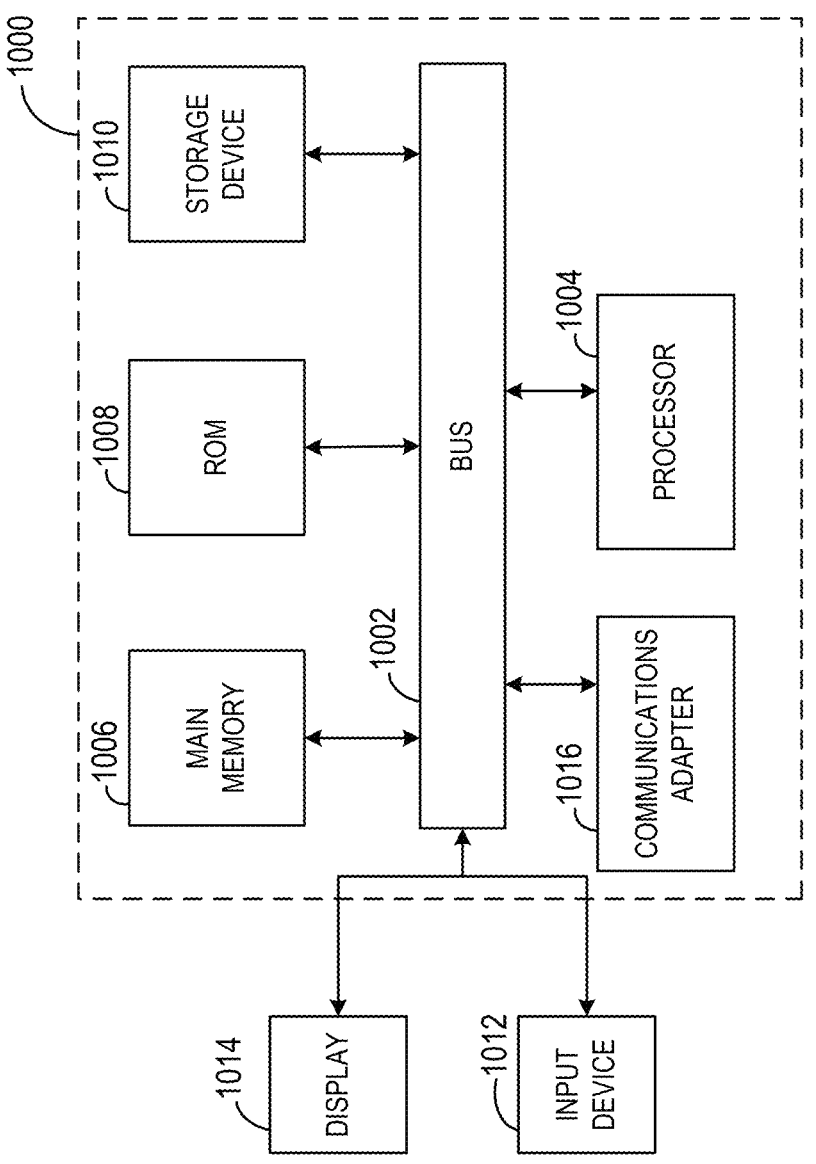
FIG. 10 is a block diagram illustrating an example computing system architecture suitable for implementing components of a hierarchical quantum-classical scheduling system, in accordance with one or more implementations.

FIG. 10 is a component diagram of an example computing system suitable for use in the various implementations described herein, according to an example implementation. For example, the computing system 1000 may implement the data processing system 105, one or more of the classical systems 130, the classical computing system 1128, or various other example systems and devices described in the present disclosure.

The computing system 1000 includes a bus 1002 or other communication component for communicating information and a processor 1004 coupled to the bus 1002 for processing information. The computing system 1000 also includes main memory 1006, such as a RAM or other dynamic storage device, coupled to the bus 1002 for storing information, and instructions to be executed by the processor 1004. Main memory 1006 can also be used for storing position information, temporary variables, or other intermediate information during execution of instructions by the processor 1004. The computing system 1000 may further include a ROM 1008 or other static storage device coupled to the bus 1002 for storing static information and instructions for the processor 1004. A storage device 1010, such as a solid-state device, magnetic disk, or optical disk, is coupled to the bus 1002 for persistently storing information and instructions.

The computing system 1000 may be coupled via the bus 1002 to a display 1014, such as a liquid crystal display, or active-matrix display, for displaying information to a user. An input device 1012, such as a keyboard including alphanumeric and other keys, may be coupled to the bus 1002 for communicating information, and command selections to the processor 1004. In another implementation, the input device 1012 has a touch screen display. The input device 1012 can include any type of biometric sensor, or a cursor control, such as a mouse, a trackball, or cursor direction keys, for communicating direction information and command selections to the processor 1004 and for controlling cursor movement on the display 1014.

In some implementations, the computing system 1000 may include a communications adapter 1016, such as a networking adapter. Communications adapter 1016 may be coupled to bus 1002 and may be configured to enable communications with a computing or communications network or other computing systems. In various illustrative implementations, any type of networking configuration may be achieved using communications adapter 1016, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 1000 in response to the processor 1004 executing an implementation of instructions contained in main memory 1006. Such instructions can be read into main memory 1006 from another computer-readable medium, such as the storage device 1010. Execution of the implementation of instructions contained in main memory 1006 causes the computing system 1000 to perform the illustrative processes described herein. One or more processors in a multi-processing implementation may also be employed to execute the instructions contained in main memory 1006. In alternative implementations, hard-wired circuitry may be used in place of or in combination with software instructions to implement illustrative implementations. Thus, implementations are not limited to any specific combination of hardware circuitry and software.

Figure 11:
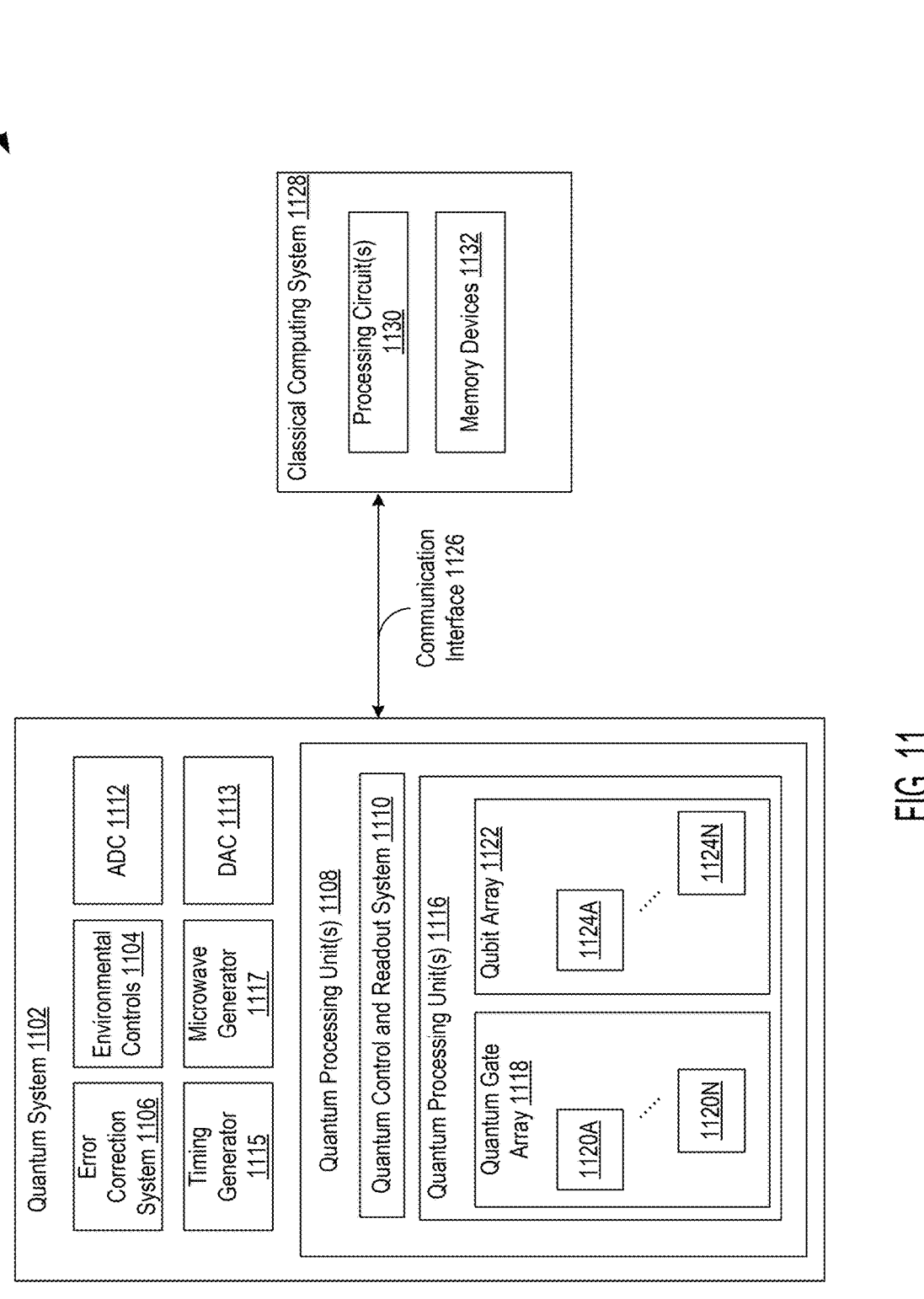
FIG. 11 is a block diagram illustrating the architecture of a hybrid quantum-classical computing system including quantum and classical subsystems and their interconnections, in accordance with one or more implementations.

Referring now to FIG. 11, illustrated is a block diagram of an example quantum system 1100 including a quantum system 1102 integrated with a classical computing system 1128, in accordance with one or more implementations. The quantum system 1102 can include environmental controls 1104, a quantum error correction system 1106, at least one analog-to-digital converter 1112, at least one digital-to-analog converter 1113, a timing generator 1115, a microwave generator 1117, and at least one quantum device 1108, at least one quantum control and readout system 1110, at least one quantum processing unit 1116, at least one quantum gate array 1118, one or more quantum gate elements 1120A-1120N, at least one qubit array 1122, and one or more qubits 1124A-1124N. The system 1100 can further include at least one communication interface 1126. The system 1100 can include a computing system 1128, which can include one or more processing circuits 1130 and one or more memory devices 1132.

The system 1100 or portions thereof may be provided in a controlled environment. For example, the ambient environment can correspond to a controlled environment having an ambient temperature near room temperature (e.g., 60 degrees Fahrenheit (° F.) to 80° F., etc.). The ambient environment is not limited to the range of room temperatures. For example, the ambient environment of the qubit array 1122 can correspond to an environment having a temperature within the range of 0 Kelvin (K) to 110 K, corresponding to a superconducting temperature ambient environment.

The classical computing system 1128 can include at least one processor and a memory (e.g., a processing circuit). The classical computing system 1128 may be used to implement one or more of the classical systems 130 of FIG. 1. The memory can store processor-executable instructions that, when executed by processor(s), cause the processor(s) to perform one or more of the operations described herein. The processing circuit(s) 1130 may include a general-purpose processor (e.g., a CPU, etc.), an ASIC, a GPU, a TPU, an FPGA, the like, or combinations thereof. The memory may include, but is not limited to, electronic, optical, magnetic, or any other storage or transmission device capable of providing the processor with program instructions. The memory devices 1132 may further include a high-speed memory devices (e.g., high-bandwidth memory devices, high-bandwidth RAM/VRAM, etc.), memory chips, ASIC, FPGA, ROM, RAM, EEPROM, EPROM, flash memory, optical media, and/or any other suitable memory from which the processor(s) can read instructions and/or data. The instructions may include code from any suitable computer programming language. The classical computing system 1128 can include one or more computing devices or servers that can perform various functions as described herein. The classical computing system 1128 can include any or all of the components and perform any or all of the functions of any computing system described herein.

The quantum computing system 1100 can include at least one communication interface 1126. The communication interface 1126 can be used to exchange information between components of the quantum system 1102 and the classical computing system 1128. The communication interface 1126 can facilitate the transmission of instructions, signals, status information, conditions, states, and any other information necessary for coordinating tasks and operations across the quantum and classical subsystems. This interface can include one or more digital, analog, or similar communication channels. The communication interface 1126 can include all connections, protocols, and supporting hardware or software to implement communication between the classical and quantum parts of the system, allowing for hybrid computational workflows.

The quantum computing system 1100 can include the quantum system 1102. The quantum system 1102 may be used to implement any of the quantum system(s) 132 of FIG. 1. The quantum system 1102 can be configured to provide the physical infrastructure necessary for quantum information processing and execution of quantum algorithms. The quantum system 1102 can include components and subsystems required to support quantum operations and establish the proper physical environment for the operation of quantum processing elements. In some implementations, the quantum system 1102 can be coupled to the environmental controls 1104 and the quantum error correction system 1106 to maintain appropriate operational conditions and support reliable quantum circuit execution. The quantum system 1102 can interoperate with the quantum control and readout system 1110 and can be interfaced, via the communication interface 1126, with the classical computing system 1128. The quantum system 1102 can include one or more environmental controls 1104.

The quantum system 1102 can include one or more environmental controls 1104. The environmental controls 1104 can be configured to maintain precise physical conditions necessary for stable and reliable quantum operations. The environmental controls 1104 can comprise a range of subsystems designed to regulate factors such as temperature, pressure, humidity, magnetic fields, electromagnetic interference, and radiation, all of which can affect the performance and coherence time of quantum devices. For example, in superconducting quantum processors, environmental controls 1104 can include cryogenic refrigeration units or dilution refrigerators that cool the quantum hardware to millikelvin temperatures to enable superconductivity and minimize thermal noise. In trapped ion or neutral atom systems, environmental controls 1104 can encompass vacuum chambers to minimize atomic collisions and laser stabilization systems to control various optical devices.

In some implementations, in addition to temperature and pressure regulation, the environmental controls 1104 can incorporate active magnetic shielding to prevent external fields from disturbing qubit operations, as well as vibration isolation platforms to reduce mechanical noise. These control systems may be controlled by controllers or integrated electronics. The integration of environmental controls 1104 within the quantum system 1102 can support achieving low error rates and consistent quantum circuit execution in the quantum computing system 1100.

The quantum system 1102 can include a quantum error correction system 1106. The quantum error correction system 1106 can be a system configured to detect and correct errors arising during quantum computation or storage. The quantum error correction system 1106 can consist of dedicated circuits, hardware modules, or physical subsystems, as well as supporting software, that are designed to implement error correction protocols, such as surface codes, concatenated codes, or other stabilizer codes, in order to preserve the fidelity of quantum states and protect against decoherence, gate errors, or environmental noise. Hardware suitable for quantum error correction can encompass ancillary qubits, syndrome measurement circuits, control electronics, and real-time feedback systems, while error correction software can execute operations for syndrome extraction, error diagnosis, and corrective feedback. In some implementations, the quantum error correction system 1106 can include cryogenic controllers, programmable logic devices, and/or firmware to facilitate the detection and correction of quantum errors.

The analog-to-digital converter 1112 can receive analog measurement signals generated by the quantum control and readout system 1110 and can convert the received analog signals into corresponding digital data. The analog-to-digital converter 1112 can sample the analog input at a predetermined rate and can generate digital output values that represent the amplitude or phase of the measurement signal at each sample point. In some implementations, the analog-to-digital converter 1112 can store the generated digital data in memory devices 1132 or can transmit the digital data to the classical computing system 1128 for subsequent processing, storage, or calibration analysis.

The digital-to-analog converter 1113 can receive digital control data from the classical computing system 1128 or the quantum control and readout system 1110 and can convert the received digital data into corresponding analog control signals. The digital-to-analog converter 1113 can generate analog voltage or current signals that are applied to the quantum processing unit 1116 to implement control operations such as qubit drive, flux bias, or readout pulse generation. In some implementations, the digital-to-analog converter 1113 can adjust the amplitude, frequency, or phase of the analog output according to the digital input values of the control and readout system 1110.

The timing generator 1115 can generate timing reference signals that coordinate the operation of the quantum processing unit 1116, the quantum control and readout system 1110, and the classical computing system 1128. The timing generator 1115 can produce clock signals, trigger pulses, or synchronization markers that define the timing of control pulses, measurement windows, or calibration experiments. In some implementations, the timing generator 1115 can store timing configuration data in memory devices 1132 or can receive timing instructions to align calibration operations with processor activity.

The microwave generator 1117 can generate microwave signals used to implement control pulses for qubit operations in the quantum processing unit 1116. The microwave generator 1117 can produce signals at specified frequencies, amplitudes, and phases according to control instructions received from the classical computing system 1128 or the calibration controller. In some implementations, the microwave generator 1117 can modulate the generated signals to produce shaped pulses for gate operations, readout, or calibration experiments, and can transmit the microwave signals to the quantum processing unit 1116 via a drive line controller or other signal routing hardware.

The quantum system 1102 can include at least one quantum device 1108. The quantum device 1108 can be configured to perform quantum computations by executing quantum circuits and manipulating quantum information. The quantum device 1108 can serve as the primary computational element within the quantum system 1102, orchestrating the application of quantum gates, qubit operations, and measurement processes required by quantum algorithms. The quantum device 1108 can be composed of specialized physical subsystems, such as superconducting resonators, trapped-ion arrays, photonic circuits, semiconductor quantum dots, neutral atom arrays, topological qubits, or other device architectures capable of realizing and controlling qubit states. In some implementations, the quantum device 1108 can interact with quantum control and readout system 1110 to receive gate instructions, perform operations at the hardware level, and provide measurement results to the classical computing system 1128. The quantum device 1108 can also be integrated with the quantum error correction system 1106, the quantum memory 1114, and the quantum gate array 1118 within the quantum system 1102 to enable reliable, high-fidelity execution of quantum algorithms in the quantum computing system 1100.

The quantum device 1108 can include a quantum control and readout system 1110. The quantum control and readout system 1110 can manipulate and measure quantum states within the quantum system 1102. The quantum control and readout system 1110 can generate and deliver control signals, such as microwave pulses, laser fields, or voltage pulses, by receiving timing references from the timing generator 1115, analog signals from the digital-to-analog converter 1113, and microwave signals from the microwave generator 1117. The quantum control and readout system 1110 can facilitate the implementation of quantum gates, entanglement protocols, and qubit initialization necessary for quantum algorithm execution by coordinating the sequencing and timing of control pulses with the timing generator 1115. The quantum control and readout system 1110 can coordinate the timing and sequencing of these operations with high precision via the other components of the quantum system 1102. In some implementations, the quantum control and readout system 1110 can receive digital control data from the classical computing system 1128, convert the data to analog signals using the digital-to-analog converter 1113, and deliver the resulting pulses to the quantum device 1108. In addition, the quantum control and readout system 1110 may facilitate qubit initialization to specified states (e.g., $|0\rangle$, $|+\rangle$), as well as the measurement of specific qubits or quantum registers, such as the most significant qubits or all relevant outputs, measuring expectation values, bitstring outcomes, or the full quantum register state.

In addition to control, the quantum control and readout system 1110 can perform high-fidelity measurement and readout of qubit states, converting quantum information into classical data that can be further processed by the classical computing system 1128. The measurement systems can vary by technology, including, but not limited to, microwave resonators, lasers, photonic, or single-photon detectors. The quantum control and readout system 1110 can receive analog measurement signals from the quantum device 1108, amplify and filter the signals, and digitize the measurement data using the analog-to-digital converter 1112 to obtain accurate and reliable state information following quantum operations or quantum circuit execution. The quantum control and readout system 1110 can interface with the classical control electronics 1132 to facilitate the transfer of measurement results and control data between quantum and classical subsystems.

The quantum device 1108 can include at least one quantum processing unit 1116. The quantum processing unit 1116 can include a logical or physical arrangement of quantum gates and qubits designed to execute specific quantum algorithms or operations. The quantum processing unit 1116 can define the sequence and connectivity of quantum gate elements, such as single-qubit operations or multi-qubit entangling operations, which act on the qubit array 1122 to manipulate quantum states according to a task. The configuration and parameters of the quantum processing unit 1116 can include operational parameters or specific gate configurations.

The quantum processing unit 1116 can include one or more qubits 1124A-1124N. The qubits 1124 can function as the fundamental units of quantum information, each capable of being realized using various quantum technologies. The qubits 1124 can be implemented using superconducting circuits, trapped ions, photonic platforms, semiconductor quantum dots, neutral atom arrays, or other physical systems. The qubits 1124 can be initialized to a specific state, such as |0> or |1>, a point on a Bloch sphere, or to other suitable state such as |+> or |–>. The qubits 1124 can also be prepared in a superposition of these states, such as |ψ>=α|0>+β|1>, where α and β represent amplitudes. The qubits 1124 can exist in standalone states or in entangled states with other qubits. Other characteristics of the qubits, such as coherence time, control fidelity, and error rates, can influence the execution of quantum operations and the design of error correction protocols.

The qubit 1124 can store information in various forms, such as a state vector, density matrix, or probability distribution. The qubit 1124 can support representation in multiple bases including, but not limited to, Z or computational, X or Hadamard, or Pauli-Y bases. A system of qubits can collectively represent the state of the quantum circuit, including configurations for advanced algorithms. In some implementations, during quantum processing, qubits in superposed and entangled states can exist and be manipulated via quantum gates. In some implementations, measurement of one or more qubits (e.g., qubits in a superposition state) by the measurement system will collapse the qubit into a defined state following the principles of quantum mechanics including wave function collapse and the observer effect. The measurement and sometimes collapse of a qubit state can result in a quantum state that is available for classical or further quantum processing.

The quantum processing unit 1116 can include at least one qubit array 1122 composed of one or more qubits 1124A-1124N. The qubit array 1122 can be organized into one or more quantum registers. Each quantum register can serve as a collection of qubits for computation, storage, or manipulation within the quantum processing unit 1116. Quantum registers and/or qubits in the qubit array 1122 can be actively addressed and controlled by the quantum gate array 1118 and associated gate elements 1120A-1120N during the execution of quantum algorithms, facilitating various computational tasks. In some implementations, the quantum memory 1114 may be used in conjunction with the qubit array 1122 to store the state of quantum registers at various points, such as when not actively in use. In some implementations, the qubit array 1122 can store a quantum state and can be prepared in various basis states or superpositions in accordance with principles of quantum mechanics. Each qubit in the array can support initialization to specific states and may be configured to store any representation of a quantum state, such as a probability distribution, vector, or density matrix.

The quantum processing unit 1116 can include one or more quantum gate elements 1120A-1120N in at least one quantum gate array 1118. The quantum gate elements 1120 can implement various quantum operations. For example, the quantum gate elements 1120 can include single-input quantum gates, such as Pauli-X (X), Pauli-Y (Y), Pauli-Z (Z), Hadamard (H), T, or RY/RZ rotation gate, as well as multiple-input gates like the controlled-NOT (CNOT) gates. Each quantum gate element can correspond to any quantum operator required by the circuit and may function in accordance with stored or received instructions. The gate elements 1120 can act on entangled or non-entangled qubits, support the formation of quantum registers, and be dynamically grouped as required by the algorithm.

The quantum gates elements 1120 can be physically realized through precise manipulations of qubits tailored to the specific hardware platform. For example, in superconducting qubit systems, gates can be implemented using microwave pulses to drive transitions between qubit states. Other possible physical realizations of gates, not limited to these, include the use of laser pulses in trapped-ion systems, beam splitters for photonic qubits, and the control of magnetic or electric fields in spin or semiconductor qubit systems. Beyond their direct function in quantum state manipulation, the quantum gate elements 1120A-1120N may also structurally include or be associated with additional logic circuits, electronic devices, and memory and may be composed in alignment with the specific connectivity and architecture of the quantum hardware in use. Any supporting devices such as interface electronics, memory, and control circuitry can be included within the quantum gate elements or the broader quantum gate array 1118 to support quantum gate operations.

The quantum gate array 1118 can include a set of one or more quantum gate elements 1120A-1120N. The quantum gate array 1118 can be configured to perform a variety of quantum operations as required by algorithms executed within the quantum processing unit 1116. The quantum gate array 1118 can be designed to match and connect with the underlying connectivity of the quantum processing unit (QPU), such that physical and logical gate operations are compatible with available qubit arrangements and connectivity. The quantum gate array 1118 can provide a mechanism for applying specified transformations to qubit states according to the quantum algorithm being executed, such as for encoding, data classification, or other computational tasks. The configuration and operation of the quantum gate array 1118 can be controlled by various components described herein, such as the quantum control and readout system 1110.

Figure 12:
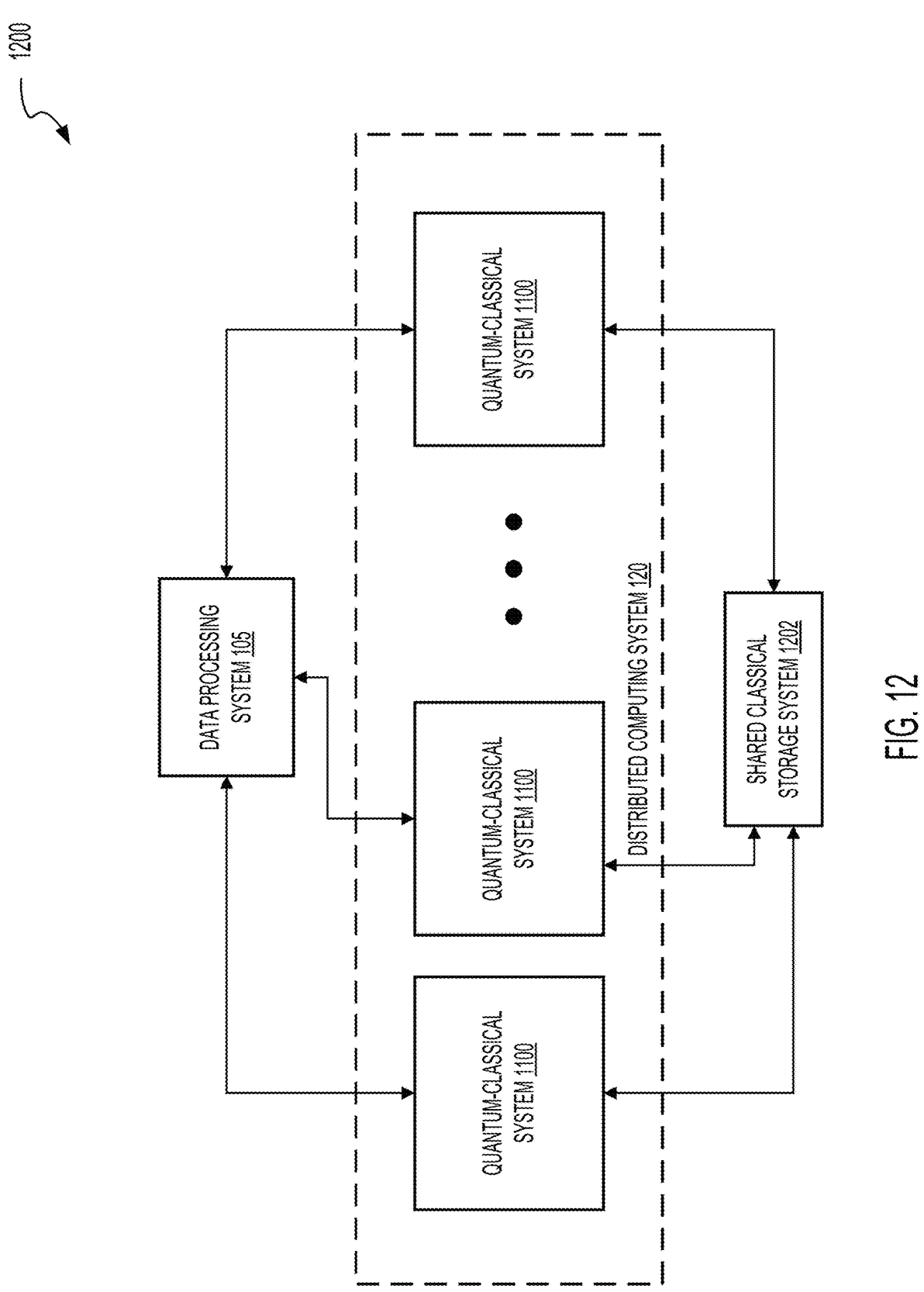
FIG. 12 is a block diagram illustrating a distributed hybrid quantum-classical computing environment with interconnected quantum-classical systems, a data processing system, and shared classical storage, in accordance with one or more implementations.

Referring now to FIG. 12, illustrated is a block diagram 1200 of a distributed hybrid quantum-classical computing environment, in accordance with one or more implementations. The diagram 1200 shows the data processing system 105 of FIG. 1, an implementation of the distributed computing environment 120 of FIG. 1, and a shared classical storage system 1202. The distributed computing environment 120 can include one or more hybrid quantum-classical computing systems 1100 (sometimes generally referred to as "quantum-classical system(s) 1100").

The diagram 1200 shows the data processing system 105 in communication with the distributed computing environment 120. In this example implementation, the distributed computing environment 120 can include one or more hybrid quantum-classical computing systems 1100, which are each described in further detail in connection with FIG. 11. The data processing system 105 can communicate with the distributed computing environment 120 (and/or the quantum-classical computing systems 1100 thereof) using one or more network interfaces or other suitable communication interfaces. Each hybrid quantum-classical computing system 1100 can include a quantum system and a classical computing node coupled by a local, low-latency communication interface, as described in connection with FIG. 11. For example, the local, low-latency communication interface can include a high-speed data bus, a direct memory access link, or any other hardware interconnect that enables transmission of quantum measurement results, control signals, and/or intermediate computation data between the quantum and classical subsystems with minimal delay.

Each hybrid quantum-classical computing system 1100 can be in communication with one or more shared classical storage systems 1202, for example, by one or more communication interfaces that connect the classical computing node of the system 1100 to the storage system 1202. The shared classical storage system 1202 can store data that is to be accessed by multiple hybrid quantum-classical computing systems 1100, such as input datasets, quantum circuit definitions, intermediate results, and/or output data. In some implementations, the shared classical storage system 1202 can store calibration data, error models, and/or scheduling metadata that is generated by or accessed for the execution of processing jobs via the distributed computing environment 120.

In one example, the shared classical storage system 1202 can maintain a repository of quantum measurement results produced by one hybrid quantum-classical computing system 1100 for use by another quantum-classical computing system 1100 in a subsequent computation stage. In another example, the shared classical storage system 1202 can store job specifications and partitioned task definitions to be retrieved by the data processing system 105 according to the techniques described herein. The shared classical storage system 1202 can be implemented as a network-based storage system, such as a distributed file system, a network-attached storage device, or a cloud-based object storage system. In some implementations, the shared classical storage system 1202 can be accessed by the data processing system 105 and/or by one or more classical computing nodes of a hybrid quantum-classical computing system 1100 using any suitable network protocols (e.g., TCP/IP, InfiniBand, Remote Direct Memory Access (RDMA), etc.), to facilitate data exchange.

At least one aspect relates to a system. The system can obtain a processing job for a distributed computing system comprising a plurality of classical computing systems and a plurality of quantum computing systems. The system can determine, for the processing job, a set of classical computing operations to be executed by one or more of the plurality of classical computing systems and a set of quantum computing operations to be executed by one or more of the plurality of quantum computing systems. The system can generate a hierarchical data structure for the processing job based on the set of classical computing operations and the set of quantum computing operations. The system can execute the processing job according to the hierarchical data structure via a subset of the plurality of classical computing systems and a subset of the plurality of quantum computing systems.

In some implementations, the system can generate the hierarchical data structure to include a directed graph data structure to represent a processing schedule for the set of classical computing operations and the set of quantum computing operations. In some implementations, each node in the directed graph data structure represents at least one of the set of classical computing operations or at least one of the set of quantum computing operations. In some implementations, the system can generate the processing schedule via time-slicing of the subset of the plurality of classical computing systems and the subset of the plurality of quantum computing systems. In some implementations, the system can generate the hierarchical data structure based on an availability of the plurality of classical computing systems and the plurality of quantum computing systems. In some implementations, the hierarchical data structure comprises a directed graph data structure.

In some implementations, the system can allocate the set of classical computing operations to the subset of the plurality of classical computing systems and the set of quantum computing operations to the subset of the plurality of classical computing systems according to a gang scheduler function. In some implementations, the plurality of classical computing systems comprise at least one of a central processing unit (CPU), a graphics processing unit (GPU), a field-programmable gate array (FPGA), or an application-specific integrated circuit (ASIC). In some implementations, the system can generate the hierarchical data structure for the processing job based on a set of priority scores generated for the set of classical computing operations and the set of quantum computing operations.

In some implementations, the system can monitor execution of the processing job via the distributed computing system. In some implementations, the system can update the hierarchical data structure according to the monitoring. In some implementations, the system can dynamically re-allocate, based on the updated hierarchical data structure, at least one of the set of classical computing operations to a second subset of the plurality of classical computing systems. In some implementations, the system can dynamically re-allocate, based on the updated hierarchical data structure, at least one of the set of quantum computing operations to a second subset of the plurality of quantum computing systems.

At least one other aspect relates to a method. The method can be performed, for example, by one or more processors coupled to non-transitory memory. The method can include obtaining a processing job for a distributed computing system comprising a plurality of classical computing systems and a plurality of quantum computing systems. The method can include determining, for the processing job, a set of classical computing operations to be executed by one or more of the plurality of classical computing systems and a set of quantum computing operations to be executed by one or more of the plurality of quantum computing systems. The method can include generating a hierarchical data structure for the processing job based on the set of classical computing operations and the set of quantum computing operations. The method can include executing the processing job according to the hierarchical data structure via a subset of the plurality of classical computing systems and a subset of the plurality of quantum computing systems.

In some implementations, the method can include generating the hierarchical data structure to include a directed graph data structure to represent a processing schedule for the set of classical computing operations and the set of quantum computing operations. In some implementations, each node in the directed graph data structure represents at least one of the set of classical computing operations or at least one of the set of quantum computing operations. In some implementations, the method can include generating the processing schedule via time-slicing of the subset of the plurality of classical computing systems and the subset of the plurality of quantum computing systems. In some implementations, the method can include generating the hierarchical data structure based on an availability of the plurality of classical computing systems and the plurality of quantum computing systems. In some implementations, the hierarchical data structure is a directed graph data structure.

In some implementations, the method can include allocating the set of classical computing operations to the subset of the plurality of classical computing systems and the set of quantum computing operations to the subset of the plurality of classical computing systems according to a gang scheduler function. In some implementations, the method can include generating the hierarchical data structure for the processing job based on a set of priority scores generated for the set of classical computing operations and the set of quantum computing operations. In some implementations, the method can include monitoring execution of the processing job via the distributed computing system. In some implementations, the method can include updating the hierarchical data structure according to the monitoring.

At least one other aspect relates to a non-transitory computer-readable medium. The non-transitory computer-readable medium can store instructions that, when executed by one or more processors, cause the one or more processors to perform operations comprising obtaining a processing job for a distributed computing system comprising a plurality of classical computing systems and a plurality of quantum computing systems. The operations can include determining, for the processing job, a set of classical computing operations to be executed by one or more of the plurality of classical computing systems and a set of quantum computing operations to be executed by one or more of the plurality of quantum computing systems. The operations can include generating a hierarchical data structure for the processing job based on a set of priority scores generated for the set of classical computing operations and the set of quantum computing operations. The operations can include executing the processing job according to the hierarchical data structure via a subset of the plurality of classical computing systems and a subset of the plurality of quantum computing systems.

At least one aspect relates to a system. The system can include one or more processors coupled to non-transitory memory. The system can obtain, from a distributing computing platform comprising a quantum computing system, telemetry data corresponding to a processing job. The system can determine, based on the telemetry data indicating that an error rate of the quantum system satisfies a threshold corresponding to a quantum portion of the processing job, that an error resolution technique is to be applied to the quantum portion of the processing job. The system can select, for the quantum portion of the processing job, the error resolution technique from a plurality of error correction techniques and a plurality of error mitigation techniques. The system can update a hierarchical data structure representing the processing job as at least a set of node. The hierarchical data structure can be updated to include the error resolution technique in association with a respective node of the hierarchical data structure representing the quantum portion of the processing job.

In some implementations, the telemetry data comprises at least one of a noise metric, a qubit fidelity value, a two-qubit gate fidelity value, a measurement fidelity value, and a coherence time value. In some implementations, the system can update the hierarchical data structure to include at least one additional classical computing task to be assigned to at least one classical computing system of the distributed computing platform to implement the error resolution technique for the quantum portion of the processing job. In some implementations, the system can generate, for each error correction technique of the plurality of error correction techniques and for each error mitigation technique of the plurality of error mitigation techniques, a respective score that represents a likelihood of expected fidelity upon applying the error correction technique or the error mitigation technique. In some implementations, the system can select the error resolution technique according to the respective score of each of the plurality of error correction techniques and each of the plurality of error mitigation techniques.

In some implementations, the hierarchical data structure is a directed graph data structure. In some implementations, the system can update the directed graph data structure to include at least one node corresponding to the error resolution technique. In some implementations, the system can select the error resolution technique further based on a gate depth of a quantum circuit that is to execute the quantum portion of the processing job. In some implementations, the system can select the error resolution technique further based on an error budget for the quantum portion of the processing job. In some implementations, the system can determine a requested coherence time for the quantum portion based at least in part on the gate depth. In some implementations, the system can determine a measured coherence time for the quantum computing system based on a set of historical measurements of the quantum computing system that is to execute the quantum portion. In some implementations, the system can select the error resolution technique based on the requested coherence time and the measured coherence time.

In some implementations, the system can determine that the requested coherence time exceeds the measured coherence time. In some implementations, the system can select the error resolution technique from the plurality of error correction techniques responsive to determining that the requested coherence time exceeds the measured coherence time. In some implementations, the system can determine that the measured coherence time satisfies the requested coherence time. In some implementations, the system can select the error resolution technique from the plurality of error mitigation techniques responsive to determining that the measured coherence time satisfies the measured coherence time.

At least one aspect relates to a non-transitory computer-readable medium. The non-transitory computer-readable medium can store instructions that, when executed by one or more processors, cause the one or more processors to perform operations comprising obtaining, from a distributed computing platform comprising a classical computing system and a quantum computing system, telemetry data corresponding to a processing job. The operations can include determining, based on the telemetry data, that an error resolution technique is to be applied to a quantum portion of the processing job. The operations can include selecting, for the quantum portion of the processing job, the error resolution technique from a plurality of error correction techniques and a plurality of error mitigation techniques. The operations can include updating a hierarchical data structure representing the processing job to include at least one additional classical computing task to implement the error resolution technique for the quantum portion of the processing job.

What is claimed is:
1. A system, comprising:
   one or more processors coupled to non-transitory memory, the one or more processors configured to:
      obtain, from a distributing computing platform comprising a quantum computing system, telemetry data corresponding to a processing job;
      determine, based on the telemetry data indicating that an error rate of the quantum system satisfies a threshold corresponding to a quantum portion of the processing job, that an error resolution technique is to be applied to the quantum portion of the processing job;

select, for the quantum portion of the processing job, the error resolution technique from a plurality of error correction techniques and a plurality of error mitigation techniques; and update a hierarchical data structure representing the processing job as at least a set of nodes, wherein the hierarchical data structure is updated to include the error resolution technique in association with a respective node of the hierarchical data structure representing the quantum portion of the processing job.

2. The system of claim 1, wherein the telemetry data comprises at least one of a noise metric, a qubit fidelity value, a two-qubit gate fidelity value, a measurement fidelity value, and a coherence time value.

3. The system of claim 1, wherein the one or more processors are further configured to:

update the hierarchical data structure to include at least one additional classical computing task to be assigned to at least one classical computing system of the distributed computing platform to implement the error resolution technique for the quantum portion of the processing job.

4. The system of claim 1, wherein the one or more processors are further configured to:

generate, for each error correction technique of the plurality of error correction techniques and for each error mitigation technique of the plurality of error mitigation techniques, a respective score that represents a likelihood of expected fidelity upon applying the error correction technique or the error mitigation technique; and select the error resolution technique according to the respective score of each of the plurality of error correction techniques and each of the plurality of error mitigation techniques.

5. The system of claim 1, wherein the hierarchical data structure is a directed graph data structure, and wherein the one or more processors are further configured to:

update the directed graph data structure to include at least one node corresponding to the error resolution technique.

6. The system of claim 1, wherein the one or more processors are further configured to:

select the error resolution technique further based on a gate depth of a quantum circuit that is to execute the quantum portion of the processing job.

7. The system of claim 6, wherein the one or more processors are further configured to:

select the error resolution technique further based on an error budget for the quantum portion of the processing job.

8. The system of claim 6, wherein the one or more processors are further configured to:

determine a requested coherence time for the quantum portion based at least in part on the gate depth;

determine a measured coherence time for the quantum computing system based on a set of historical measurements of the quantum computing system that is to execute the quantum portion; and select the error resolution technique based on the requested coherence time and the measured coherence time.

9. The system of claim 8, wherein the one or more processors are further configured to:

determine that the requested coherence time exceeds the measured coherence time; and select the error resolution technique from the plurality of error correction techniques responsive to determining that the requested coherence time exceeds the measured coherence time.

10. The system of claim 8, wherein the one or more processors are further configured to:

determine that the measured coherence time satisfies the requested coherence time exceeds; and select the error resolution technique from the plurality of error mitigation techniques responsive to determining that the measured coherence time satisfies the measured coherence time.

11. A method, comprising:

obtaining, by one or more processors coupled to non-transitory memory, from a distributed computing platform comprising a quantum computing system, telemetry data corresponding to a processing job;

determining, by the one or more processors, based on the telemetry data indicating that an error rate of the quantum system satisfies a threshold corresponding to a quantum portion of the processing job, that an error resolution technique is to be applied to the quantum portion of the processing job;

selecting, by the one or more processors, for the quantum portion of the processing job, the error resolution technique from a plurality of error correction techniques and a plurality of error mitigation techniques; and updating, by the one or more processors, a hierarchical data structure as at least a set of nodes, wherein the hierarchical data structure is updated representing the processing job to include the error resolution technique in association with a respective node of the hierarchical data structure representing the quantum portion of the processing job.

12. The method of claim 11, wherein the telemetry data comprises at least one of a noise metric, a qubit fidelity value, a two-qubit gate fidelity value, a measurement fidelity value, and a coherence time value.

13. The method of claim 11, further comprising:

updating, by the one or more processors, the hierarchical data structure to include at least one additional classical computing task to be assigned to at least one classical computing system of the distributed computing platform to implement the error resolution technique for the quantum portion of the processing job.

14. The method of claim 11, further comprising:

generating, by the one or more processors, for each error correction technique of the plurality of error correction techniques and for each error mitigation technique of the plurality of error mitigation techniques, a respective score that represents a likelihood of expected fidelity upon applying the error correction technique or the error mitigation technique; and selecting, by the one or more processors, the error resolution technique according to the respective score of each of the plurality of error correction techniques and each of the plurality of error mitigation techniques.

15. The method of claim 11, wherein the hierarchical data structure is a directed graph data structure, and further comprising:

updating, by the one or more processors, the directed graph data structure to include at least one node corresponding to the error resolution technique.

16. The method of claim 11, further comprising:

selecting, by the one or more processors, the error resolution technique further based on a gate depth of a quantum circuit that is to execute the quantum portion of the processing job.

17. The method of claim 16, further comprising:

determining, by the one or more processors, a requested coherence time for the quantum portion based at least in part on the gate depth;

determining, by the one or more processors, a measured coherence time for the quantum computing system based on a set of historical measurements of the quantum computing system that is to execute the quantum portion; and selecting, by the one or more processors, the error resolution technique based on the requested coherence time and the measured coherence time.

18. The method of claim 17, further comprising:

determining, by the one or more processors, that the requested coherence time exceeds the measured coherence time; and selecting, by the one or more processors, the error resolution technique from the plurality of error correction techniques responsive to determining that the requested coherence time exceeds the measured coherence time.

19. The method of claim 17, further comprising:

determining, by the one or more processors, that the measured coherence time satisfies the requested coherence time; and selecting, by the one or more processors, the error resolution technique from the plurality of error mitigation techniques responsive to determining that the measured coherence time satisfies the requested coherence time.

20. A non-transitory computer-readable medium storing instructions that, when executed by one or more processors, cause the one or more processors to perform operations comprising:

obtaining, from a distributed computing platform comprising a classical computing system and a quantum computing system, telemetry data corresponding to a processing job;

determining, based on the telemetry data indicating that an error rate of the quantum system satisfies a threshold corresponding to a quantum portion of the processing job, that an error resolution technique is to be applied to the quantum portion of the processing job;

selecting, for the quantum portion of the processing job, the error resolution technique from a plurality of error correction techniques and a plurality of error mitigation techniques; and updating a hierarchical data structure representing the processing job as at least a set of nodes, wherein the hierarchical data structure is updated to include at least one additional node representing at least one additional classical computing task to be executed by the classical computing system to implement the error resolution technique for the quantum portion of the processing job.

* * * * *